United States Patent
Lim

(10) Patent No.: US 12,527,888 B2
(45) Date of Patent: Jan. 20, 2026

(54) PLANT CULTIVATION APPARATUS

(71) Applicant: LG ELECTRONICS INC., Seoul (KR)

(72) Inventor: Kiyoung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 17/964,211

(22) Filed: Oct. 12, 2022

(65) Prior Publication Data

US 2023/0109941 A1  Apr. 13, 2023

(30) Foreign Application Priority Data

Oct. 13, 2021  (KR) .......................... 10-2021-0136181

(51) Int. Cl.
*A61L 2/10* (2006.01)
*A01G 9/14* (2006.01)
*A61L 2/26* (2006.01)

(52) U.S. Cl.
CPC .................. *A61L 2/10* (2013.01); *A61L 2/26* (2013.01); *A01G 2009/1492* (2013.01); *A61L 2202/11* (2013.01)

(58) Field of Classification Search
CPC .... A01G 2009/1492; A01G 9/06; A01G 9/24; A01G 9/14; A01G 31/00; A01G 31/02; A01G 31/06
See application file for complete search history.

(56) References Cited

U.S. PATENT DOCUMENTS

| | | | | |
|---|---|---|---|---|
| 4,103,167 A | * | 7/1978 | Ellner | C02F 1/325 250/365 |
| 4,899,057 A | * | 2/1990 | Koji | A61L 2/10 210/748.11 |
| 5,439,642 A | * | 8/1995 | Hagmann | B29D 11/00461 250/455.11 |
| 5,441,179 A | * | 8/1995 | Marsh | B67D 3/00 210/172.6 |
| 6,297,047 B1 | * | 10/2001 | Butts | A61L 2/10 219/400 |

(Continued)

FOREIGN PATENT DOCUMENTS

| | | |
|---|---|---|
| CN | 201752201 | 3/2011 |
| CN | 203663124 | 6/2014 |

(Continued)

OTHER PUBLICATIONS

European Search Report issued in Application No. 22201334.4 dated Mar. 2, 2023.

(Continued)

*Primary Examiner* — Katelyn T Truong
(74) *Attorney, Agent, or Firm* — KED & ASSOCIATES

(57) ABSTRACT

A plant cultivation device may include a cabinet forming a space in which plants are cultivated: a door connected to the cabinet to open and close the space; at least one bed disposed in the space; at least one light assembly that irradiates light onto the at least one bed; a tank configured to store a fluid; a fluid supply module configured to supply the fluid to the at least one bed; and a sterilizer positioned outside of the tank and configured to sterilize the fluid within the tank.

15 Claims, 55 Drawing Sheets

(56) References Cited

U.S. PATENT DOCUMENTS

| | | | | |
|---|---|---|---|---|
| 6,766,097 B2* | 7/2004 | Horton, III | ............... | A61L 2/10 210/636 |
| 6,803,587 B2* | 10/2004 | Gadgil | ................... | C02F 1/325 250/434 |
| 7,002,140 B2* | 2/2006 | Elsegood | ............... | C02F 1/325 250/431 |
| 9,005,452 B2* | 4/2015 | Arenshtam | ............ | C02F 1/325 403/177 |
| 9,107,973 B1* | 8/2015 | Robinson | .................. | A61L 2/22 |
| 9,715,058 B1* | 7/2017 | Zhang | .................. | G02B 6/0061 |
| 10,266,426 B1* | 4/2019 | Conrad | .................. | C02F 1/32 |
| 11,304,391 B1* | 4/2022 | DeJong | ................. | A01G 7/045 |
| 2004/0052680 A1* | 3/2004 | Elwood | .................... | A61L 9/20 422/24 |
| 2004/0222163 A1* | 11/2004 | Saccomanno | ........... | C02F 1/325 210/748.11 |
| 2009/0206674 A1* | 8/2009 | Noguchi | ............... | A61B 50/10 307/104 |
| 2016/0074546 A1* | 3/2016 | Rizzone | .................... | A61L 2/10 250/455.11 |
| 2016/0114066 A1* | 4/2016 | Lichtblau | ................. | A61L 2/10 250/455.11 |
| 2018/0042191 A1* | 2/2018 | Blackburn | ............. | A01G 31/06 |
| 2018/0140728 A1* | 5/2018 | Kiuchi | ...................... | C02F 1/32 |
| 2018/0214588 A1* | 8/2018 | Casares | .................. | A61L 2/202 |
| 2018/0259254 A1* | 9/2018 | Kim | ......................... | A47K 1/02 |
| 2018/0310498 A1* | 11/2018 | Asano | ....................... | A61L 2/10 |
| 2019/0183062 A1* | 6/2019 | Pham | ..................... | A01G 9/022 |
| 2020/0114027 A1* | 4/2020 | Zhang | .................. | A61L 12/063 |
| 2021/0046198 A1* | 2/2021 | Winslow | ................. | A61L 2/084 |
| 2021/0228752 A1* | 7/2021 | Chang | ....................... | A61L 2/06 |
| 2021/0308296 A1* | 10/2021 | Cook | ................... | A47B 49/008 |
| 2022/0062469 A1* | 3/2022 | Hong | ......................... | A61L 2/10 |
| 2023/0108632 A1* | 4/2023 | Maa | ....................... | G02B 5/208 250/454.11 |

FOREIGN PATENT DOCUMENTS

| | | |
|---|---|---|
| CN | 111789418 | 10/2020 |
| GB | 2487153 | 7/2012 |
| KR | 10-1954251 | 3/2019 |
| WO | WO 2020/041242 | 2/2020 |
| WO | WO 2021/141279 | 7/2021 |
| WO | WO 2022/025674 | 2/2022 |

OTHER PUBLICATIONS

European Search Report issued in Application No. 22201366.6 dated Mar. 3, 2023.
European Office Action issued in Application No. 22 201 334.4 1105 dated Nov. 13, 2024.

* cited by examiner

PLANT CULTIVATION APPARATUS

CROSS-REFERENCE TO RELATED APPLICATIONS

This application claims priority under 35 U.S.C. § 119 to Korean Application 10-2021-0136181 filed on Oct. 13, 2021, whose entire disclosure is hereby incorporated by reference.

BACKGROUND

1. Field

A plant cultivation apparatus is disclosed herein.

2. Background

In general, a plant cultivation apparatus provides a predetermined cultivation chamber having an environment appropriate to grow plants so that the plants are stored in the predetermined cultivation chamber. Structure for supplying light energy required for plant growth is provided in the plant cultivation apparatus, and the plants grow supplied with nutrients and the light energy.

In recent years, a plant cultivation apparatus, which is provided with a cultivation space in which light, temperature, and moisture are controlled, and a door that opens and closes the cultivation space so that the plants are capable of being grown in the home, is being developed. A plant cultivator, in which a capsule containing seeds is seated in a case that defines a cultivation space opened and closed by a door, and light, moisture, and temperature are capable of being respectively controlled by a light source module, a culture solution module, and an air conditioning module, is disclosed in Korean Patent Registration No. 10-1954251, which is hereby incorporated by reference.

However, according to the related art having the above-described structure, a structure in which a culture solution is supplied to an entire tray may be provided, and also, the culture solution may be injected to a portion, on which a capsule is not mounted, so that the culture solution is exposed to the outside, and thus, is contaminated. More particularly, when a closed environment is provided in a temperature region in which the plants are grown, the culture solution may be very easily contaminated, and thus, there is a limitation in that, when mold or green algae are generated due to the contamination of the culture solution, user's dissatisfaction is caused.

BRIEF DESCRIPTION OF THE DRAWINGS

Embodiments will be described with reference to the following drawings in which like reference numerals refer to like elements wherein.

DETAILED DESCRIPTION

Hereinafter, embodiments will be described with reference to the accompanying drawings. However, embodiments are not limited to the proposed embodiments, and other embodiments included in the scope may be easily proposed by addition, changes, deletions, etc. of other elements.

Prior to a description, directions are defined. In an embodiment that will be hereinafter, a direction facing a front surface of a door illustrated in FIG. 1 may be defined as a frontward direction unless the direction is separately defined, a direction facing the inside of a cabinet with respect to the front surface of the door will be defined as a rearward direction, a direction facing a bottom surface on which a plant cultivation apparatus is installed will be defined as a downward direction, and a direction that is away from the bottom surface will be defined as an upward direction.

Figure 1:
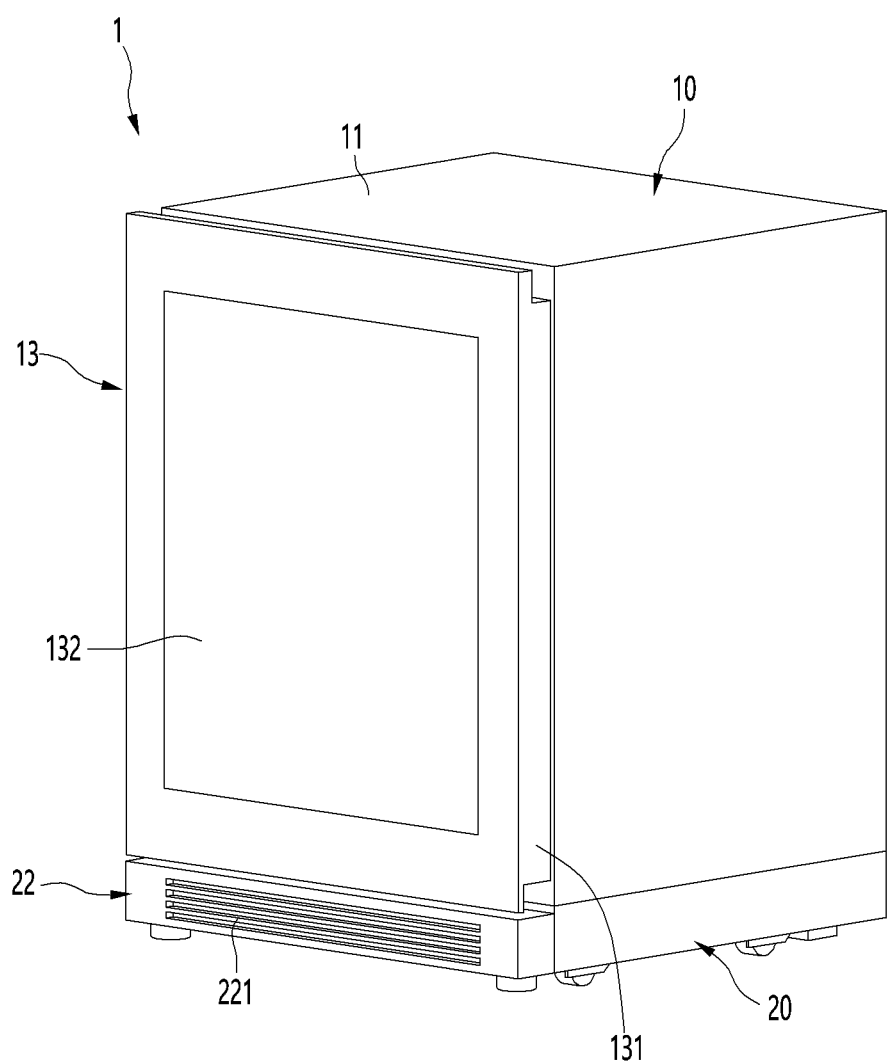
FIG. 1 is a perspective view of a plant cultivation apparatus according to an embodiment.
Figure 2:
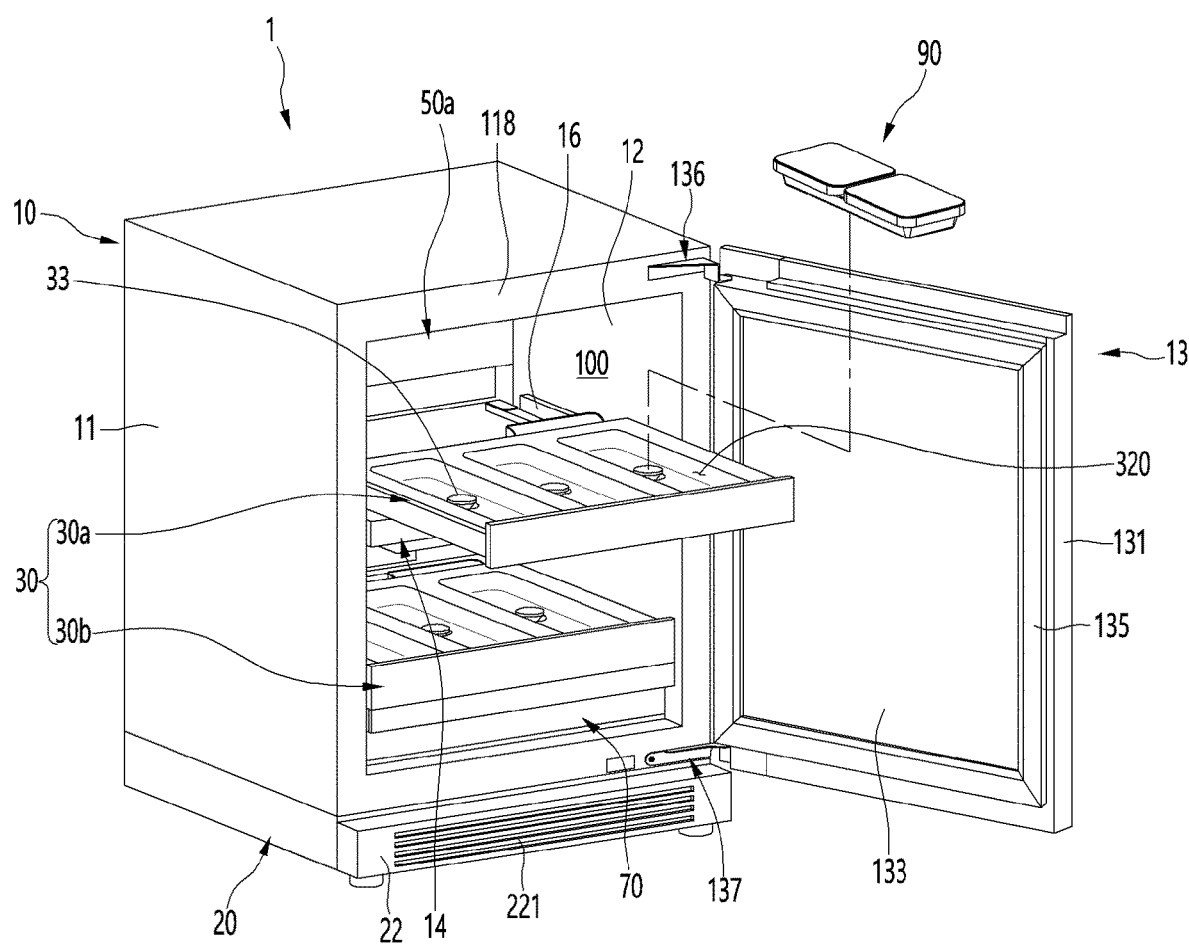
FIG. 2 is a perspective view illustrating a state in which a door of the plant cultivation apparatus is opened.

FIG. 1 is a perspective view of a plant cultivation apparatus according to an embodiment. Also, FIG. 2 is a perspective view illustrating a state in which a door of the plant cultivation apparatus is opened.

Referring to the accompanying drawings, a plant cultivation apparatus according to an embodiment may be provided in a hexahedral shape. In addition, the plant cultivation apparatus may be installed alone in an indoor space or may have a size and structure that is capable of being mounted in a built-in manner in furniture if necessary. For example, the plant cultivation apparatus may have a relatively low height and may be installed to define a portion of an island table, or a storage cabinet installed on a wall. Alternatively, unlike this embodiment, the plant cultivation apparatus may have a higher height in a vertical direction and may have various sizes that are capable of being installed for use of a home such as three or more cultivation shelves 30 disposed vertically therein.

In addition, the plant cultivation apparatus may be referred to as a plant cultivator or may be referred to as a plant cultivation refrigerator, a refrigerator-type plant cultivation apparatus, or a plant refrigerator, for example, because of having a closed space in which an internal temperature is controlled to a temperature less than room temperature as necessary.

Plant cultivation apparatus 1 may have an outer appearance that is defined by a cabinet 10 defining a cultivation space 100, in which plants are cultivated, and a door 13 that opens and close the cabinet 10. The plants to be cultivated, such as leaves, and herbs, for example, which are capable of being used for wraps or salads, may be easily eaten and cultivated by the user, and also, plants that occupy a large space may be cultivated. In addition, plants that are easy to grow may be grown by being provided in the form of a seed package 90 including seeds or young sprouts.

The cabinet 10 may define a cultivation space 100 with an open front surface, and the door 13 that opens and closes the cultivation space 100 may be provided in a front surface of the cabinet 10. The door 13 may be connected to the cabinet 10 by an upper hinge 136 and a lower hinge 137, and the cultivation space 100 may be opened and closed by rotation of the door 13.

In addition, the door 13 may define an outer appearance of a front surface of the plant cultivation apparatus 1 when the front surface is closed. The door 13 may include a door frame 131 that defines a circumference thereof, and a front panel 132 and a rear panel 133, which are respectively mounted on the door frame 131 to define front and rear surfaces of the door 13.

Each of the front panel 132 and the rear panel 133 may be made of a material capable of allowing a user to view the cultivation space 100 therethrough. In addition, a heat insulating panel (see reference numeral 134 in FIG. 5) may be further provided between the front panel 132 and the rear panel 133. In addition, a gasket 135 may be provided around a rear surface of the door frame 131 to seal the cultivation space 100.

A machine room module 20 may be provided below the cabinet 10. Components for controlling a temperature inside the cultivation space 100 may be disposed in the machine room module 20, and the machine room module 20 may provide a machine room 200 in which a plurality of electrical components including a compressor 253 and a condenser 254 constituting a refrigeration cycle are provided.

A front cover 22 may be disposed on the front surface of the machine room 200. The front cover 22 may be exposed forward beyond the door 13 to define the front surface of the machine room 200. In addition, a grill portion 221 having a plurality of openings may be provided in the front cover 22, and thus, air may be introduced into the machine room 200 through the grill portion 221, and the air within the machine room 200 may be discharged.

The cabinet 10 may include an outer case 11 defining an outer appearance thereof and an inner case 12 defining the cultivation space 100. In addition, a heat insulating material (see reference numeral 101 in FIG. 5) may be filled between the outer case 11 and the inner case 12 to insulate the cultivation space 100. In addition, each of the outer case 11 and the inner case 12 may be made of a metal material.

A plurality of cultivation shelves 30 may be arranged vertically in the cabinet 10. In this embodiment, upper and lower cultivation shelves 30 may be provided and may have the same structure. Among the cultivation shelves 30, the cultivation shelf 30 disposed above may be referred to as an upper cultivation shelf 30a, and the cultivation shelf 30 disposed below may be referred to as a lower cultivation shelf 30b. Also, the cultivation shelf 30 may be configured to be inserted into and withdrawn from the inside of the cabinet 10 in a frontward and rearward direction, and mounting of the seed package 90 including seeds of plants for cultivation and management and harvest of the plants may be easy.

The cultivation shelf 30 may include a plurality of seating portions 320 on which the seed package 90 is seated. In addition, the cultivation shelf 30 may have a structure in which a plurality of the seed packages 90 is disposed in the independent seating portions 320, respectively, so that independent cultivation and harvest of the plants are possible.

A fluid, such as water, may be supplied to the cultivation shelf 30 from water tank (fluid tank) 70. The water supplied to the cultivation shelf 30 may be supplied from the seating portions 320, on which the seed package 90 is disposed, among the plurality of seating portions 320.

The water supplied to the cultivation shelf 30 may be completely drained after being sufficiently supplied to the seed package 90. Thus, the cultivation shelf 30 may be emptied for the rest of a time excluding a water supply time so as to be maintained in a clean state.

The water tank 70 may be provided below the cultivation space 100. The water tank 70 may store water supplied to the cultivation shelf 30, and the water discharged from the cultivation shelf 30 may be collected. In addition, water may be circulated between the water tank and the cultivation shelf by a water supply module and a drain module, which connect the water tank 70 to the cultivation shelf 30.

The water tank 70 may be exposed to a front side of the cultivation space 100 and may be disposed so as to be drawn in and out so that a user may easily replenish water. In addition, nutrients necessary for plant growth may be introduced into the water tank 70 and then supplied to the seed package 90. Thus, in an embodiment, the water may be a culture solution containing the nutrients.

Also, a lighting device 40 that radiates light toward the top surface of the cultivation shelf 30 may be provided above the cultivation shelf 30. Also, a blower 50 that circulates internal air in the cultivation space 100 may be provided on a rear wall of the cultivation space 100.

The cultivation space 30 may be partitioned vertically by the cultivation shelf 30 and the lighting device 40, and a blower 50 may be independently disposed in each partitioned space. In addition, upper and lower blowers 50 may operate independently to generate an independent airflow in the partitioned cultivation space 100.

A display 14 may be provided in the cultivation space 100. The display 14 may be configured to display an operating state of the plant cultivation apparatus and be provided at a front end of the lighting device 40, which is disposed at a lower side, of the plurality of lighting devices 40.

The seed package 90 may be selected by a user, and the user may select and purchase a desired type of crop through aftermarkets. Also, the seed package 90 may be supplied in the form of delivery according to a user's order or may be supplied regularly by a manager. If necessary, the user may directly place and use seeds for cultivation in the seed package 90 provided.

The seed package 90 may be supplied not only in a shape accommodated in the seed, but also in a state in which the seed is germinated and sprouted, or a state in which a plant after a certain time elapses after the germination is disposed.

The user may cultivate the seed package 90, in which the desired crop is contained, by seating the seed package 90 on the cultivation shelf 30, and also may cultivate a different type of plant by placing different types of seed packages 90 on the upper cultivation shelf 30a and the lower cultivation shelf 30b in one plant cultivation apparatus 1. For this, different cultivation environments may be independently implemented in the vertically partitioned cultivation space 100. Also, when cultivation is completed or when replacement with another crop is desired, the seed package 90 may be removed or replaced from the seating portion 320.

Figure 3:
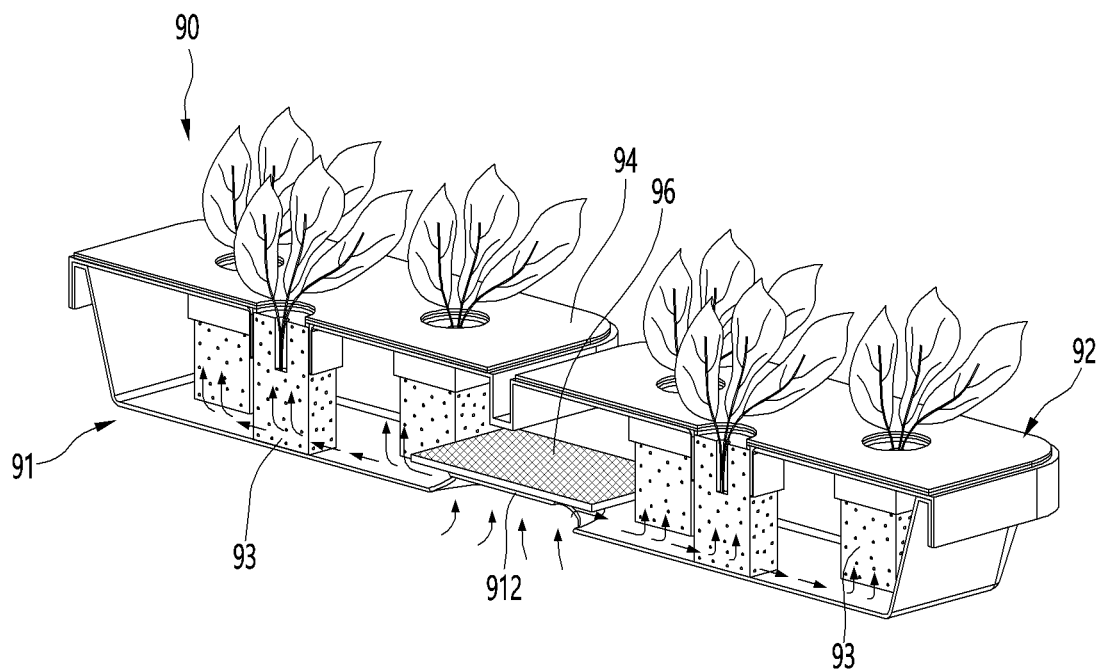
FIG. 3 is a cutaway perspective view illustrating a seed package of the plant cultivation apparatus.

FIG. 3 is a cutaway perspective view illustrating the seed package of the plant cultivation apparatus. As illustrated in the drawings, the seed package 90 may include a container 91 that defines an accommodation space, a container cover 92 that shields an open top surface of the container 91, and a plurality of seed accommodation members 93 provided in the accommodation space to accommodate seeds.

A bottom surface of the container 91 may be provided in a planar shape and may correspond to a size of the seating portion 320 so as to be supported by the seating portion 320. In addition, a water inlet 912 may be recessed to be provided in the bottom surface of the container 91. A plurality of holes may be defined in the water inlet 912, and water may be supplied into the container 91, or water within the container 92 may be discharged through the holes.

The water inlet 912 may be disposed at a position corresponding to a shutter 33 installed on the cultivation shelf 30. Therefore, when the seed package 90 is seated on the seating portion 320, the shutter 33 may be accommodated inside the water inlet 912, and water may be supplied into the seed package 90.

A shield member 96 may be provided on the water inlet 912. The shield member 96 may be made of a material, such as fabric or paper, or may be made of a net material, such as mesh. to allow the water to pass therethrough and prevent foreign substance from being discharged. In addition, the shield member 96 may be provided to cover the water inlet 912, thereby preventing roots of the plant growing through the seed accommodation member 93 from blocking the water inlet 912.

The container cover 92 may be provided in a plate shape to shield the open top surface of the container 91, and an upper end of the seed accommodation member 93 may be inserted into and fixed to a bottom surface of the container cover 92. In addition, a position corresponding to the seed accommodation member 93 on the container cover 92 may be open so that a plant germinated in the seed accommodation member 93 grows and is exposed to the outside.

A reflective sheet 94 may be attached to a top surface of the container cover 92. The reflective sheet 94 may be provided to reflect light radiated from the lighting device 40, and the seed package 90 may be prevented from increasing in temperature through the reflection of the light.

A plurality of the seed accommodation members 93 may be provided inside the container 91. The seed accommodation member 93 may accommodate seeds 932 of plants to be cultivated and may be made of a porous material to absorb water supplied into the seed package 90, thereby supplying the water to the seeds.

Soil or medium containing nutrients may not be accommodated in the container 91, and only water containing nutrients may be supplied into the seed package 90 after the seed package 90 is mounted on the cultivation shelf 30. Thus, the inside of the seed package 90 may be prevented from being contaminated by mold or green algae.

Also, the inside of the seed package 90 may be maintained in a state in which water does not remain in the seed package 90 by draining the water through the cultivation shelf 30. Thus, contamination does not occur in the seed package 90 and the cultivation shelf 30.

Hereinafter, structure of the plant cultivation apparatus will be described in more detail with reference to the drawings.

Figure 4:
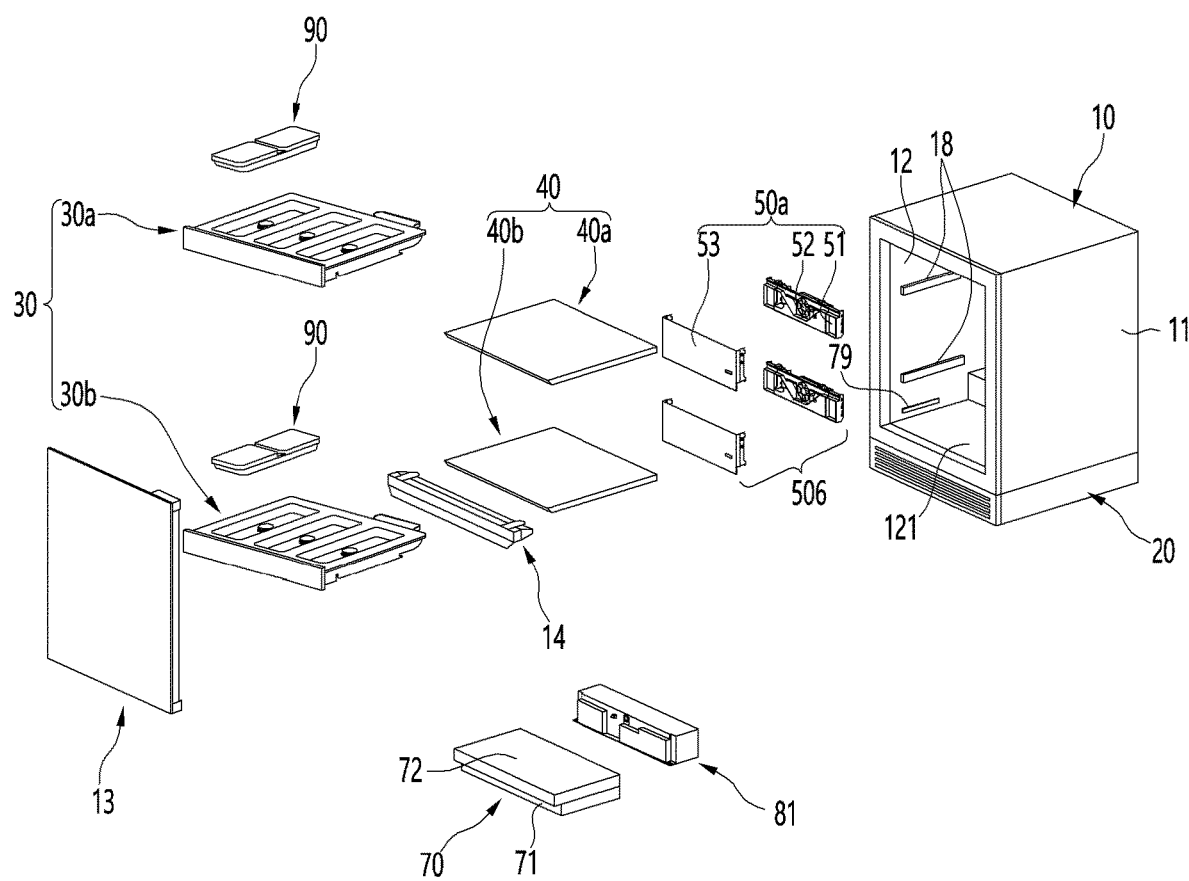
FIG. 4 is an exploded perspective view of the plant cultivation apparatus.
Figure 5:
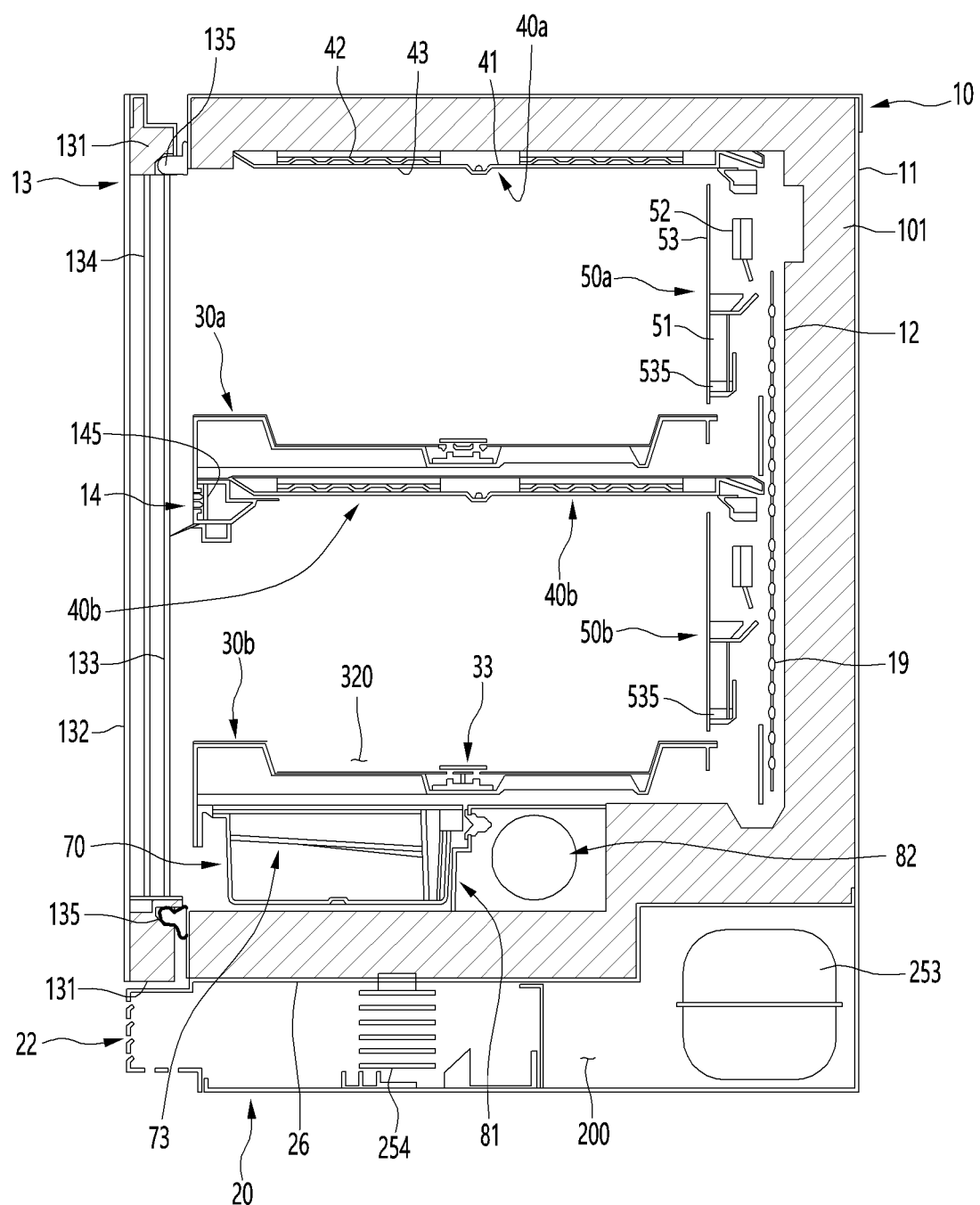
FIG. 5 is a cross-sectional view of the plant cultivation apparatus.

FIG. 4 is an exploded perspective view of the plant cultivation apparatus. FIG. 5 is a cross-sectional view of the plant cultivation apparatus.

As illustrated in the drawings, an evaporator 19 that generates cool air may be provided on the rear wall of the cultivation space 100, and a blower 50 may be provided in front of the evaporator 19. Thus, air within the cultivation space 100 may be circulated by operation of the blower 50, and thus, the inside of the cultivation space 100 may be cooled to be maintained to a set or predetermined or desired temperature. Thus, the cultivation space 100 may be referred to as a cooling space or a storage space.

In addition, a heater 18 may be provided in each of both lateral or left and right sidewalls of the cultivation space 100. The heater may generate heat to control the temperature of the cultivation space and may be provided at each of both lateral or left and right sides of the cultivation space 100. The heater 18 may be disposed between the heat insulating material 101 and the inner case 12 and may be disposed to be in contact with the inner case 12.

The heater 18 may include an upper heater 18$a$ that heats a space between the upper lighting device 40$a$ and the upper cultivation shelf 30$a$ and a lower heater that heats a space between the lower lighting device 40$b$ and the lower cultivation shelf 30$b$. The upper and lower portions of the cultivation space 100 may be independently maintained at different temperatures by the blower 50 and the heater 18.

The cultivation space 100 may be heated and cooled by the evaporator 19 and the heater 18. In addition, when the evaporator 19 or the heater 18 is driven, the blower 50 may operate to cool or heat the cultivation space 100. The inside of the cultivation space 100 may be maintained at a temperature that is suitable for the growth of plants (for example, about 18° C. to about −28° C.) by the evaporator 19 and the heater 18.

The blower 50 may include an upper blower 50$a$ disposed in an upper space that is divided by the cultivation shelf 30 and a lower blower 50$b$ disposed in a lower space that is divided by the cultivation shelf 30. Thus, the air may be independently circulated in the spaces inside the cultivation space 100 by being partitioned by the cultivation shelf 30. The blower 50 may include a fan guide 51 mounted in front of the evaporator 19, a blower fan 52 mounted on the fan guide 51, and a blower fan plate 53 that covers the fan guide 51.

The lighting device 40 may be provided above the cultivation shelf 30. The lighting device 40 may radiate light toward the cultivation shelf 30 to provide light that is necessary for plants. An amount of light radiated by the lighting device 40 may be set similar to sunlight, and an amount of light and a radiation time optimized for the plant to be grown may be set.

The lighting device 40 may be provided above each cultivation shelf 30. For example, the lighting device 40 may include an upper lighting device 40$a$ provided in an upper space partitioned by the cultivation shelf 30 and a lower lighting device 40$b$ provided in a lower space partitioned by the cultivation shelf 30. The upper lighting device 40$a$ may be mounted on the top surface of the cultivation space 100, and the lower lighting device 40$b$ may be mounted on a bottom surface of the upper cultivation shelf 30$a$. That is, the upper lighting device 40$a$ and the lower lighting device 40$b$ may be disposed vertically above the cultivation shelf 30, which are disposed therebelow, to radiate light toward each of the cultivation shelves 30$a$ and 30$b$ within the cultivation space 100, thereby controlling the growth of the cultivated plants.

The lighting device 40 may include an LED module 42 including a plurality of LEDs 422 (see FIG. 21), a light case 41 on which the LED module 42 is mounted, and a light cover 43 which shields the LED module 42 and through which light is transmitted. The plurality of LEDs 422 may be provided so as to provide a sufficient amount of light to the cultivation shelf 30 and may be widely distributed above the cultivation shelf 30. The LED module 42 may be configured in a state in which the plurality of LEDs 422 is mounted on a substrate, and the plurality of LED modules 42 including the plurality of LEDs 422 may be disposed.

The water tank 70 may be provided on a bottom surface inside the cabinet 10. The water tank 70 may store water supplied to the cultivation shelf 30 and water collected from the cultivation shelf 30. The water tank 70 may be disposed below the cultivation shelf 30, which is disposed at a lowermost side, among the plurality of the cultivation shelves 30 and may be disposed in front of a position corresponding to the front end of the cultivation shelf 30.

The water tank 70 may include a tank body 71 defining a space in which water is stored and a tank cover 72 that opens and closes a top surface of the tank body 71. Thus, the water tank 70 may have a structure in which the water tank 70 is opened in the withdrawn state to allow additional water supply.

A pump cover 81 may be provided in a rear space covered by the water tank 70. A pump 82 that supplies water from the water tank 70 to the cultivation shelf 30 and a valve 83 connected to the water supply module may be provided inside the pump cover 81. The pump 70 and tubes connected to the pump 70 allow the water of the water tank 70 to be supplied to the cultivation shelf 30, and thus, may be referred to as a water supply device.

A machine room module 20 may be provided below the cabinet 10. The machine room module 20 may be coupled to the cabinet 10 in a state in which the compressor 253 and the condenser 242 are installed therein. In addition, in a state in which the machine room module 20 and the cabinet 10 are coupled to each other, a tube connecting the evaporator 19 to the compressor 253, which are provided inside the cabinet 10, may be connected to each other to allow the refrigeration cycle to operate.

A bottom surface of the cabinet 10 may be defined by a machine room top cover 26. The machine room top cover 26 may define a top surface of the machine room 200 to shield an opened top surface of the machine room module 20. In addition, a front surface of the machine room 200 may be shielded by the front cover 22.

Hereinafter, the machine room module 20 provided below the cabinet 10 will be described in more detail with reference to the drawings.

Figure 6:
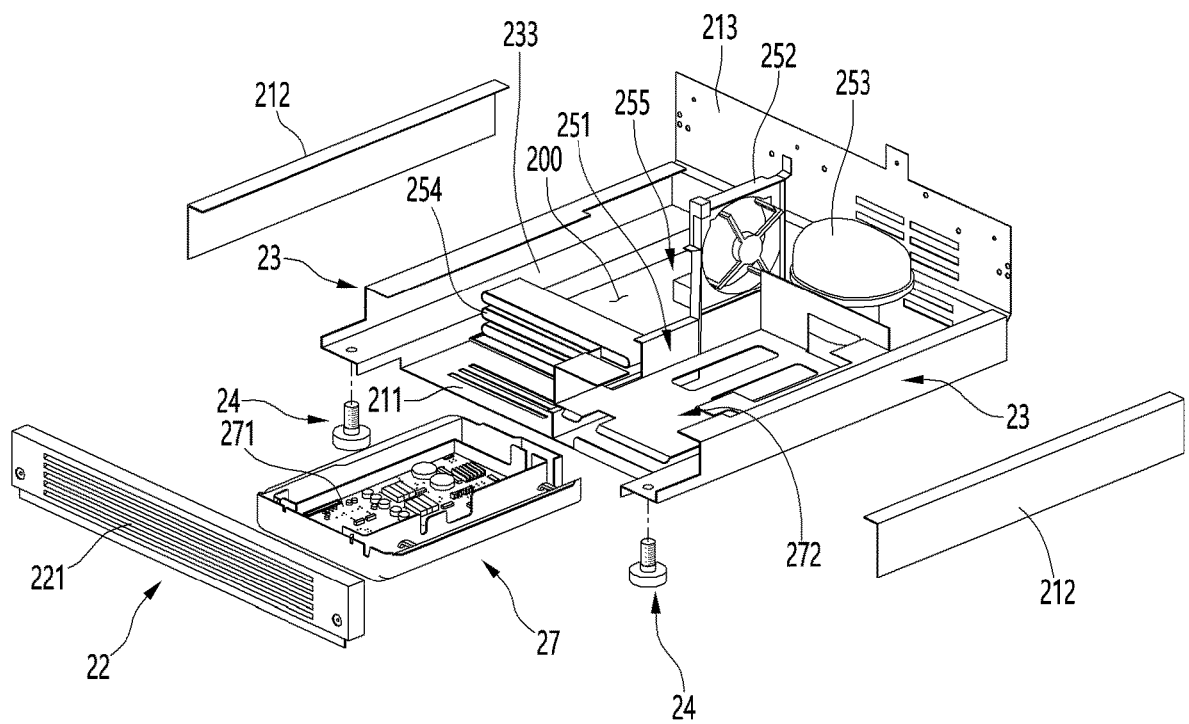
FIG. 6 is an exploded perspective view illustrating a machine room module of the plant cultivation apparatus.
Figure 7:
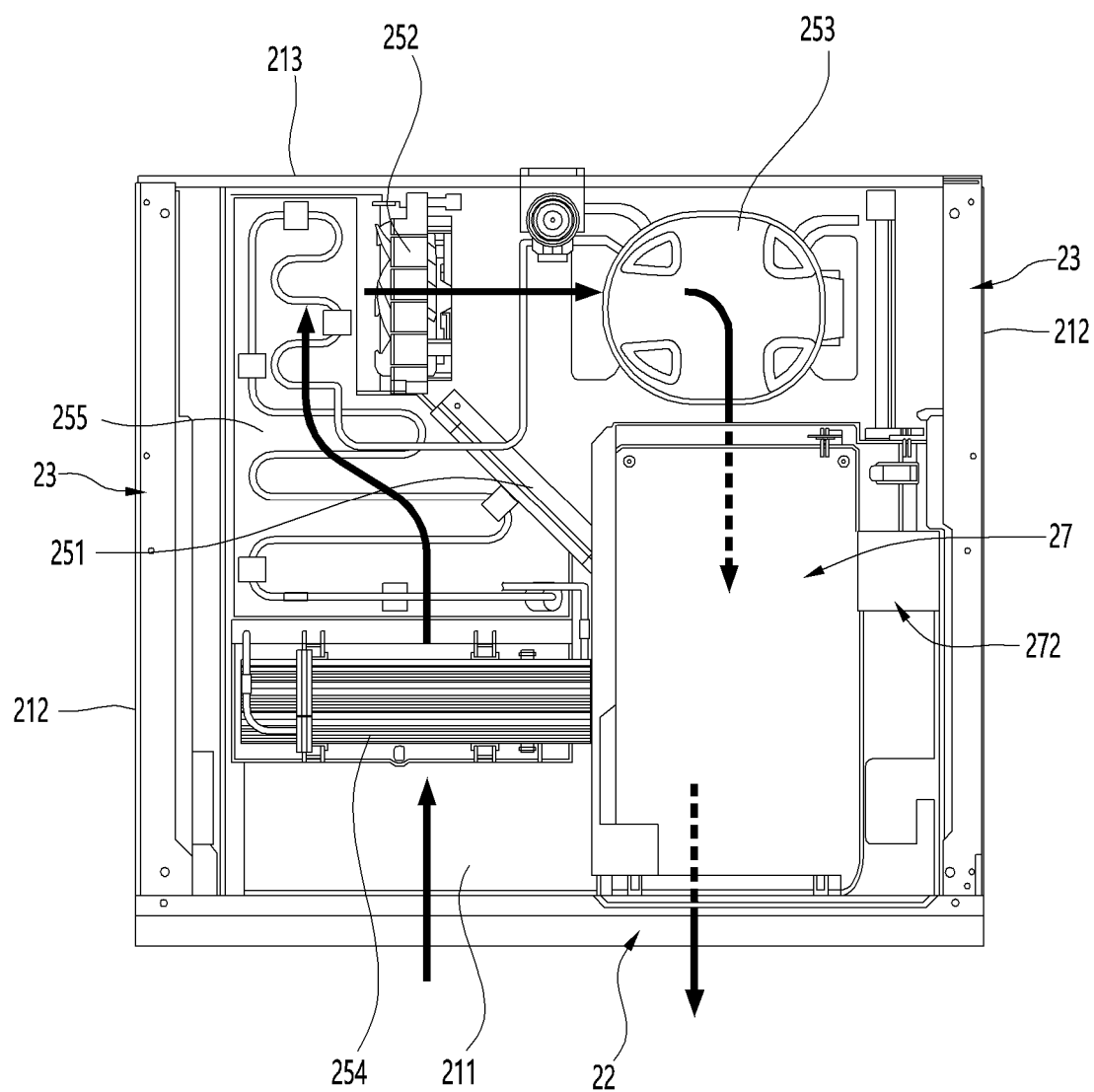
FIG. 7 is a plan view illustrating the inside of the machine room module.

FIG. 6 is an exploded perspective view illustrating the machine room module of the plant cultivation apparatus. FIG. 7 is a plan view illustrating the inside of the machine room module.

As illustrated in the drawings, the machine room module 20 may be mounted on the bottom surface of the cabinet 10 to define a space of the machine room 200, which is independent from the cultivation space 100 under the cabinet 10. The machine room module 20 may include a machine room bottom plate 211 defining a bottom surface thereof, and a side frame 23 may be coupled to each of both surfaces of the machine room bottom plate 211. The side frame 23 may define a side surface of the machine room module 20 to support the outer case 11.

A front end of the side frame 23 may be in contact with the ground when the plant cultivation apparatus 1 is installed and may be provided with a leg 24 a height of which is adjustable by rotation. In addition, a decorative plate 212 may be mounted on each of both lateral or left and right surfaces of the side frame 23 to define an outer appearance of the side surface of the machine room module 20, and the decorative plate 212 may be made of the same material as the outer case 11.

A front end of the side frame 23 disposed on each of the left and right sides may be connected to the front cover 22. A rear end of the side frame 23 may be connected to a machine room rear plate 213 to define front and rear surfaces of the machine room module 20. That is, the machine room bottom plate 211 and the side frame 23, and the machine room rear plate 213 and the front cover 22 are coupled to each other, and the open top surface may be shielded by the machine room top cover 26.

An inner space of the machine room module 20 may be partitioned by separation partition wall 251. A condenser 242 may be provided in a left (first) space partitioned by the separation partition wall 251, and a compressor 253 may be provided in a right (second) space partitioned by the separation partition wall. Also, a heat dissipation fan 252 that forcibly blows air from the left side to the right side may be provided on a rear end of the separation partition wall.

Thus, when the heat dissipation fan 252 is driven, external air may be suctioned to flow to the left space of the machine room module 20 through a left side of the grill portion 221, and the suctioned air may pass through the condenser 242 and then be heat-exchanged with a refrigerant in the condenser 242 to dissipate heat of the condenser 242. Also, the air passing through the heat dissipation fan 252 may cool the compressor 253 while passing through the compressor 253. Also, the air passing through the compressor 253 may be discharged forward through the right side of the grill portion 221.

The evaporator 19 may be provided inside the cabinet 10 and also be disposed vertically on the rear surface of the cultivation space 100 so as to be easily connected to the components inside the machine room module 20 by a refrigerant tube.

A condensed water receiver 255 from which condensed water generated in the evaporator 19 or defrosting water generated during defrosting is discharged may be provided inside the machine room 200. In addition, a control box 27 may be provided inside the machine room 200. When the front cover 22 is separated, the control box 27 may be configured to be exposed to the front side. In addition, a box guide member 272 that guides the drawing in and out of the control box 27 may be provided inside the machine room 200. The control box 27 may control an overall operation of the plant cultivation apparatus 1 and thus may be referred to as a controller 27.

Hereinafter, the structure of the cultivation shelf disposed inside the cultivation space will be described in more detail with reference to the drawings.

Figure 8:
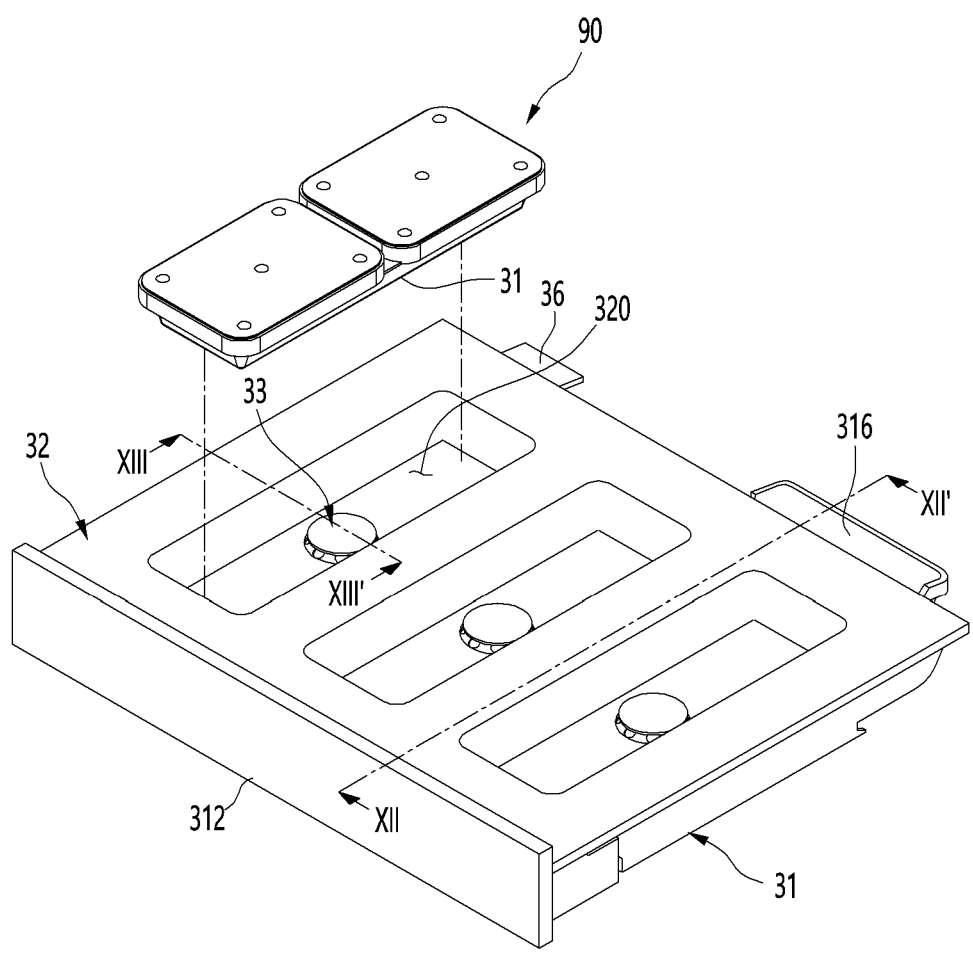
FIG. 8 is a perspective view illustrating a cultivation shelf of the plant cultivation apparatus.
Figure 9:
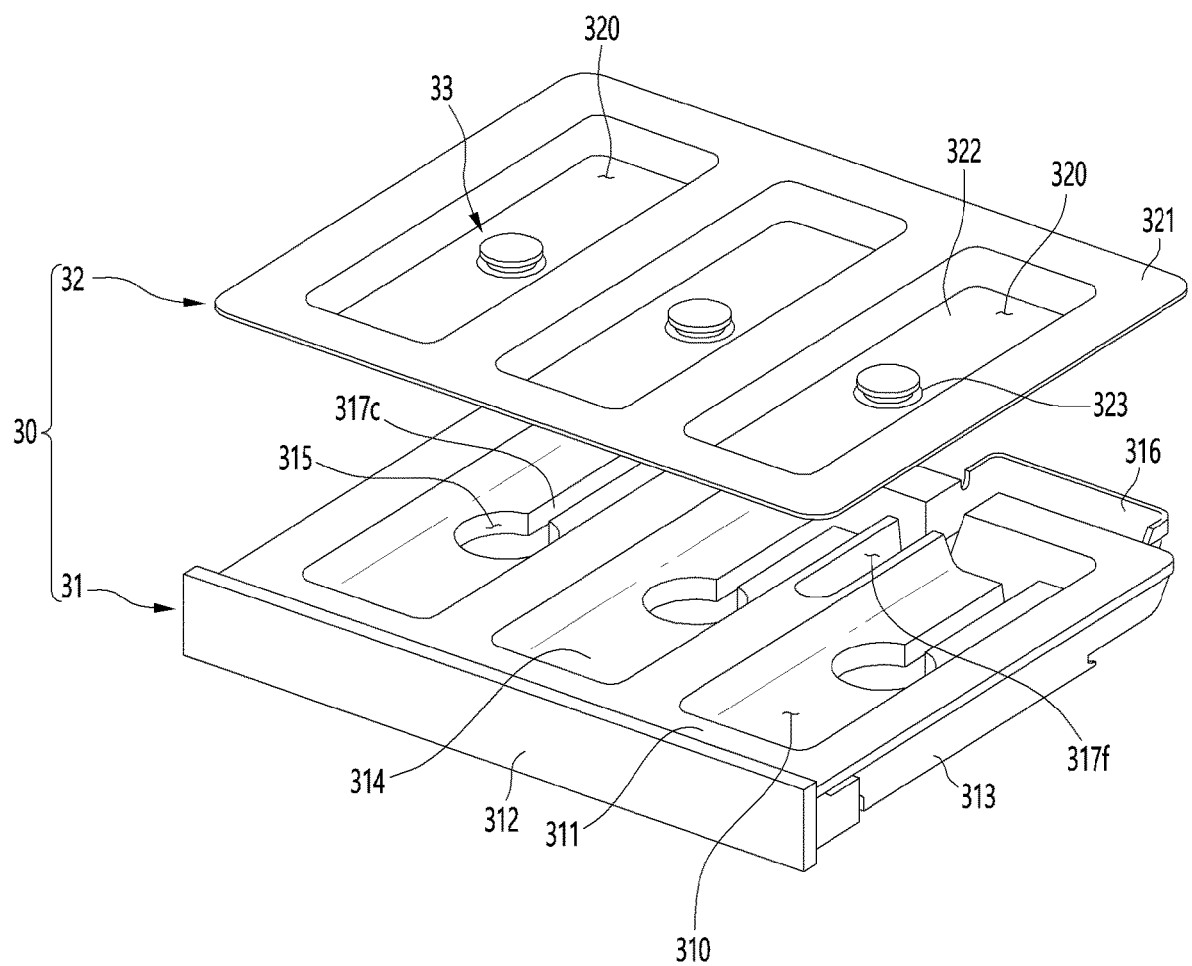
FIG. 9 is an exploded perspective view of the cultivation shelf.
Figure 10:
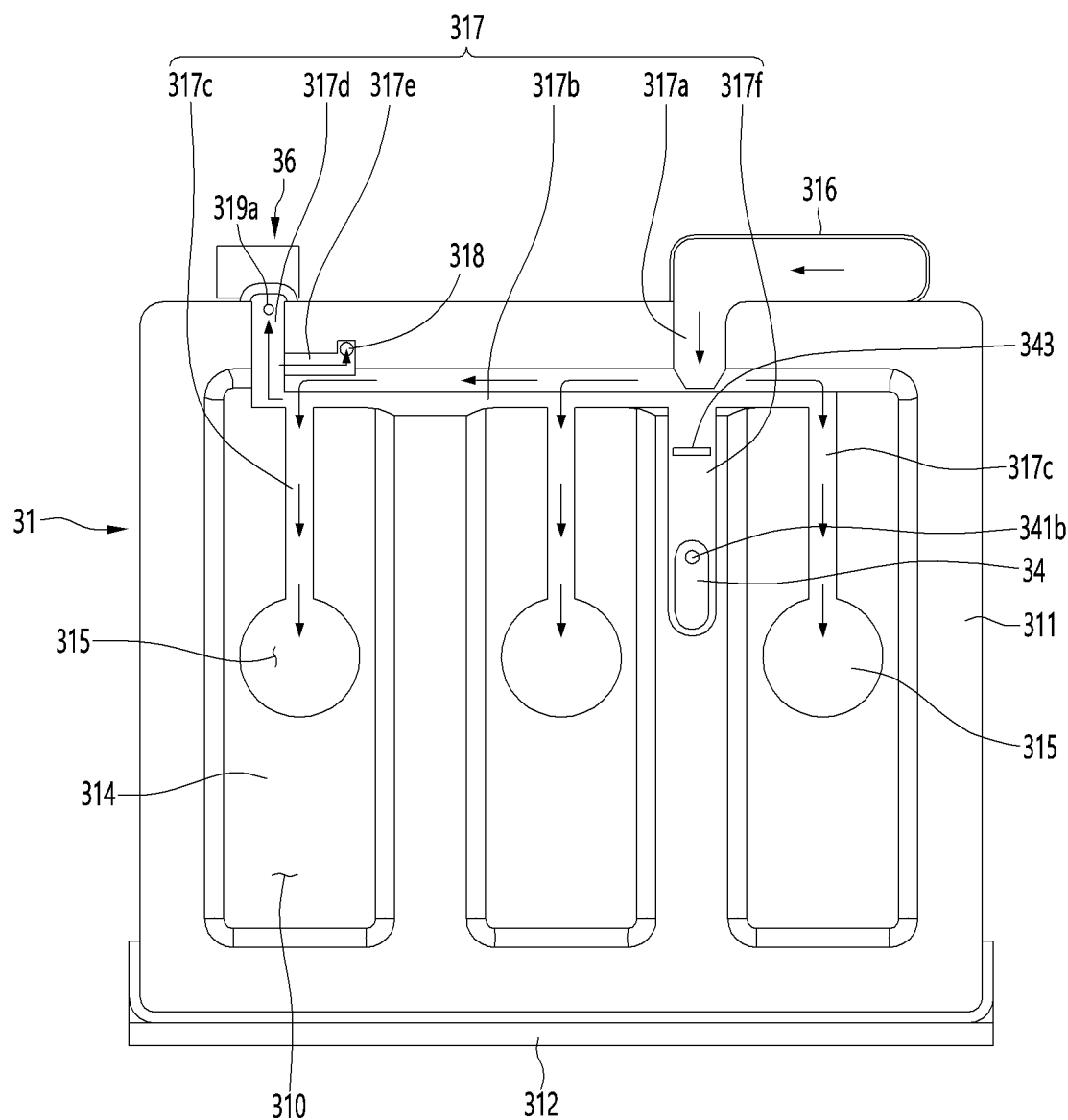
FIG. 10 is a plan view of a shelf base which is one component of the cultivation shelf.
Figure 11:
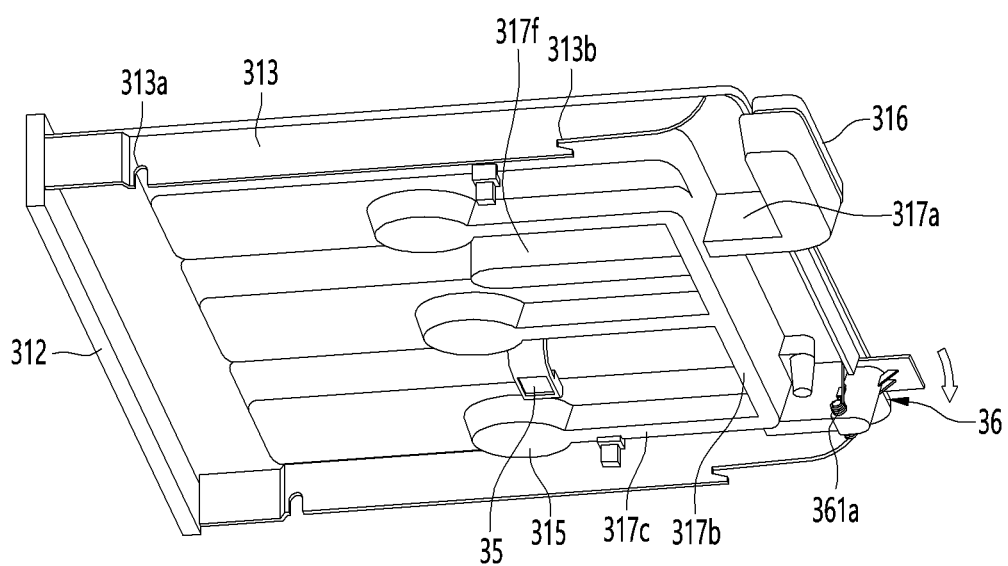
FIG. 11 is a bottom perspective view of the cultivation shelf.

FIG. 8 is a perspective view illustrating the cultivation shelf of the plant cultivation apparatus. FIG. 9 is an exploded perspective view of the cultivation shelf. FIG. 10 is a plan view of a shelf base which is one component of the cultivation shelf. FIG. 11 is a bottom perspective view of the cultivation shelf.

As illustrated in the drawings, the cultivation shelf 30 may be configured so that the plurality of the seed packages 90 are seated, and the water supplied from the water tank 70 may be supplied to the seed packages 90. The cultivation shelf 30 may include a shelf tray 32 on which the seed package 90 is mounted, and a shelf base 31 that accommodates water supplied to the seed package 90. The shelf tray 32 may be seated on the shelf base 31 to define an outer appearance of the top surface of the cultivation shelf 30.

The shelf tray 32 may be made of a metal material to have an excellent and clean outer appearance. For example, the shelf tray 32 may be made of a stainless material to be resistant to contamination and to facilitate cleaning and management.

The shelf tray 32 may be mounted in a state of overlapping a top surface of the shelf base 31 and may be provided in a shape corresponding to the top surface shape of the shelf base 31. The shelf tray 32 may be provided in a rectangular shape when viewed from above. Also, the shelf tray 32 may include a tray top surface 321 that defines an outer appearance of the top surface as a whole and a seating portion 320 recessed from the tray top surface 321. The seating portion 320 may be referred to as a tray seating portion to be distinguished from a base seating portion 310 of the shelf base 31.

The seating portion 320 may be recessed in a shape corresponding to the seed package 90 so that the seed package 90 is seated. A plurality of seats 320 may be provided so that the plurality of the seed packages 90 is seated in separate spaces, respectively. For example, three seats 320 may be arranged side by side in a lateral or leftward and rightward direction.

The seating portion 320 may accommodate the entire bottom surface of the seed package 90. The seating portion bottom surface 321 may have a size and shape corresponding to those of the container bottom surface 911 of the seed package 90. Thus, when the seed package 90 is seated on the seating portion 320, the container bottom surface 911 may be in surface contact with the seating portion bottom surface 321. In this state, even if water is supplied by opening the shutter 33, the water may not be permeated between the bottom surface 911 of the container and the bottom surface 322 of the seat.

The shutter 33 may be provided at a center of the bottom surface 322 of the seat. One shutter 33 may be provided for each of the plurality of seats 320. The shutter 33 may move vertically to allow the water accommodated in the shelf base 31 to be selectively introduced. The shutter 33 may be referred to as a water supply member because it enables selective water supply to the seating portion 320.

The shutter 33 may operate according to the mounting of the seed package 90. That is, the shutter 33 may be maintained in closed state inside the seating portion 320, on which the seed package 90 is not mounted, among the plurality of seats 320 and may be maintained in an open state at the seating portion 320, on which the seed package 90 is mounted, so that the water is introduced to be supplied to the seed package 90. That is, the shutter 33 may be configured to selectively supply the water to the seating portion 320, on which the seed package 90 is mounted, among the plurality of seats 320 according to whether the seed package 90 is mounted.

The shutter 33 may be disposed at a position facing the water inlet 912 of the seed package 90, and when the seed package 90 is seated on the seating portion 320, a portion of the shutter 33 may be accommodated inside the water inlet 912, and a bottom surface of the water inlet 912 may press a top surface of the shutter 33 so that the shutter 33 operates. The structure of the shutter 33 and the interaction between the shutter 33 and the water inlet 912 will be described hereinafter.

The shelf base 31 may be provided below the shelf tray 32. The shelf base 31 may be configured to allow water supplied from the water tank 70 to flow and be stored and may have a top surface shape corresponding to a bottom surface shape of the shelf tray 32 so that the shelf tray 32 is seated.

The shelf base 31 may include a base top surface 311 on which the shelf tray 32 is mounted and a base seating portion 310. A handle 312 for the withdrawal of the cultivation shelf 30 may be provided on a front surface of the shelf base 31, and a base side surface 313 coupled to the shelf rail for the withdrawal of the cultivation shelf 30 may be provided at each of both lateral or left and right sides of the shelf base 31. As the base side surface 313 may be coupled to the shelf rail 16, the base side surface 213 may be referred to as a rail coupling portion. A front coupling portion 313a and a rear coupling portion 313b, which are coupled to the shelf rail 16, may be disposed on the base side surface 313, and the shelf base 31 may be detachably coupled to the shelf rail 16.

The base seating portion 310 may be disposed inside the base top surface 311. The base seating portion 310 may have a shape corresponding to that of the seating portion 320, and a bottom surface of the base seating portion 310, that is, the base bottom surface 314 may be in surface contact with the seating portion bottom surface 322. Thus, the base seating portion 310 and the seating portion 320 may be in a state in which the bottom surfaces are in close contact with each other to be maintained in stably mounted state, and thus, the water may be effectively supplied to the seed package 90.

A shutter accommodation portion 315 may be provided at a center of each of the plurality of base seating portions 310. The shutter accommodation portion 315 may be disposed at a position corresponding to the state shutter 33 mounted on the shelf tray 32.

The shutter accommodation portion 315 may be provided in a circular shape to accommodate a lower portion of the shutter 33. Also, the shutter accommodation portion 315 may define a recessed space to ensure vertical movement of the shutter 33 without interfering with the shutter 33 when the shutter 33 moves vertically.

The water supply portion 316 may be disposed at one side (right side in FIG. 10) of the left and right sides of the rear end of the shelf base 31. The water supply portion 316 may protrude backward and be recessed to receive water supplied through the water supply tube 84.

A drain hole 319a and an opening/closing member 36 that opens and closes the drain hole 319a may be provided on the other side (left side in FIG. 10) of the left and right sides of the rear end of the shelf base 31. The opening/closing member 36 protrudes backward and rotates according to an operation of drive device (drive) 86 to open and close the drain hole 319a.

The shelf base 31 may be provided with a base passage 317, through which water flows, on the shelf base 31. The base passage 317 may connect all of the water supply portion 316, the shutter accommodation portion 315, the water level detection portion 317f, the drain hole 319a, and the drain portion 318 to each other. In addition, the base passage 317 may guide the water supplied to the shelf base 31 so as to be effectively supplied to the seed package 90 and drained after the water supply is completed.

The base passage 317 may include a water supply guide portion (water supply guide) 317a, a branch portion 317b, a connection portion 317c, and a drain guide portion (drain guide) 317d. The water supply guide portion 317a may connect the water supply portion 316 to the branch portion 317b. In addition, the branch portion 317b may be disposed along rear ends of the seats 320 disposed on the shelf base 31. The branch portion 317b may pass through all of the plurality of seats 320, and one end of the branch portion 317b may be connected to the drain guide portion 317b. Also, the drain guide portion 317d may be connected from one end of the branch portion 317b to the drain hole 319a.

A plurality of connection portions 317c may be disposed on the branch portion 317b. The plurality of connection portions 317c may be provided for each of the base seats 310 and may be connected to the shutter accommodation portion 315 of the base seating portion 310.

While water is supplied to the water supply portion 316 and until the set time elapses before the start of the drainage, the opening/closing member 36 may be closed, and the drain hole 319a may be maintained in the closed state. Thus, a state in which the base passage 317 including the shutter accommodation portion 315 is filled with water may be maintained.

The base passage 317 may further include a water level detection portion 317f. The water level detection portion 317f may be configured to prevent water supply above a full water level into the shelf base from occurring and may be configured so that full water level detection member 34 is disposed in the water level detection portion 317f.

A shelf detection member 35 may be provided at one side of the bottom surface of the shelf base 31. The shelf detection member 35 may be configured to detect that the cultivation shelf 30 is completely inserted and may be provided at a position corresponding to shelf detection device (shelf detector) 48 disposed below the cultivation shelf 30.

In this embodiment, the lower lighting device 40b may be provided below the upper cultivation shelf 30a, and the shelf detection device 48 may be disposed on the lower lighting device 40b. Also, the water tank 70 and the pump cover 81 may be provided below the lower cultivation shelf 30b, and the shelf detection device 48 may be disposed on a top surface of the pump cover 81, which is a position corresponding to the shelf detection member 35.

The base passage 317 may include the drain guide portion 317e. The drain guide portion 317e may connect the branch portion 317b to the drain portion 318.

A height of the drain guide portion 317e may be greater than the full water level, which is detected by the water level detection member 34, and less than a height of the base top surface 311 of the shelf base 31. Thus, even if a water level detection device (water level detector) 49 fails to detect the full water level due to a failure, water may be naturally discharged through the drain portion 318. Thus, the water level of the cultivation shelf 30 may not rise above the limit water level in any case, and the phenomenon in which the water supplied to the cultivation shelf 30 overflows to flow down or contaminates the cultivation space 100 may be prevented fundamentally.

Hereinafter, an arrangement of the water level detection member 34 will be described in more detail with reference to the drawings.

Figure 12:
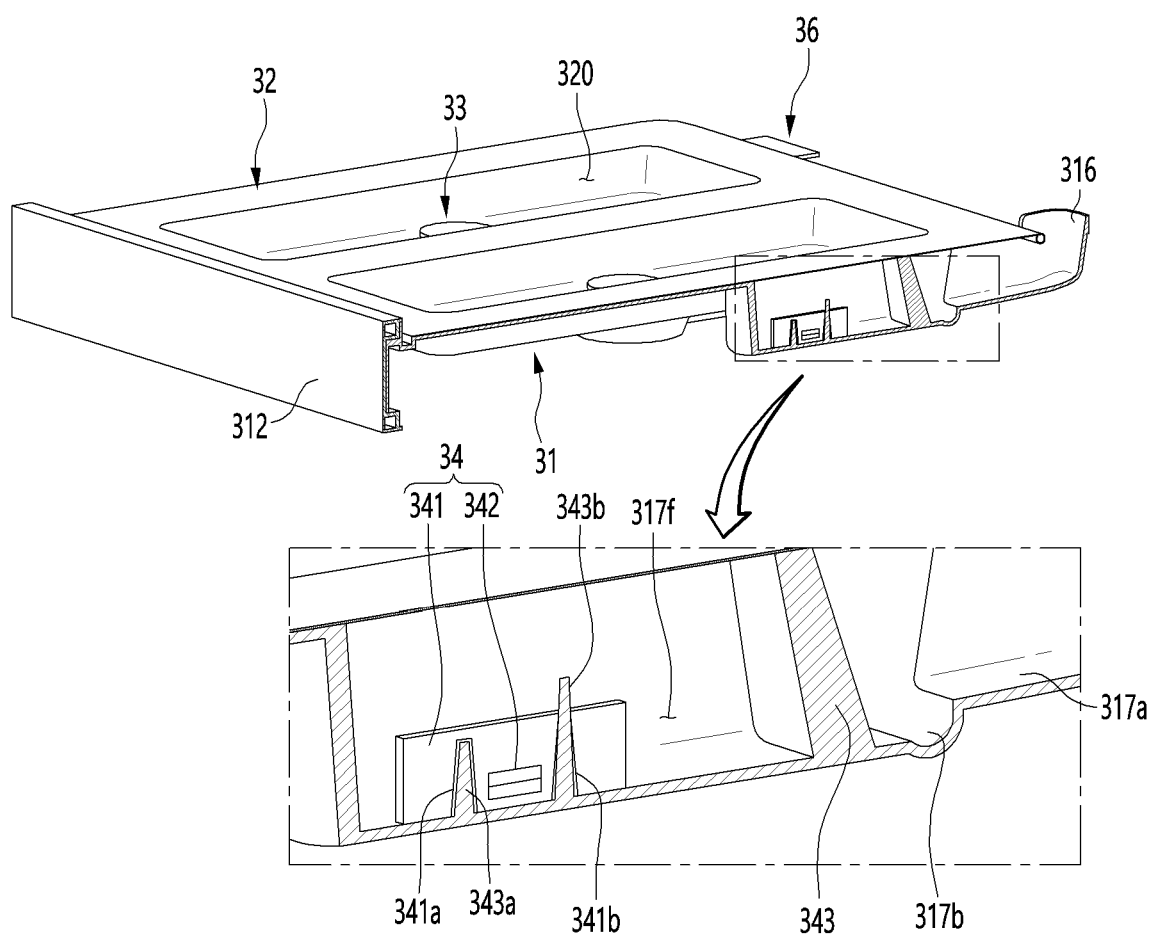
FIG. 12 is a cutaway perspective view, taken along line XII-XII' of FIG. 8.

FIG. 12 is a cutaway perspective view, taken along line XII-XII' of FIG. 8. As illustrated in the drawing, when the shelf tray 32 is mounted, the water level detection portion 317f may be disposed at a position that does not interfere with the seating portion 320. Therefore, the water level detection portion 317f may be disposed at one side of the top surface 311 of the base and also has to be close to the water supply portion 316 to immediately detect that water is supplied above the full water level. The water level detection portion 317f may be disposed at a position that is close to the water supply portion 316 in a space between the base seating portions 310.

Also, the water level detection portion 317f may extend to a position at which the water level detection device 49 disposed under the cultivation shelf 30 is disposed. Thus, the water level detection member 34 may be disposed at a position facing the water level detection device 49 to accurately determine the water level of the cultivation shelf 30.

A detection member guide 343 may protrude from the water level detection portion 317f. The detection member guide 343 may extend upward from the bottom of the water level detection portion 317f and may be disposed further behind the water level detection member 34 to prevent the water level detection member 34 from being separated by the water introduced into the water level detection portion 317f.

In addition, a guide protrusion that guides vertical movement of the water level detection member 34 may be disposed on the water level detection portion 317f. The guide protrusion may include a first guide protrusion 343a and a second guide protrusion 343b. The first guide protrusion 343a and the second guide protrusion 343b may protrude upward from the bottom of the water level detection portion 317f and may be inserted into the bottom surface of the water level detection member 34.

The first guide protrusion 343a and the second guide protrusion 343b may be spaced apart from each other in a frontward and rearward direction and may protrude at different heights. For example, the first guide protrusion 343a may protrude at a height lower than the top surface of the water level detection member 34, and the second guide protrusion 343b may protrude more than the first guide protrusion 343a. The second guide protrusion 343b may pass through the water level detection member 34 to further protrudes upward, thereby guiding the vertical movement of the water level detection member 34 and preventing the water level detection member 34 from being separated even in a full water level state.

The water level detection member 34 may include a detection member case 341 and a magnet 342. The detection member case 341 may define an outer appearance of the water level detection member 34 and may be made of a material having buoyancy capable of floating in water. Thus, the water level detection member 34 may be referred to as a floating member or a floater.

A first guide hole 341A and a second guide hole 341b may be defined in a bottom of the detection member case 341. The first guide hole 341A may be defined at a position corresponding to the first guide protrusion 343a. The first guide hole 341A may be recessed upward so that the first guide protrusion 343a is inserted into the first guide hole 341A.

In addition, the second guide hole 341b may be defined at a position corresponding to the second guide protrusion 343b. The second guide hole 341b may pass through the detection member case 341 so as to be penetrated by the second guide protrusion 343b.

Thus, even in a state in which the water level detection member 34 moves vertically according to a change in water level, the water level detection member 34 may stably move in a vertical direction.

A magnet of the water level detection member 34 may be provided inside the detection member case 341 and may be disposed between first guide hole 341A and second guide hole 341b. In addition, the water level detection device 49 may be configured to detect a change in magnetic field to determine a vertical height of the water level detection member 34 and determine a water level of the cultivation shelf 30.

When water is supplied to the cultivation shelf 30, the water level detection member 34 may move upward according to the water level of the cultivation shelf 30 and then gradually move away from the bottom surface of the water level detection portion 317f. In addition, the water level detection device 49 may detect that the strength of the magnetic field gradually decreases as the water level detection member 34 moves away therefrom.

When the water level detection device 49 detects that the water level of the cultivation shelf 30 is above the abnormal water level which is equal to or higher than the full water level, the water to the cultivation shelf 30 may be controlled to be stopped.

Hereinafter, a structure of the shutter 33 will be described in more detail with reference to the drawings.

Figure 13:
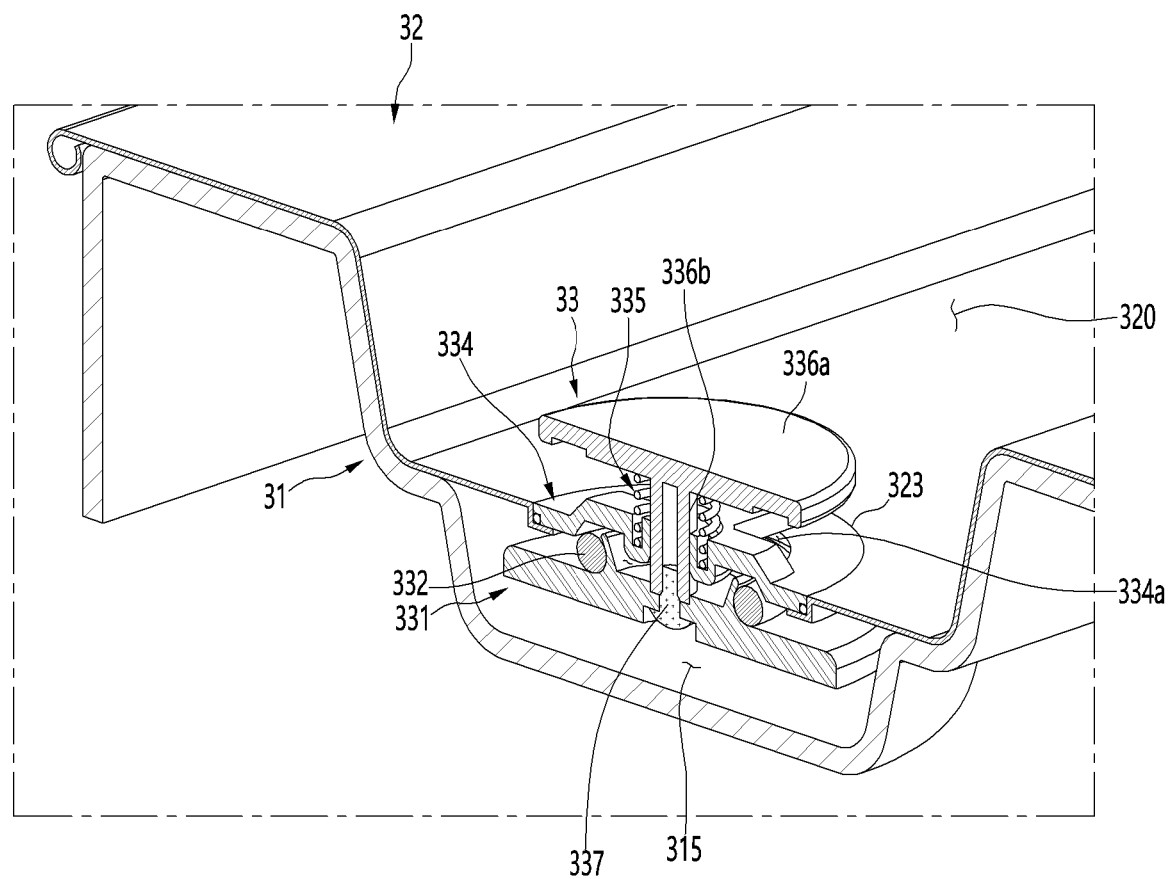
FIG. 13 is a cutaway perspective view, taken along line XIII-XIII' of FIG. 8.
Figure 14:
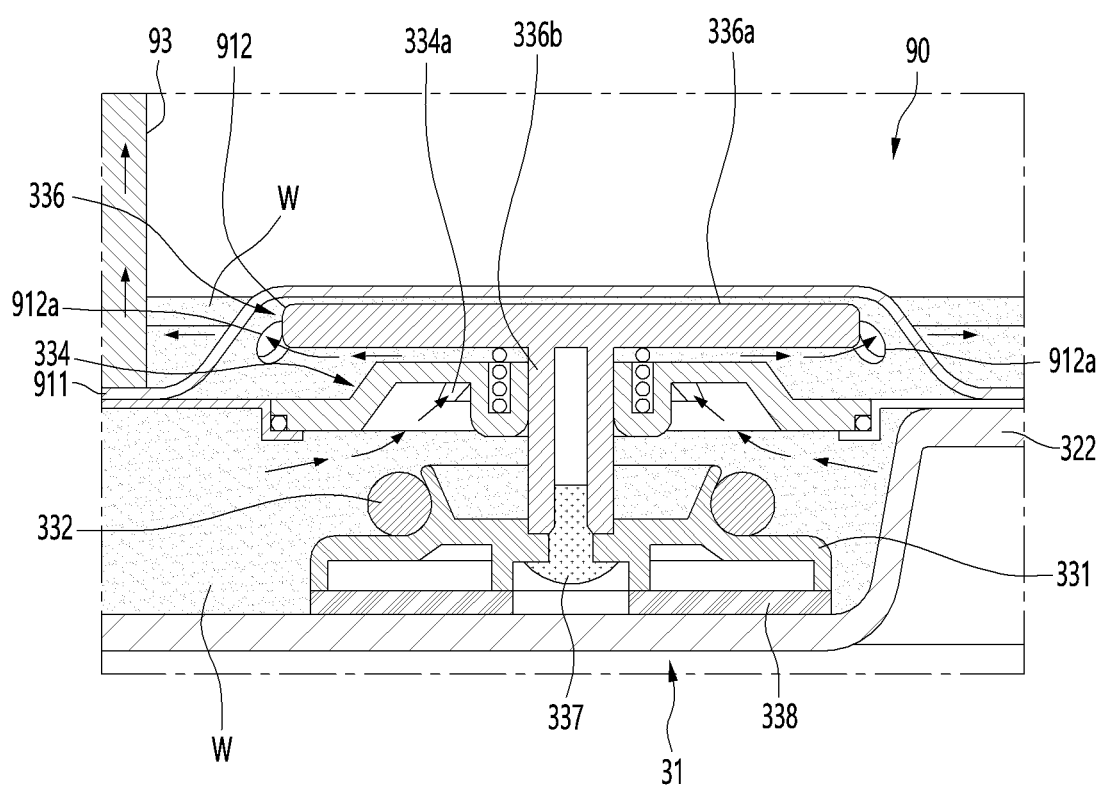
FIG. 14 is a view illustrating a state in which water is supplied to the seed package.

FIG. 13 is a cutaway perspective view, taken along line XIII-XIII' of FIG. 8. FIG. 14 is a view illustrating a state in which water is supplied to the seed package.

As illustrated in the drawings, water supplied to the water supply portion 316 may flow through the base passage 317 and then be supplied into the shutter accommodation portion 315 via the water supply guide portion 317a, the branch portion 317b, and the connection portion 317c. In addition, the shutter 33 may be provided inside the seating portion 320 that is recessed in the shelf tray 32. Also, the shutter 33 may be provided at a position corresponding to the shutter accommodation portion 315 disposed on the shelf base 31. Thus, components of the shutter 33, which are disposed at the lower side with respect to the seating portion bottom surface 322, may be disposed inside the shutter accommodation portion 315, and the components of the shutter 33, which are disposed at the upper side with respect to the seating portion bottom surface 322, may protrude to be in contact with the seed package 90 seated on the seating portion 320.

The shutter 33 may be maintained in a state mounted on the seating portion 320 and may operate according to the mounting of the seed package 90 so that water supplied to the shelf base 31 is selectively supplied to the seating portion 320 and the seed package 90. As the shutter 33 determines water supply into the seat, the shutter 33 may be referred to as a water supply device or an opening/closing device.

The shutter 33 may include a shutter member 331 that moves vertically inside the shutter accommodation portion 315, a communication member 334 in which an opening opened and closed by the shutter member 331 is defined, and a pressing member 336 protruding from the seating portion bottom surface 322 and elevated by the contact with the seed package 90.

The shutter member 331 may have a size that is capable of being accommodated inside the shutter accommodation portion 315 to cover a plurality of communication holes 334a defined in the communication member 334 from below. The shutter member 331 may be provided in a disk shape when viewed from below, and a screw 337 may be coupled to a center of the shutter member 331. The screw 337 may pass through the shutter member 331 and be coupled to a boss portion 336b of pressing member 336. Thus, the shutter member 331 and the pressing member 336 may be integrally coupled to each other and may move vertically together.

The shutter member 331 may have a flat bottom surface. Thus, when the shutter accommodation portion 315 is filled with water, a bottom surface of the shutter member 331 may be in contact with a water surface, and thus, buoyancy may be effectively applied upward. More particularly, the shutter member 331 may be made of a material having buoyancy by which the shutter member 331 is capable of being floated in water, and when the shutter accommodation portion 315 is filled with water, the shutter member 331 may move upward according to the water level. For example, the shutter member 331 may be made of a foam material, such as Styrofoam.

A sealing member 332 may be provided on a top surface of the shutter member 331. The sealing member 332 may be provided in the same shape as an O-ring and may be disposed to be in contact with the bottom surface of the communication member 334 when the shutter member 331 moves upward. When the shutter member 331 moves upward so that the sealing member 332 is in contact with the communication member 334, water supplied to the shelf base 31 may not be supplied to the seating portion 320.

A spring 335 may be provided between the communication member 334 and the pressing member 336. Therefore, the spring 335 may maintain the closed state of the shutter 33 even when water is not accommodated inside the shutter accommodation portion 315, and when the pressing member 336 moves downward, the spring 335 may be compressed. That is, when the seed package 90 is removed from the seating portion 320 in the state in which the seed package 90 is seated, the pressing member 336 may move upward due to a restoring force of the spring 335, and the shutter 33 may be maintained in the closed state.

The pressing member 336 may include a contact portion 336a that protrudes from the inside of the seating portion 320 and is in contact with the seed package 90 and a boss portion 336b extending downward from a center of the contact portion 336a. The pressing member 336 and the shutter member 331 may open and close the communication hole 334a while moving in the vertical direction based on the communication member 334 in a state of being coupled to each other and also may selectively supply water to the seed package 90.

When water is supplied to the water supply portion 316 of the cultivation shelf 30, the water may be supplied along the base passage 317 of the shelf base 31, and also, the water may be supplied to all the shutter accommodation portions 315 provided in the cultivation shelf 30. That is, regardless of whether the seed package 90 is mounted, water may be supplied to all the shutter accommodation portions 315 of the cultivation shelf 30.

All of the plurality of shutter accommodation portions 315 may be filled by driving the pump 82, and the shutter 33 may move upward by the water W filled in the shutter accommodation portions 315. The shutter member 331 may generate buoyancy due to the water W filled in the shutter accommodation portion 315, and thus, the shutter 33 may move upward.

A separate buoyancy member 338 made of a material having buoyancy force may be further coupled to the bottom surface of the shutter member 331. That is, the shutter member 331 may be made of a plastic material, and the buoyancy member may be made of a material having buoyancy that is capable of being floated in water and then be mounted on the bottom surface of the shutter member 331 to move upward by the water filled into the shutter accommodation portion 315. Due to such a structure, durability of the shutter member 331 may be provided, and the buoyancy force for the movement of the shutter member 331 may be provided.

When the shutter accommodation portion 315 is fully filled with water, the shutter member 331 may be raised to a maximum height, and the sealing member 332 may be in contact with the communication hole 334a, and thus, the shutter 33 may be in the closed state. When the shutter 33 is closed, circumferences of the communication holes 334a may be airtight due to the sealing member 332, and thus, the water inside the seating portion 320 may not be supplied. In the state in which the seed package 90 is not mounted on the cultivation shelf 30, the shutter 33 may be maintained in the closed state, and water may not be supplied to the inside of the seating portion 320.

The seed package 90 may be mounted on the cultivation shelf 30 for cultivation of the plants. Also, water may be supplied into the seating portion 320 and the seed package 90 when water is supplied to the seating portion 320, on which the seed package 90 is seated, among the plurality of seats 320.

When the seed package 90 is seated on the seating portion 320, the pressing member 336 of the shutter 33 may be disposed inside the water inlet 912 of the seed package 90, and the pressing member 336 may be pressed by a top surface of the water inlet 912. As the pressing member 336 moves, the shutter member 331 connected to the pressing member 336 may also move downward, and the shutter 33 may be opened. That is, the shutter member 331 may move to a bottom surface of the shutter accommodation portion 315, and the sealing member 332 may be spaced apart from the communication member 334 so that the water supplied to the cultivation shelf 30 is introduced into the seating portion 320 through the communication hole 334a.

In addition, water discharged through the communication hole 334a may be supplied into the seed package 90 through container opening 912a defined along a circumference of water inlet 912. The container opening 912a may be disposed at a side that is spaced apart from the communication hole 334a and may be defined along the circumference of the communication hole 334a. Thus, the water discharged radially through the communication hole 334a may be supplied into the container 91 through the container opening 912a.

The water introduced into the seed package 90 may be supplied to the seed accommodation member 93 within the seed package 90, and the seed accommodation member 93 may absorb the supplied water to supply the water to seeds or plants inside the seed accommodation member 93. In the state in which the water is supplied to the cultivation shelf 30, the opening/closing member 36 may be maintained in the closed state for a set or predetermined period of time. In addition, after a time for which a sufficient amount of water is absorbed into the seed or plant has elapsed, drive device 86 may operate. When the drive device 86 operates, the opening/closing member 36 may rotate about opening/closing member rotational shaft 361a to open drain hole 319a, and the water of the cultivation shelf 30 may be discharged through the drain hole 319a.

As the seed package 90 is mounted, the shutter 33 may be maintained in the open state. Thus, the water inside the seed package 90 may be drained through the container opening 912a of the water inlet 912 to flow into the shutter accommodation portion 315 through the communication hole 334a of the seating portion 320.

As a result, the water inside the cultivation shelf 30 as well as the water inside the seed package 90 may be discharged through the base passage 317 to the drain hole 319a. The water discharged through the drain hole 319a may be collected to the water tank 70 through the drain tray 85 and the drain tube 87. When the drainage inside the cultivation shelf 30 is completed, the opening/closing member 36 may be returned to its initial position by the operation of the drive device 86 to close the drain hole 319a.

As described above, the inside of the seed package 90 as well as the cultivation shelf 30 may be maintained without water except for a certain time period after the water supply. Thus, mold or green algae, for example, may be prevented from being generated on the cultivation shelf 30, and thus, the clean state may be maintained.

Hereinafter, the lighting device 40 will be described with reference to the drawings.

Figure 15:
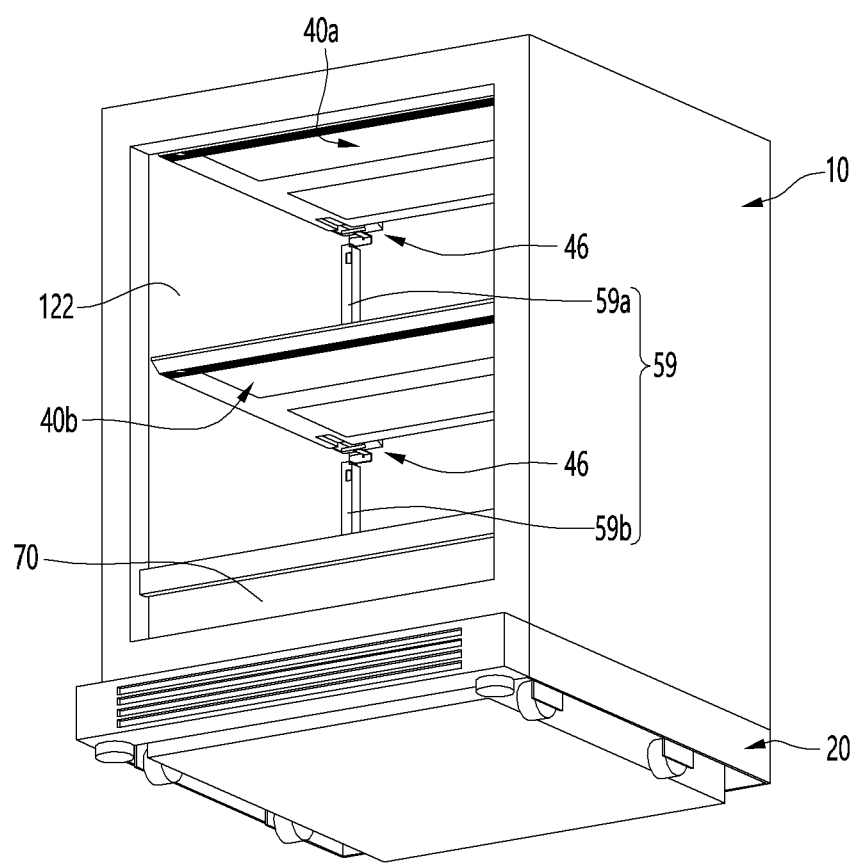
FIG. 15 is a perspective view illustrating a state in which a lighting device of the plant cultivation apparatus is mounted.
Figure 16:
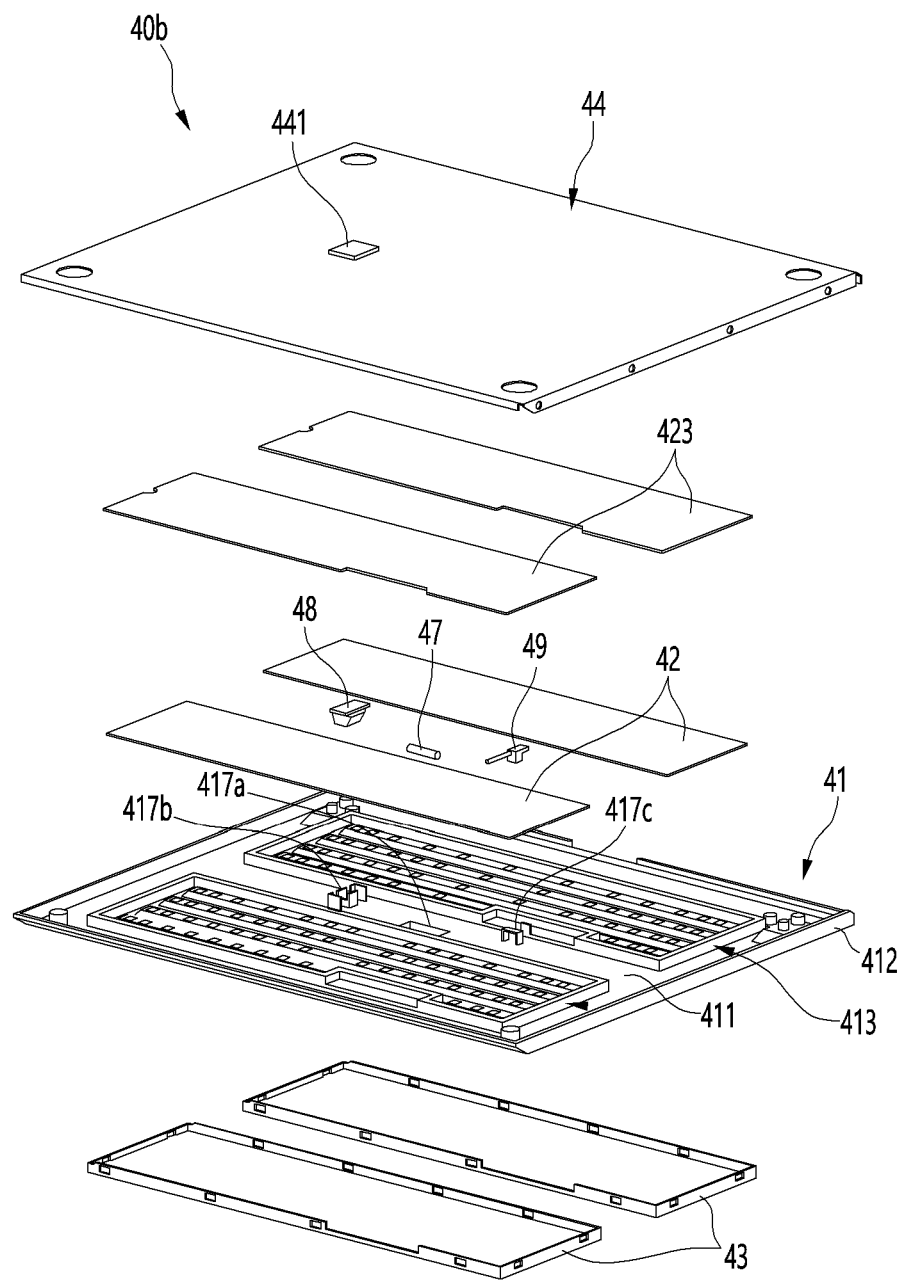
FIG. 16 is an exploded perspective view of the lighting device.

FIG. 15 is a perspective view illustrating a state in which the lighting device of the plant cultivation apparatus is mounted. FIG. 16 is an exploded perspective view of the lighting device.

As illustrated in the drawings, the lighting device 40 may be disposed inside the cultivation space 100. The lighting device 40 may include upper lighting device 40 that irradiates light to the upper cultivation shelf 30a and lower lighting device 40 that irradiates light to the lower cultivation shelf 30b. The upper lighting device 40 may be disposed on the top surface of the cultivation space 100, and the lower lighting device 40 may be disposed on the bottom surface of the upper cultivation shelf 30a. In addition, the lighting device 40 may be disposed to face the cultivation shelf 30.

The lighting device 40 may be seated on lighting brackets 46 disposed on both side plates 122 and then be mounted inside the cabinet 10. The lighting bracket 46 may protrude from each of both sides of the rear surface of the cultivation space 100 to support a rear end of the lighting device 40 from below.

A screw may be coupled upward to each of both lateral or left and right sides of a front end of the lighting device 40, and the screw may pass through the lighting device 40 and be coupled to the top plate 123 or the upper cultivation shelf 30a. Due to this structure, when an operator mounts the lighting device 40 in the cabinet 10, the lighting device 40 may be inserted to an upper side of the bracket support 462 to support the rear end of the lighting device 40, and the screw may be coupled to the front end of the lighting device 40 to easily fix the lighting device.

Hereinafter an internal structure of the lighting device 40 will be described with reference to the drawings.

As illustrated in the drawing, the lower lighting device 40a may include a light case 41 in which an LED module 42 is mounted, a light cover 43 that shields the LED module 42 and transmits light, and a case cover 44 that shields a top surface of the light case 41. The light case 41 may include a bottom surface 411 that defines a surface exposed downward and has a rectangular plate shape, and a case edge 412 that is bent upward along a circumference of the bottom surface 411 and defines a space in which the LED module 42 is accommodated therein.

The light case 41 may include a module mounting portion 413 at a front portion and a rear portion with respect to a center of the bottom surface 411. The module mounting portion 413 may be a portion on which the LED module 42 is mounted and may be configured so that a plurality of LED modules 42 is mounted.

The module mounting portion 413 may be provided so that the LED module 42 is accommodated therein. That is, a circumference of the module mounting portion 413 may be provided in a shape corresponding to a circumference of the LED module 42 and may protrude upward from the bottom surface 411 to define a space in which the LED module 42 is accommodated. In addition, the light cover 43 may be mounted on an open bottom surface of the module mounting portion 413 to shield the LED module 42.

The light case 41 may include a temperature sensor mounting portion 417a in which a temperature sensor 47 is mounted between front module mounting portion 415 and rear module mounting portion 416, a water level detection device mounting portion 417c on which the water level detection device 49 is mounted, and a shelf detection device mounting portion 417b on which a shelf detection device (shelf detector) 48 is mounted.

The LED module 42 may be configured so that a plurality of LEDs 422 is mounted on a substrate 421. In addition, the plurality of the LEDs 422 may be continuously arranged at regular intervals on the substrate 421.

A cover sheet 423 may be provided above the LED modules 42. The cover sheet 423 may prevent moisture from penetrating into the substrate 421 or prevent the substrate 421 from being damaged.

A case cover 44 may be provided above the light case 41. The case cover 44 may have a size corresponding to that of the light case 41 and may be provided in a plate shape to shield the open top surface of the light case 41.

A detection portion 441 protruding upward may be disposed on the case cover 44. The detection portion 441 may protrude upward from a position corresponding to the shelf detection device 48 to allow the shelf detection device 48 to be disposed therein.

The upper lighting device 40a may be provided on the top surface of the cultivation space 100 and may be mounted to be in close contact with the top plate 123.

Thus, the case cover 44 may be unnecessary for the upper lighting device 40a, and when the upper lighting device is mounted, the open top surface of the light case 41 may be shielded by the top plate 123. In addition, the upper lighting device 40a may have the same structure as each of the light case 41 except for the case cover 44, the LED module 42, and the light cover 43.

Hereinafter, structures of the upper lighting device 40a and the inlet duct 15 connected to the upper lighting device 40a will be described with reference to the drawings.

Figure 17:
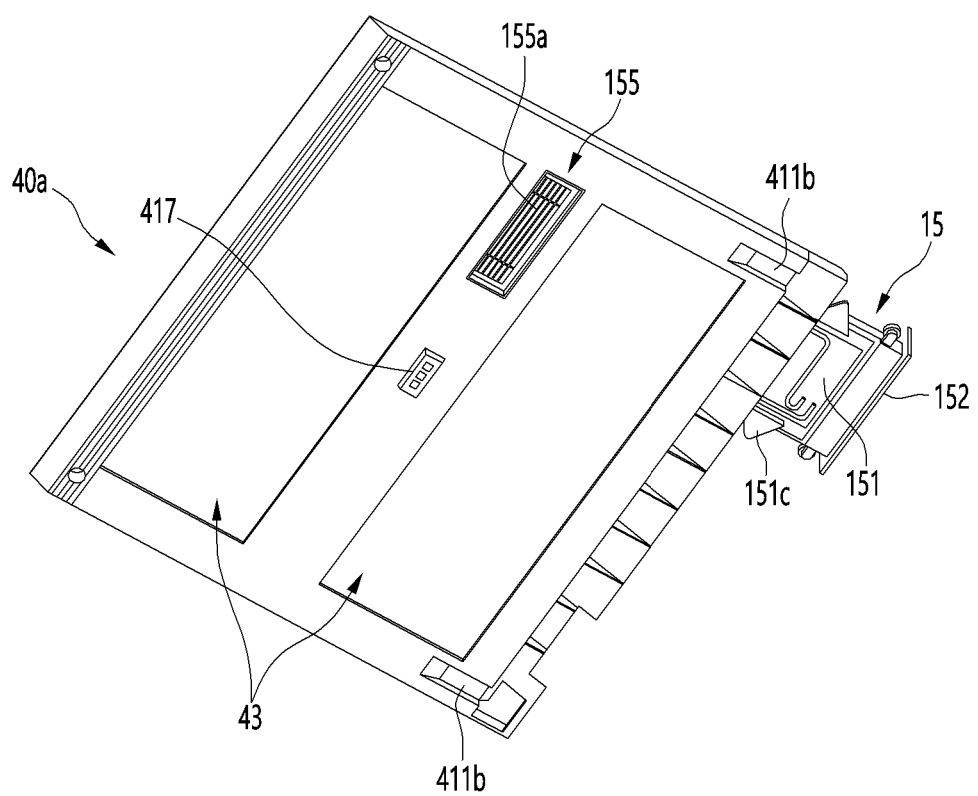
FIG. 17 is a bottom perspective view illustrating a state in which an upper lighting device and an inlet duct are coupled to each other.
Figure 18:
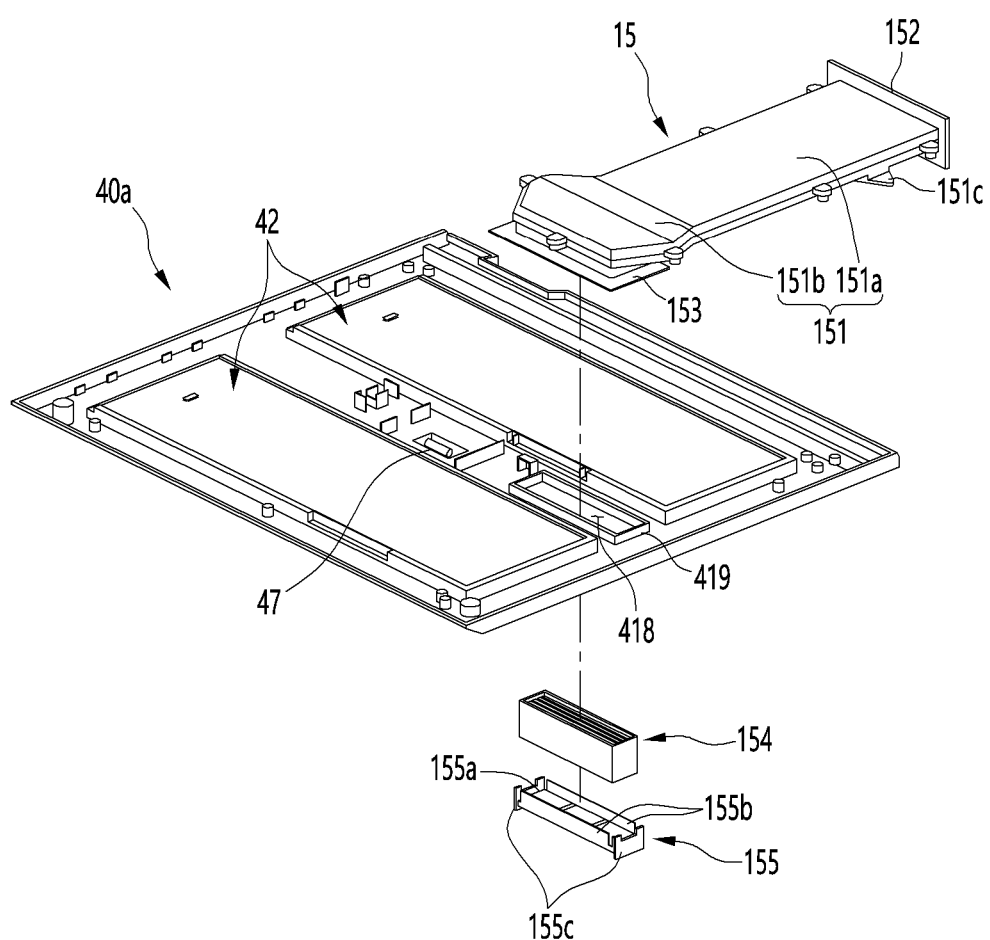
FIG. 18 is an exploded perspective view of the upper lighting device and the inlet duct.
Figure 19:
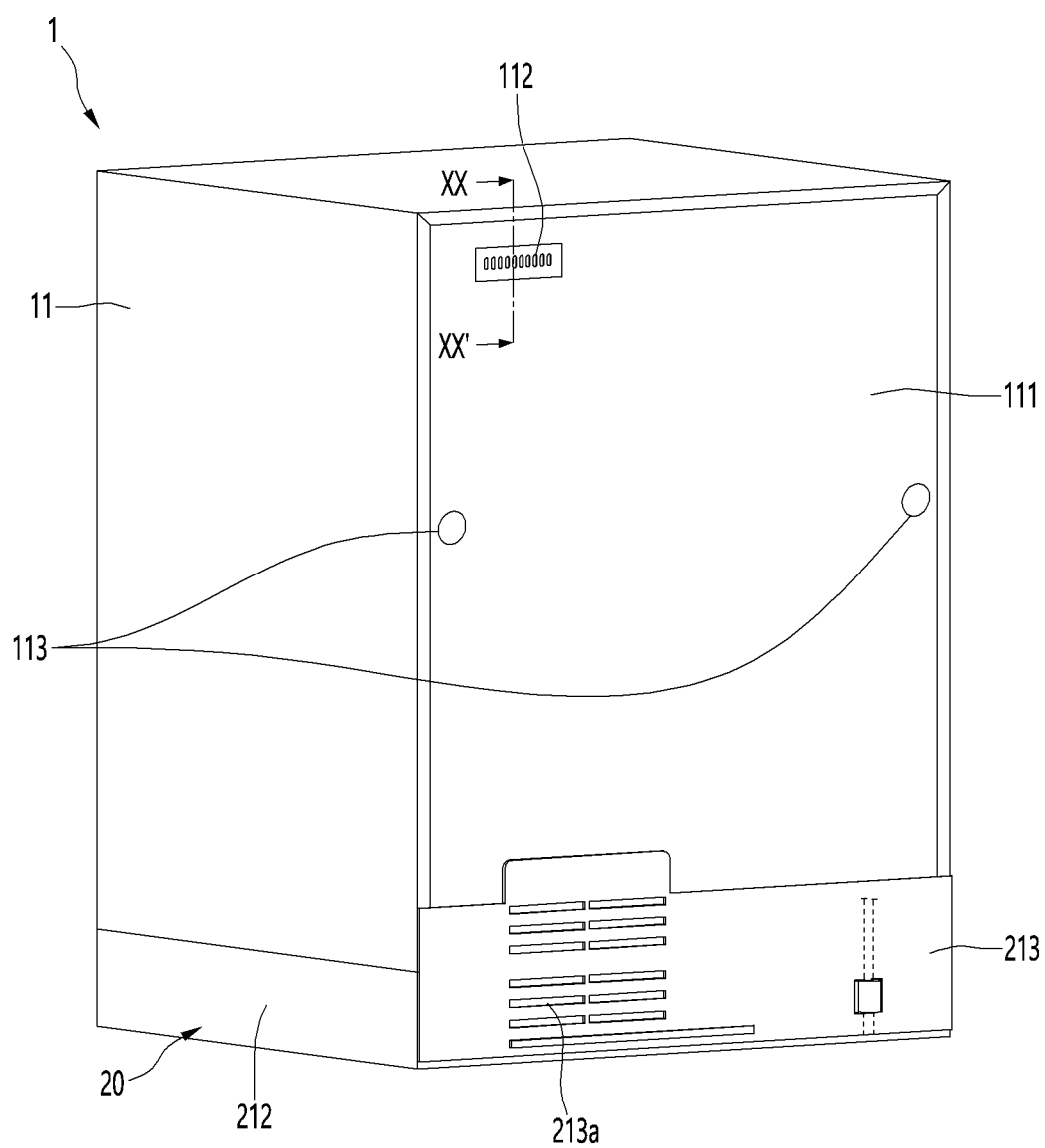
FIG. 19 is a rear perspective view of the plant cultivation apparatus.
Figure 20:
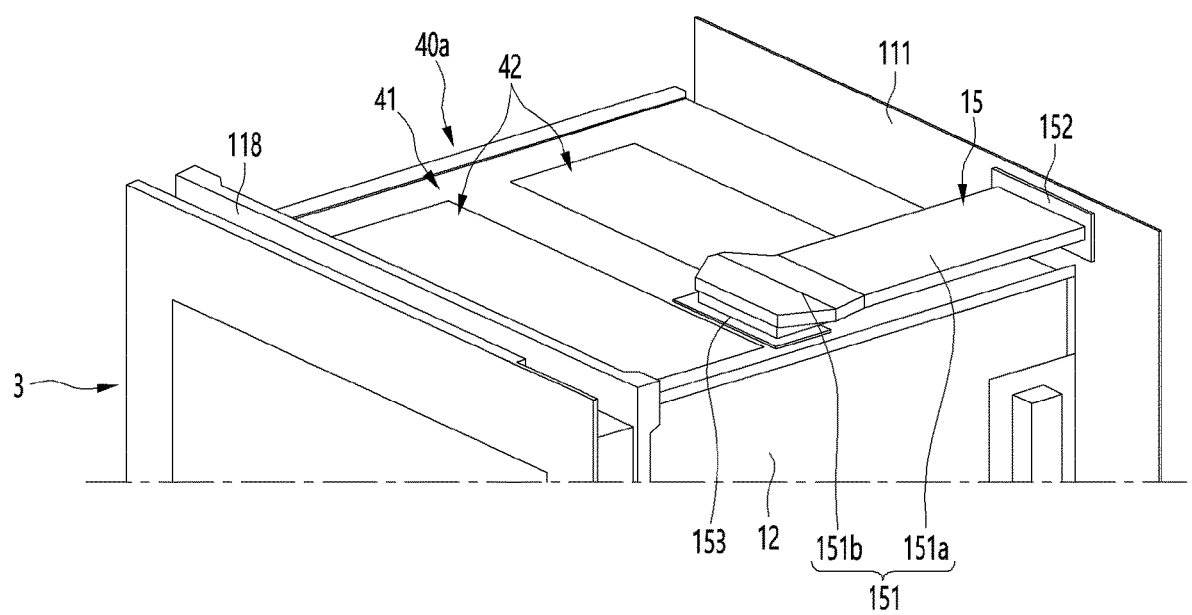
FIG. 20 is a perspective view illustrating a state in which an outer case of the plant cultivation apparatus is removed to mount the inlet duct.
Figure 21:
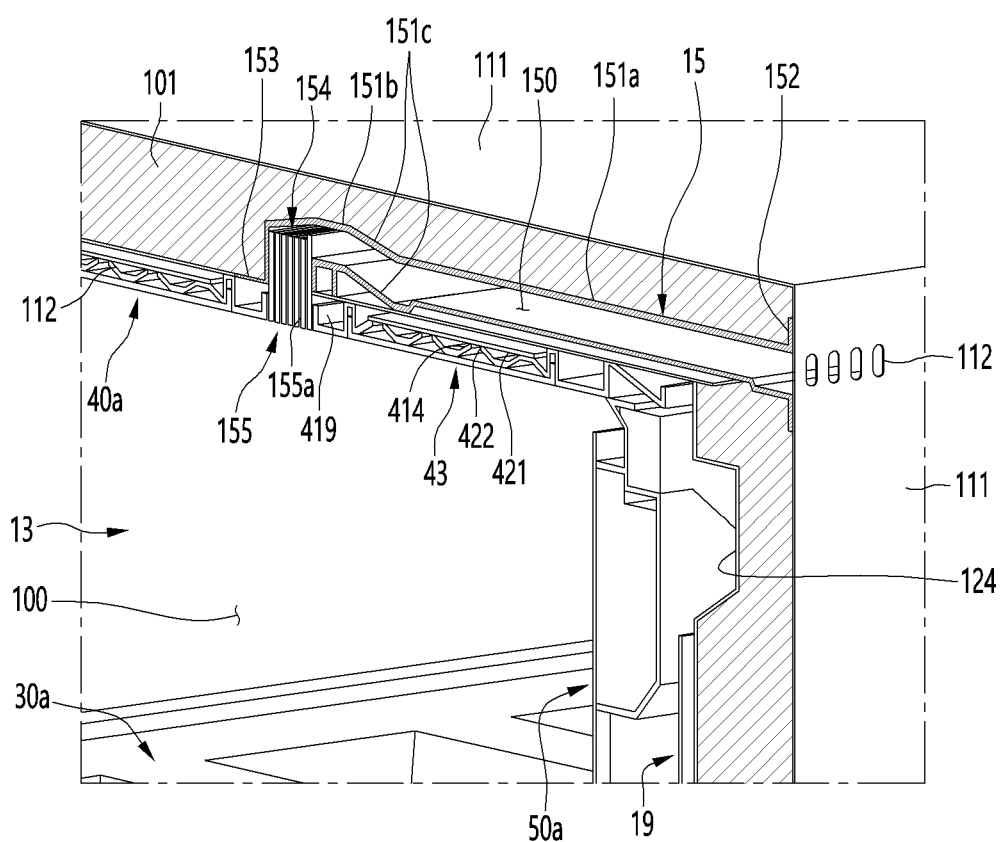
FIG. 21 is a cutaway perspective view, taken along line XXI-XXI' of FIG. 19.

FIG. 17 is a bottom perspective view illustrating a state in which the upper lighting device and the inlet duct are coupled to each other. FIG. 18 is an exploded perspective view of the upper lighting device and the inlet duct. FIG. 19 is a rear perspective view of the plant cultivation apparatus. FIG. 20 is a perspective view illustrating a state in which the outer case of the plant cultivation apparatus is removed to mount the inlet duct. FIG. 21 is a cutaway perspective view, taken along line XXI-XXI' of FIG. 19.

As illustrated in the drawings, the upper lighting device 40a may include a light case 41, and a pair of LED modules 42 may be mounted on the light case 41. The LED modules 42 may be disposed in the frontward and rearward direction with respect to a center of the light case 41. In addition, each of the LED modules 42 may be shielded by the light cover 43.

In addition, a temperature sensor 47 may be mounted at the center of the light case 41. As a separate cultivation shelf 30 is not disposed above the upper light device 40a, the water level detection device 49 and the shelf detection device 48 may not be provided on the light case 41.

The inlet duct 15 may be connected to the upper lighting device 40a. A filter opening 418 may be defined at one side of a central portion of the light case 41. The filter opening 418 may be provided in a size through which the inlet filter 154, which will be described hereinafter, is accessible. The filter opening 418 may be defined at one side of the temperature sensor 47 and may be disposed between the pair of the LED modules 42.

In addition, an opening edge 419 extending upward along a circumference of the filter opening 418 may be provided. The opening edge 419 may communicate with an outlet of the inlet duct 15 and may allow a filter cover 155 described hereinafter to be fixedly mounted. Thus, the user may easily open and close the filter cover 155 through the cultivation space 100, and replacement and installation of the inlet filter 154 may be facilitated.

The inlet duct 15 may communicate with the inside and outside of the cultivation space 100 to provide a passage or path through which external air is introduced into the cultivation space 100 and may be disposed to pass through heat insulating material 101 within the cabinet 10. In addition, the inlet duct 15 may supply carbon dioxide by introducing external air into the cultivation space 100. Thus, the inlet duct 15 may be referred to as an inflow passage or an inflow path.

The inlet duct 15 may provide a passage connecting a rear surface of the cabinet 10 to a bottom surface of the upper lighting device 40a to allow external air to be introduced into the cultivation space 100. Even in a state in which a separate fan is not provided for the inflow of the external air, the inflow of the external air may be naturally performed by a negative pressure generated by operation of the blower 50 or operation of an exhaust fan 171 inside the cultivation space 100.

The inlet duct 15 may include a duct body 151 having a hollow therein to provide an air flow passage. The duct body 151 may include a duct extension portion 151a extending forward from a rear end of the inlet duct 15, and a filter accommodation portion 151b extending from a front end of the duct extension portion 151a up to the filter opening 418.

A rear edge 152 bent outward may be disposed at an open rear end of the duct extension portion 151a, and the rear edge 152 may be disposed to be in contact with the back plate 111. Thus, the rear end of the inlet duct 15 may be fixed to the back plate 111. In addition, a heat insulating material injection hole 113 into which the heat insulating material 101 is injected may be defined in the back plate 111.

In addition, an external air inlet 112 may be provided in the back plate 111 corresponding to the rear end of the inlet duct 15. A plurality of the external air inlet 112 may be provided and may be disposed inside an open area at the rear end of the inlet duct 15. Thus, air outside the cabinet 10 may be introduced into the inlet duct 15 through the external air inlet 112. The external air inlet 112 may be disposed in the rear surface of the cabinet 10 so as not to be exposed to the outside, thereby preventing an outer appearance from being deteriorated. In addition, the external air inlet 112 may be disposed to be away from the bottom, thereby minimizing inflow of dust, foreign substances, and pests, for example.

In addition, a duct fixing portion 151c for fixing the inlet duct 15 may protrude from each of both sides of the duct extension portion 151a. A screw may be coupled to the duct fixing portion 151c, and the screw may pass through the duct fixing portion 151c and be coupled to the light case 41 to maintain a position at which the inlet duct 15 is mounted.

An inlet filter 154 may be provided at an end of the inlet duct 15 to block foreign substances in the air introduced through the inlet duct 15. The filter accommodation portion 151b may extend from a front end of the duct extension portion 151a to an upper side of the filter opening 418 and may further protrude upward so that the inlet filter 154 is accommodated. In addition, a lower end of the filter accommodation portion 151b may communicate with the filter opening 418.

The filter accommodation portion 151b may be disposed to face upward as it extends forward from the duct extension portion 151a, and an inclined or rounded guide surface 151c may be provided on an inner surface of the filter accommodation portion 151b so that the air introduced to the inside of the filter accommodation portion 151b from the duct extension portion 151a is guided to face upward. Thus, the flow of air may be guided to the upper side of the inlet filter 154 accommodated inside the filter accommodation portion 151b, and the air flowing along the inside of the inlet duct 15 may be guided to effectively pass through the inlet filter 154.

A front edge 153 bent outward may be disposed on an open lower end of the filter accommodation portion 151b. The front edge 153 may be in close contact with the light case 41, and thus, the external air flowing through the inlet duct 15 may be introduced into the cultivation space 100 through the filter opening 418.

The opening edge 419 may be inserted into the open lower end of the filter accommodation portion 151b. In addition, the inlet filter 154 may be accommodated inside the filter accommodation portion 151b. The inlet filter 154 may be, for example, a high-efficiency particulate absorbing (HEPA) filter. Thus, the inlet filter may filter not only external foreign substances, but also mold that is capable of being grown by being introduced into the cultivation space 100. Thus, while supplying carbon dioxide necessary for the plant growth into the cultivation space 100, factors that may cause odor and contamination, such as mold, may be prevented from being introduced.

In addition, a filter cover 155 may be mounted on the filter opening 418 so that the inlet filter 154 is maintained in the mounted state. The filter cover 155 may include a filter grill 155a defining a bottom surface. The filter grill 155a may support the inlet filter 154 from below, and a plurality of openings may be defined so that air passing through the inlet filter 154 is introduced into the cultivation space 100.

A cover extension portion 155b may extend upward around the filter grill 155a. The cover extension portion 155b may be in contact with a circumferential surface of the inlet filter 154 to define a space in which the inlet filter 154 is inserted and mounted. Thus, when the filter cover 155 is separated from the filter opening 418, the inlet filter 154 may be separated while being mounted on the filter cover 155.

A cover restriction portion 155c may be further disposed on each of both sides of the filter cover 155. The cover restriction portion 155c may be hooked on the filter opening 418 and may be maintained in state in which the filter cover 155 is mounted on the filter opening 418. In addition, the cover restriction portion 155c may be provided to be elastically deformable and may be manipulated to separate the filter cover 155.

Figure 22:
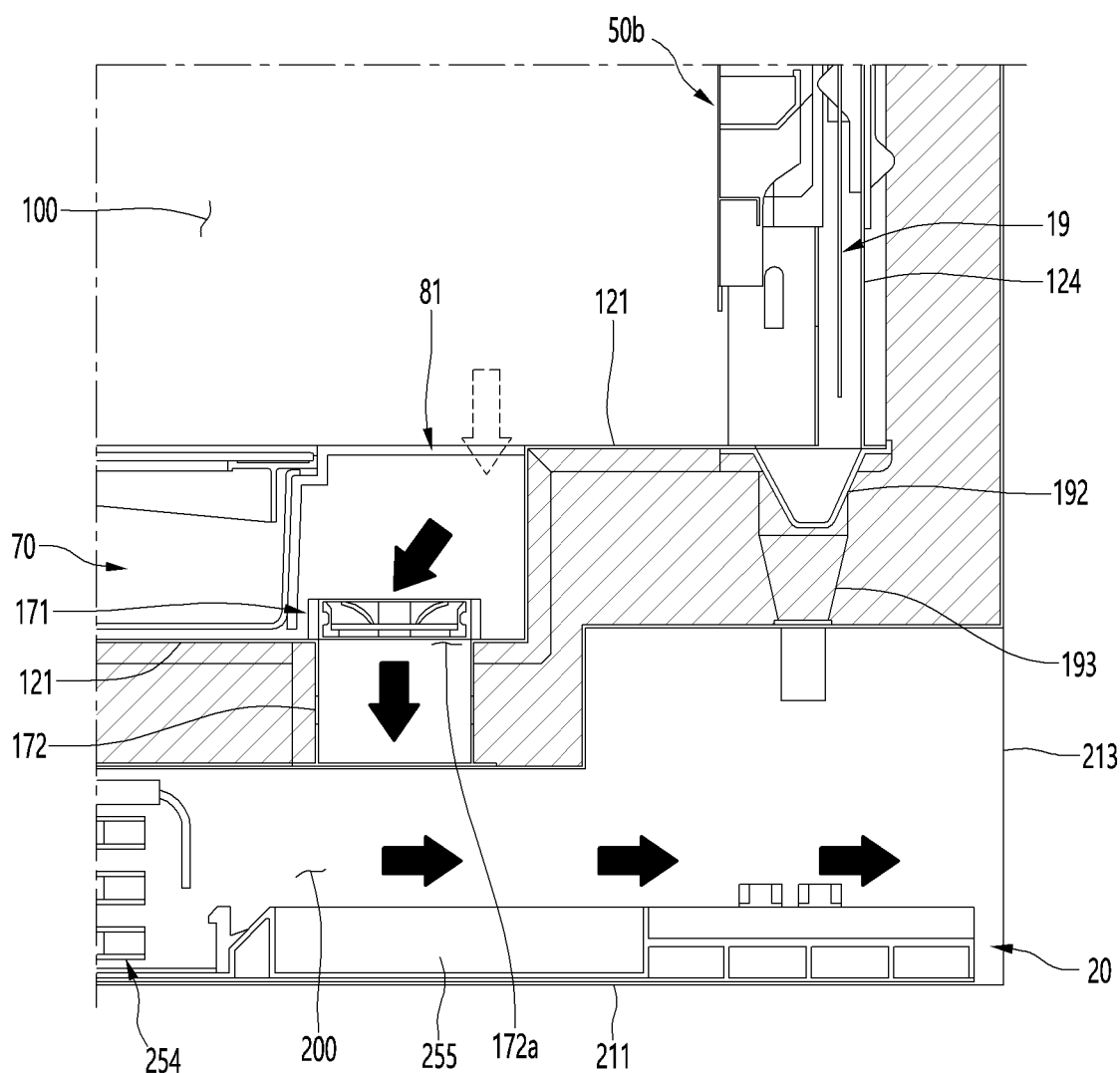
FIG. 22 is a cross-sectional view illustrating an arrangement of the outer duct of the plant cultivation apparatus.

FIG. 22 is a cross-sectional view illustrating an arrangement of the outer duct of the plant cultivation apparatus. As illustrated in the drawing, the cabinet 10 may be provided with an outlet duct 172 for discharging the air of the cultivation space 100 to the outside. The external air may be introduced into the cultivation space 100 by inlet duct 15 and the outlet duct 172 to supply the carbon dioxide that is necessary for the plant growth, and the air inside the cultivation space 100 may be discharged to adjust humidity of the cultivation space 100.

The inside of the cultivation space 100 may have excessively high humidity due to moisture generated by a transpiration action of the cultivated plants. Thus, the humidity may be controlled through the inflow of the external air through the inlet duct 15 and the discharge of the air inside the cultivation space 100 through outlet duct 172. In addition, the cultivation space 100 may be ventilated through periodic discharging of the air inside the cultivation space 100, and fresh air may be smoothly introduced.

An exhaust fan 171 may be provided at one side of the outlet duct 172. The exhaust fan 171 may allow the air in the cultivation space 100 to be discharged to the outside via the machine room 200. The exhaust fan 171 may be disposed in a space covered by the pump cover 81 so as to be prevented from being exposed to the outside. In addition, the exhaust fan 171 may be provided on a bottom surface of the cultivation space 100 adjacent to the machine room 200 so that the exhaust is performed more smoothly.

The bottom surface of the cultivation space 100 and the top surface of the machine room 200 may be connected to each other by the outlet duct 172. The outlet duct 172 may pass through the heat insulating material 101 of the bottom surface of the cabinet 10. Thus, the outlet duct 172 may be referred to as a discharge passage or a discharge path.

The open top surface of the outlet duct 172, that is, an inlet of the outlet duct 172 may communicate with a cultivation space outlet (reference numeral 172a in FIG. 25) provided in the bottom plate 121 defining the bottom surface of the cultivation space 100. In addition, the exhaust fan 171 may be provided at the cultivation space outlet 172a. Thus, when the exhaust fan 171 is driven, the air in the cultivation space 100 may be effectively discharged into the machine room 200 through the outlet duct 172.

The open bottom surface of the outlet duct 172, that is, the outlet of the outlet duct 172 may communicate with the top surface of the machine room 200, and the condenser 254 may be disposed in the inner space of the machine room 200 and also may communicate with a space, in which the condenser 254 is disposed, in the inner space of the machine room 200 to connect the cultivation space 100 to the machine room 200 by the shortest distance.

The outlet duct 172 may communicate with a suction-side of a heat dissipation fan 252. The air introduced into the machine room 200 through the heat dissipation fan 252 may be exhausted to the outside through the grill outlet 222 of the grill cover 200 through the compressor 253.

Figure 23:
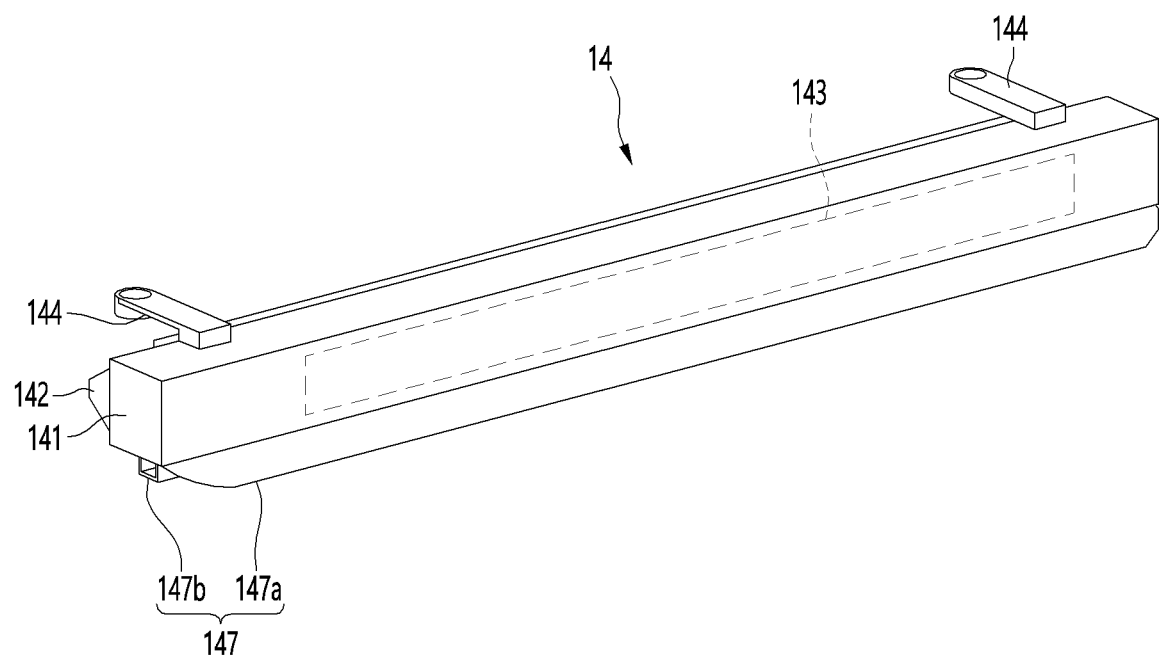
FIG. 23 is a perspective view illustrating a display device of the plant cultivation apparatus.
Figure 24:
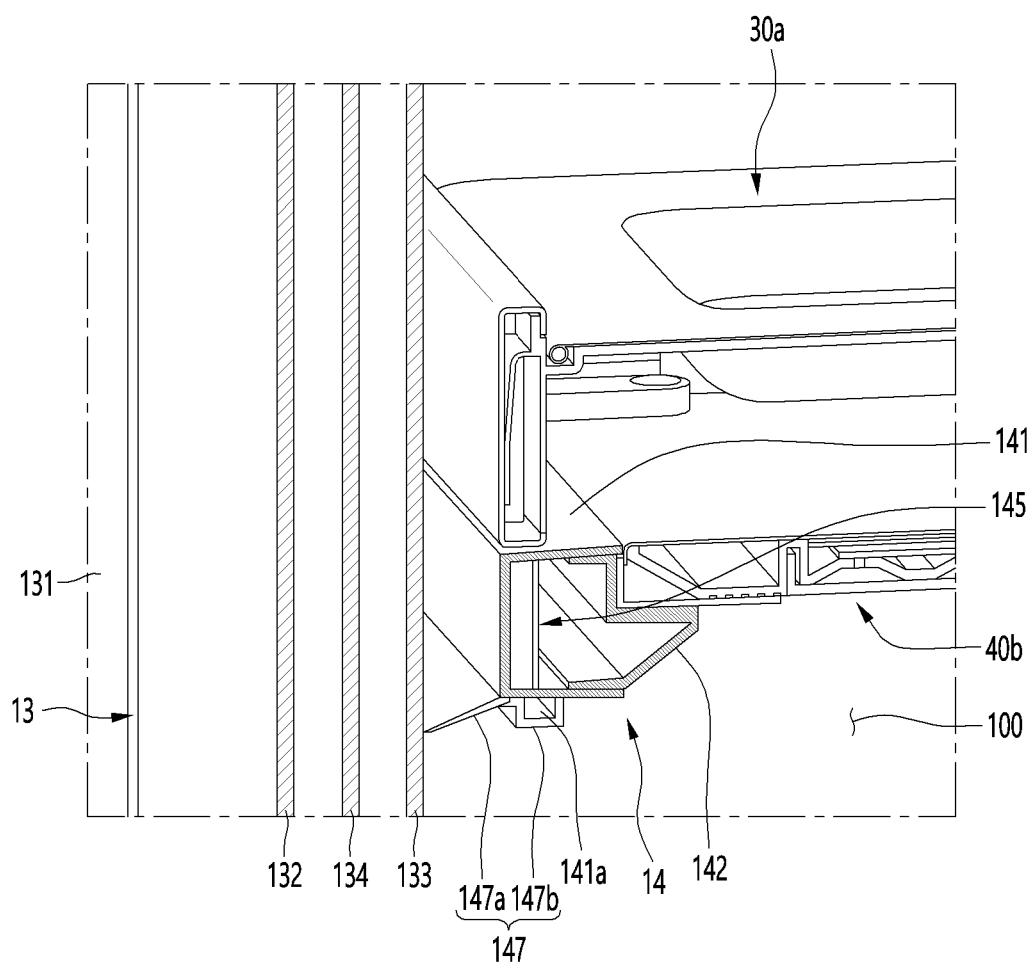
FIG. 24 is a cutaway perspective view illustrating a state in which the display device is mounted.

FIG. 23 is a perspective view illustrating a display device of the plant cultivation apparatus. FIG. 24 is a cutaway perspective view illustrating a state in which the display device is mounted.

As illustrated in the drawing, display device (display) 14 may be provided on the bottom surface of the upper cultivation shelf 30 and the front end of the lower lighting device 40. The display device 14 may be configured to indicate an operation state of the plant cultivation apparatus 1 and to manipulate the operation of the plant cultivation apparatus 1. An outer appearance of the lighting device 40 may be defined by coupling the front case 141 to the rear case 142, and a printed circuit board (PCB) 145 on which a touch sensor and an LED are mounted may be disposed inside the front case 141 and the rear case 142.

The front case 141 may be provided in a hexahedral shape with an open rear surface and may be elongated in a horizontal direction. In addition, the open rear surface of the front case 141 may be shielded by the rear case 142.

In a state in which the display device 14 is mounted, the front surface of the front case 141 may be disposed on the same plane as the front surface of the upper cultivation shelf 30a and also be provided to have a vertical width and horizontal width corresponding to the front surface of the upper cultivation shelf 30a, thereby providing an overall sense of unity.

A manipulation portion 143 may be disposed on the front surface of the front case 141. In addition, the PCB 145 may be provided on the rear surface of the front case 141, and a touch sensor or button may be provided to correspond to a corresponding position, thereby detecting touching of the manipulation portion 143 when touching the manipulation portion 143.

Thus, the user may control an operation of the plant cultivation apparatus 1 through manipulation of the manipulation portion 143. In addition, an output device (output) for indicating the operation of the plant cultivation apparatus 1 may be further provided on the front surface of the front case 141. The output device may be configured as a light emitting means, such as an LED, or may be configured as a display, such as an LCD panel.

A display mounting portion 144 may be disposed at each of lateral or left and right sides of the top surface of the front case 141. The display mounting portion 144 may extend backward and may be coupled to a top surface of the lighting device 40.

The rear case 142 may shield the open rear surface of the front case 141 to define an outer appearance of a rear surface of the display device 14. The rear case 142 may protrude backward, and a rear end of the rear case 142 may be in close contact with the lighting device 40.

A gasket barrier 147 may be disposed on the display device 14. The gasket barrier 147 may be configured to partition the cultivation space 100 and may be in contact with a rear surface of the door 13 in a state in which the door 13 is closed so that the cultivation space 100 is divided vertically.

The gasket barrier 147 may be made of an elastically deformable material, such as rubber or silicone, and may extend from the display device 14 to the rear surface of the door 13. In addition, the gasket barrier 147 may extend from one end to the other end of the display device 14.

The gasket barrier 147 may include a rib portion 147a and a mounting portion 147b. The rib portion 147a may extend forward so that a front end thereof is in contact with a rear panel 133 of the door 13. Further, the rib portion 147a may have a thinner thickness as it extends forward and may be disposed to face downward as it extends forward. Thus, when the door 13 is closed, the rib portion 147a may be deformed while being pressed by the rear surface of the door 13 and then may be in close contact with the rear surface of the door 13.

The mounting portion 147b may be coupled to the display device 14 and may allow the gasket barrier 147 to be fixedly mounted. The mounting portion 147b may extend backward from a rear end of the rib portion 147a so as to be coupled to the front case 141.

A rib mounting protrusion 141a that protrudes downward may be disposed on a bottom surface of the front case 141, and the mounting portion 147b may be disposed so that the rib mounting protrusion 141a is inserted therein. The gasket barrier 147 may be fixedly mounted to the front case 141, and the rib portion 147a may protrude forward in a mounted state. Alternatively, if necessary, the gasket barrier 147 may be provided at the front end of the cultivation shelf 30 or the lighting device 40.

When the front end of the gasket barrier 147 is in contact with the rear panel 133 while the door 13 is closed, the space of the upper cultivation shelf 30a and the lower cultivation shelf 30b may be partitioned. In addition, the space in which the upper cultivation shelf 30a is disposed and the space in which the lower cultivation shelf 30b is disposed may be separated from each other, and temperatures of each may be controlled independently by independent operations of the blower 50 and the heater 18.

Hereinafter, blower 50 will be described with reference to the drawings.

Figure 25:
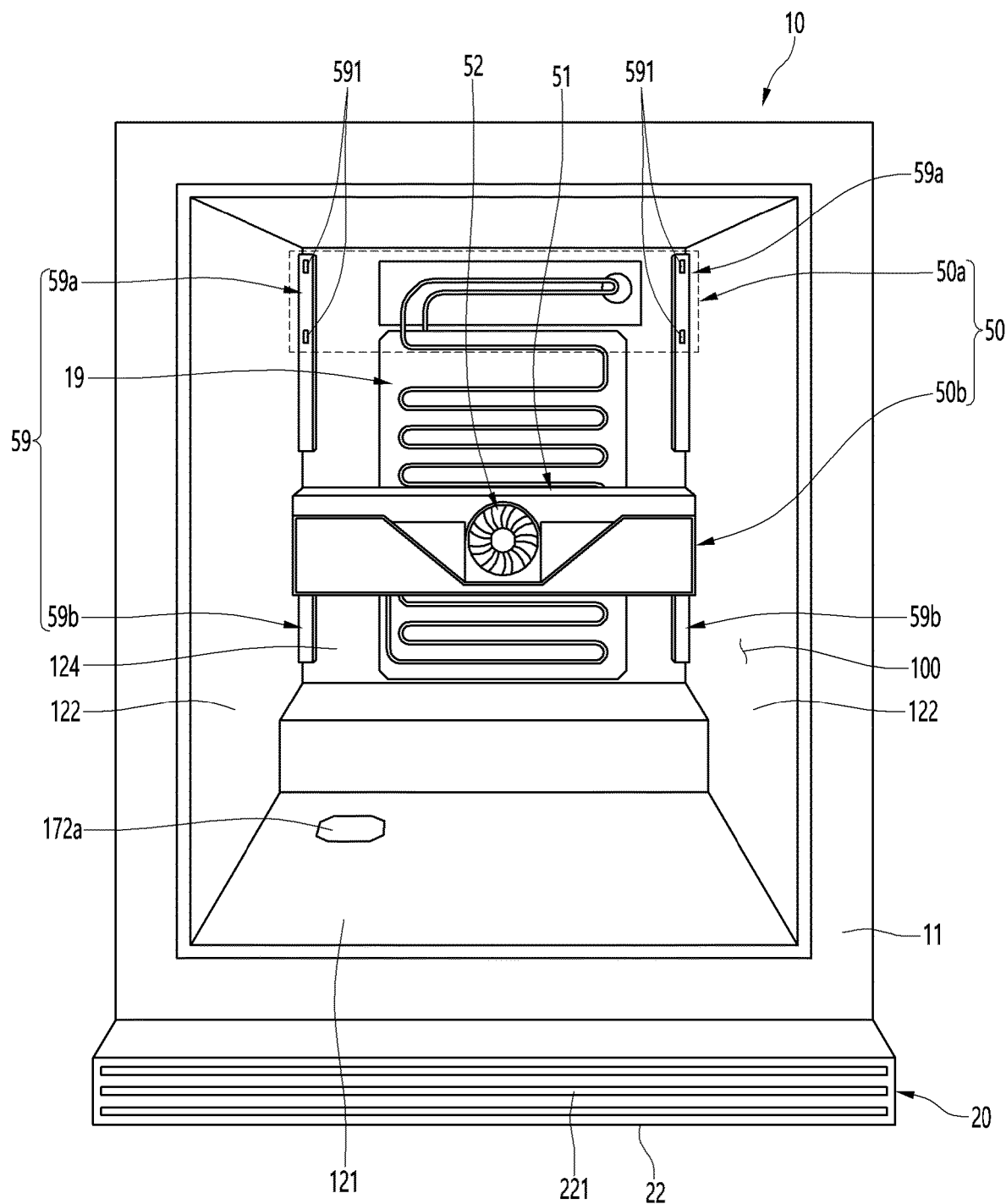
FIG. 25 is a view illustrating an arrangement of a blower of the plant cultivation apparatus.
Figure 26:
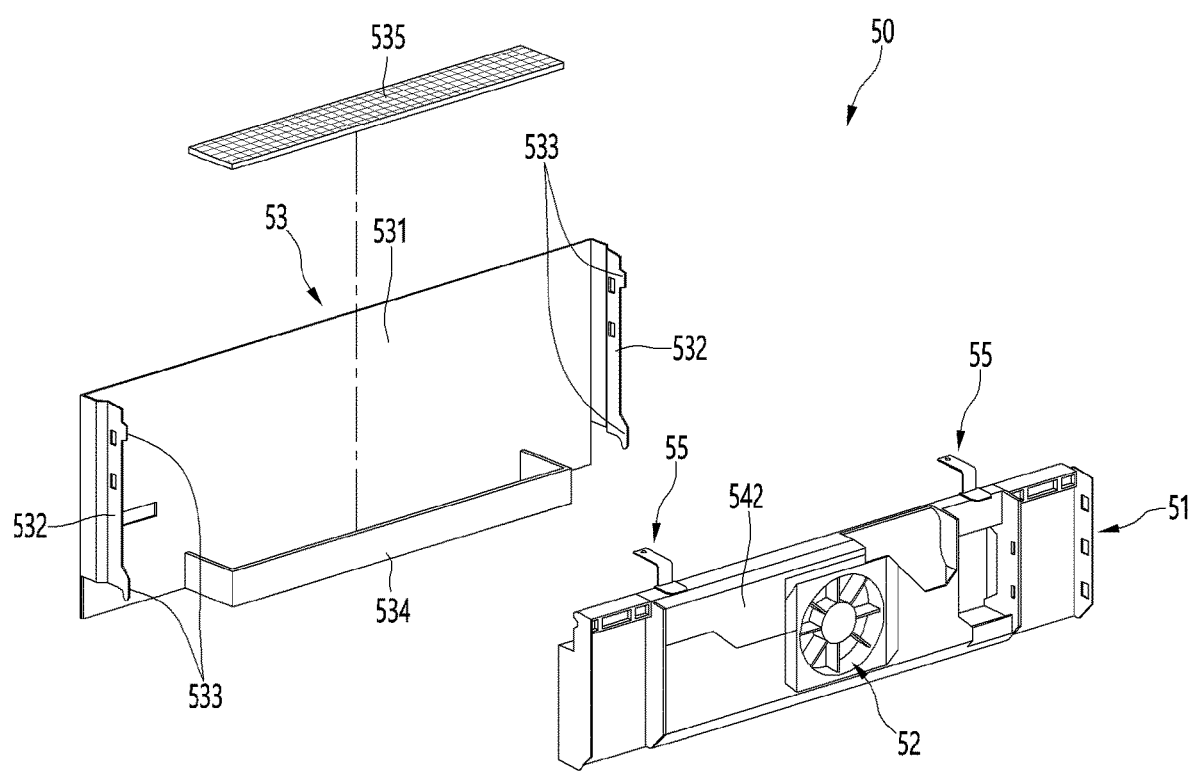
FIG. 26 is an exploded rear perspective view of the blower.

FIG. 25 is a view illustrating an arrangement of the blower of the plant cultivation apparatus. FIG. 26 is an exploded rear perspective view of the blower.

As illustrated in the drawings, the evaporator 19 may be vertically disposed on an inner rear wall of the cabinet 10. The evaporator 19 may be disposed in a horizontal center of the cultivation space 100 and may be disposed to extend from an upper end to a lower end of the rear plate 124.

A side rail 59 may be provided at each of left and right sides of the rear wall of the cultivation space 100. Both ends of the blower 50 may be fixedly mounted to the side rails 59, respectively. The side rail 59 may include an upper side rail 59a on which the upper blower 50a is mounted and a lower side rail 59b on which the lower blower 50b is mounted. That is, it is seen that the upper side rail 59a and the lower side rail 59b are disposed above and below the cultivation space 100.

A rail opening 591 may be defined in a front surface of the side rail 59. The rail openings may be vertically spaced apart from each other and may be open so that the plate coupling portions 533 protruding from rear ends of both the sides of the blower fan cover 53 are inserted therein, respectively.

In the blower 50, as the upper blower 50a and the lower blower 50b have the same structure, only one blower 50 will be described. The blower 50 may be provided as many as a number corresponding to a number of the cultivation shelves 30 and be provided at the lower end of the lighting device 40 and at an upper side that is adjacent to the cultivation shelf 30.

The blower 50 may include a blower fan 52, a fan guide 51 on which the blower fan 52 is mounted, and a blower fan cover 53 that shields the fan guide 51 and the evaporator 19. The blower fan 52 may be provided in a box fan shape and may be disposed at a center of the fan guide 51. In addition, the blower fan 52 may discharge air, which is introduced from a rear side of the blower 50, forward.

The fan guide 51 may provide a space in which the blower fan 52 is mounted and be configured to guide air discharged by the blower fan 52 upward. An upper end of the fan guide may be adjacent to the bottom surface of the lighting device 40, and the air discharged from the blower 50 may flow forward from the rear end of the bottom surface of the lighting device 40.

A blower bracket 55 for fixedly mounting the blower 50 may be provided at each of lateral or left and right sides of a top surface of the fan guide 51. The blower bracket 55 may be mounted on the bottom surface of the lighting device 40, and the lighting device 40 and the blower 50 may be coupled to each other in the form of vertical intersection. In addition, the blower 50 may discharge air forward from the rear end of the lighting device 40.

Recessed spaces may be defined in each of front and rear surfaces of the fan guide 51. A heat insulating material 542 may be disposed inside the recessed space to prevent dew condensation from being generated on a surface of the blower fan cover 53.

The blower fan cover 53 may shield all of the fan guide 51 and components mounted on the fan guide 51 in front of the fan guide 51. In addition, the blower fan cover 53 may extend to a position adjacent to the upper end of the cultivation shelf 30 to prevent the evaporator 19 and the rear plate 124 or the evaporator 19 from being exposed in a state in which the blower 50 is mounted.

The blower fan cover 53 may define an outer appearance of the rear wall of the cultivation space 100. The blower fan cover 53 may be made of the same metal material as the inner case 12 and may be provided by bending a plate-shaped material. The blower fan cover 53 may include a front surface portion 531 and a side surface portion 532.

The front surface portion 531 may be exposed through the cultivation space 100, and an upper end of the front surface portion 531 may be disposed adjacent to the upper end of the fan guide 51 and the upper end of the lighting device 40 and may serve as an outlet through which the air discharged by the blower fan 52 is discharged to the cultivation space 100. A lower end of the front surface portion 531 may extend further downward than the lower end of the fan guide 51, may be disposed adjacent to the top surface of the cultivation shelf 30, and may serve as an inlet through which air suctioned toward the blower fan 52 is introduced.

In addition, a deodorizing filter mounting portion 534 may be further disposed at the lower end of the front surface portion 531. The deodorizing filter mounting portion 534 may protrude backward from a rear surface of the front surface portion 531 to define a space in which a deodorizing filter 535 is accommodated. In addition, the deodorizing filter 535 may be disposed in a path of the inlet through which the air suctioned when the blower fan 52 is driven passes. Thus, the deodorizing filter 535 may filter odors or bacteria contained in the air circulated inside the cultivation space 100.

The side surface portion 532 may be bent backward at each of both ends of the front surface portion 531 and may be coupled to both side surfaces of the fan guide 51. A plate coupling portion 533 coupled to the side rail 59 mounted on the rear wall of the cultivation space 100 may protrude from the rear end of the side surface portion 532. The plate coupling portion 533 may be hooked by being inserted into the rail opening 591 of the side rail 59.

Hereinafter, structures of the water supply module and the drain module and related structures will be described with reference to the drawings.

Figure 27:
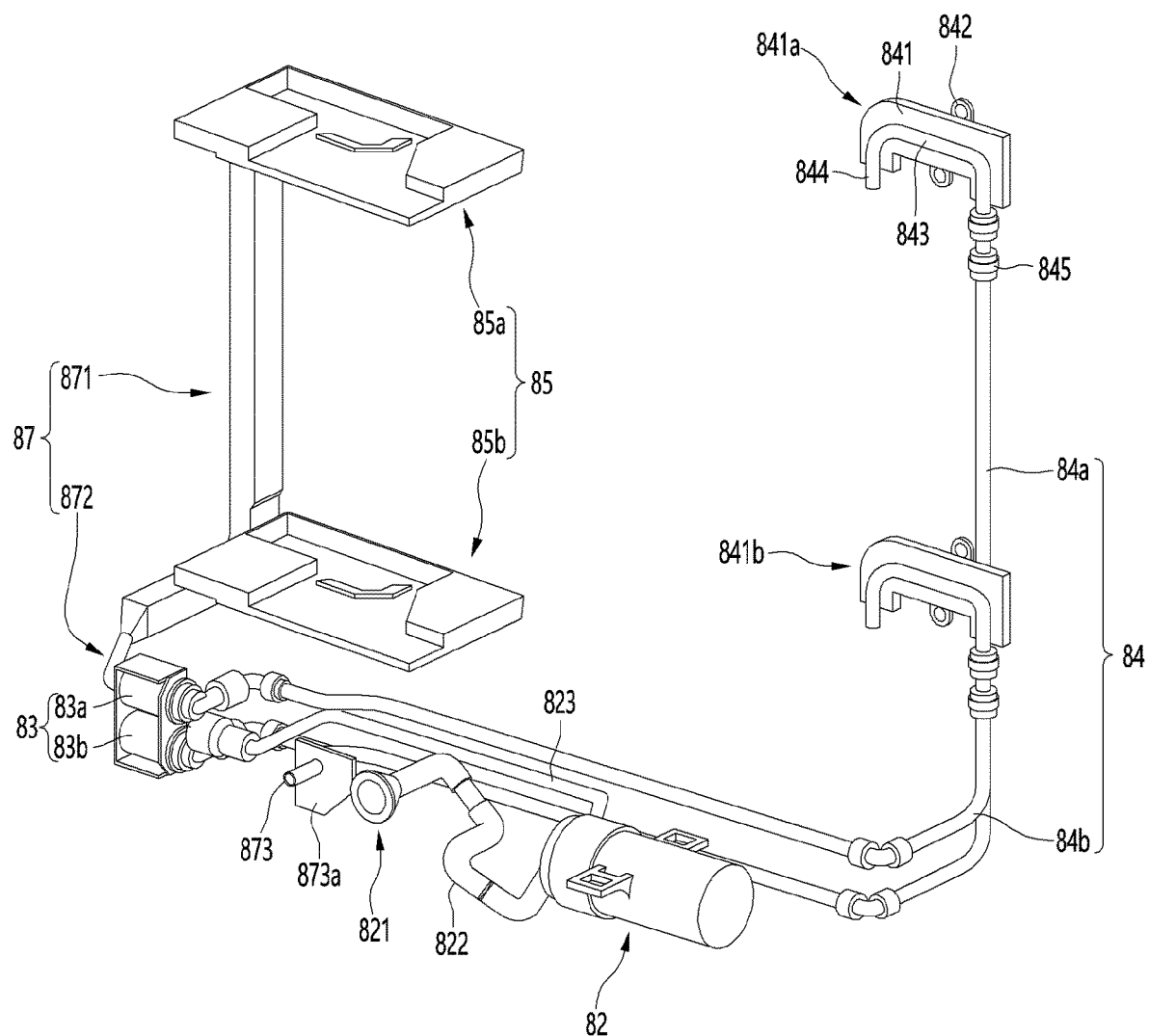
FIG. 27 is a perspective view illustrating a water supply module and a drain module of the plant cultivation apparatus.
Figure 28:
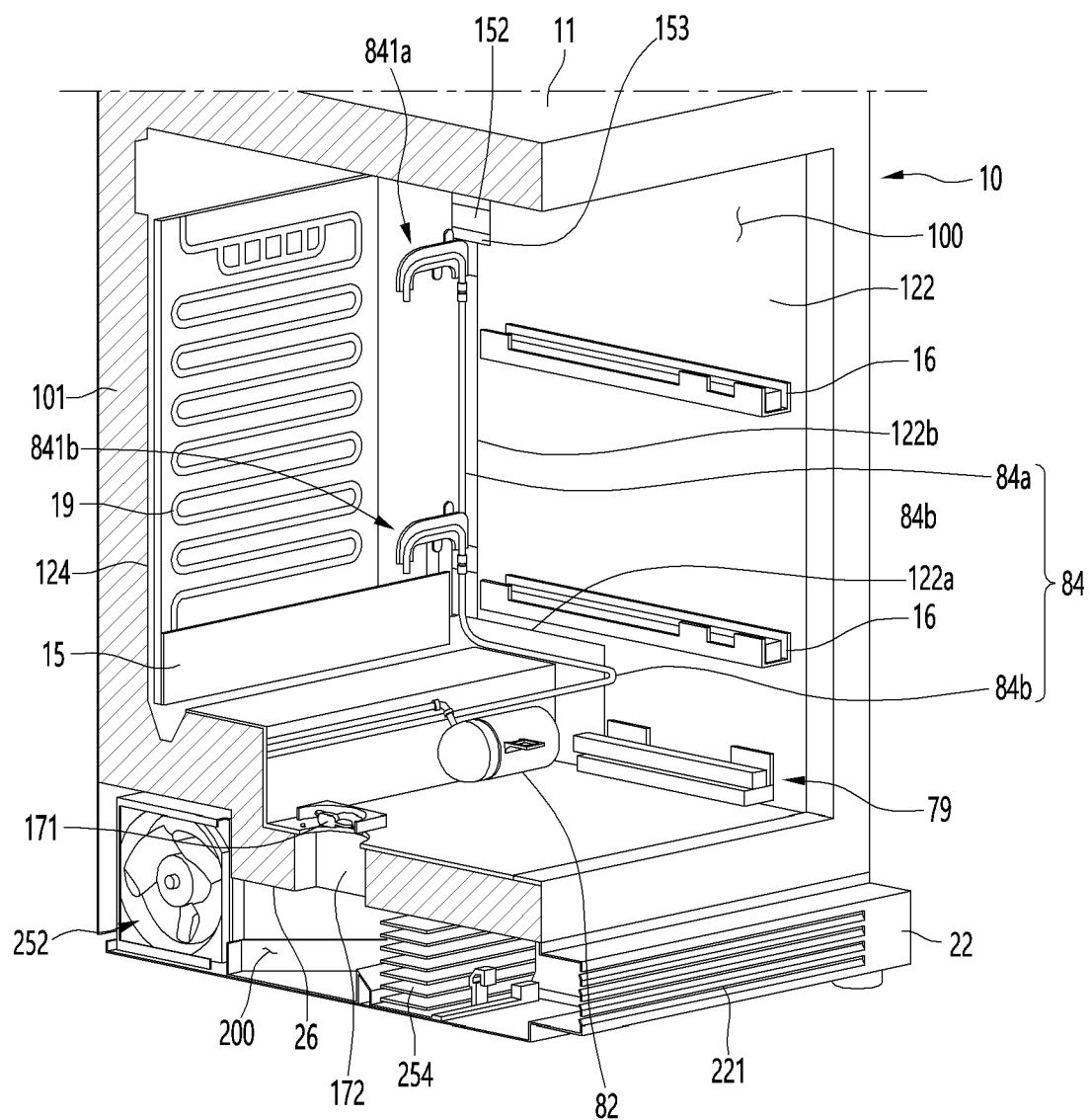
FIG. 28 is a cutaway perspective view illustrating a state in which the water supply module is disposed.
Figure 29:
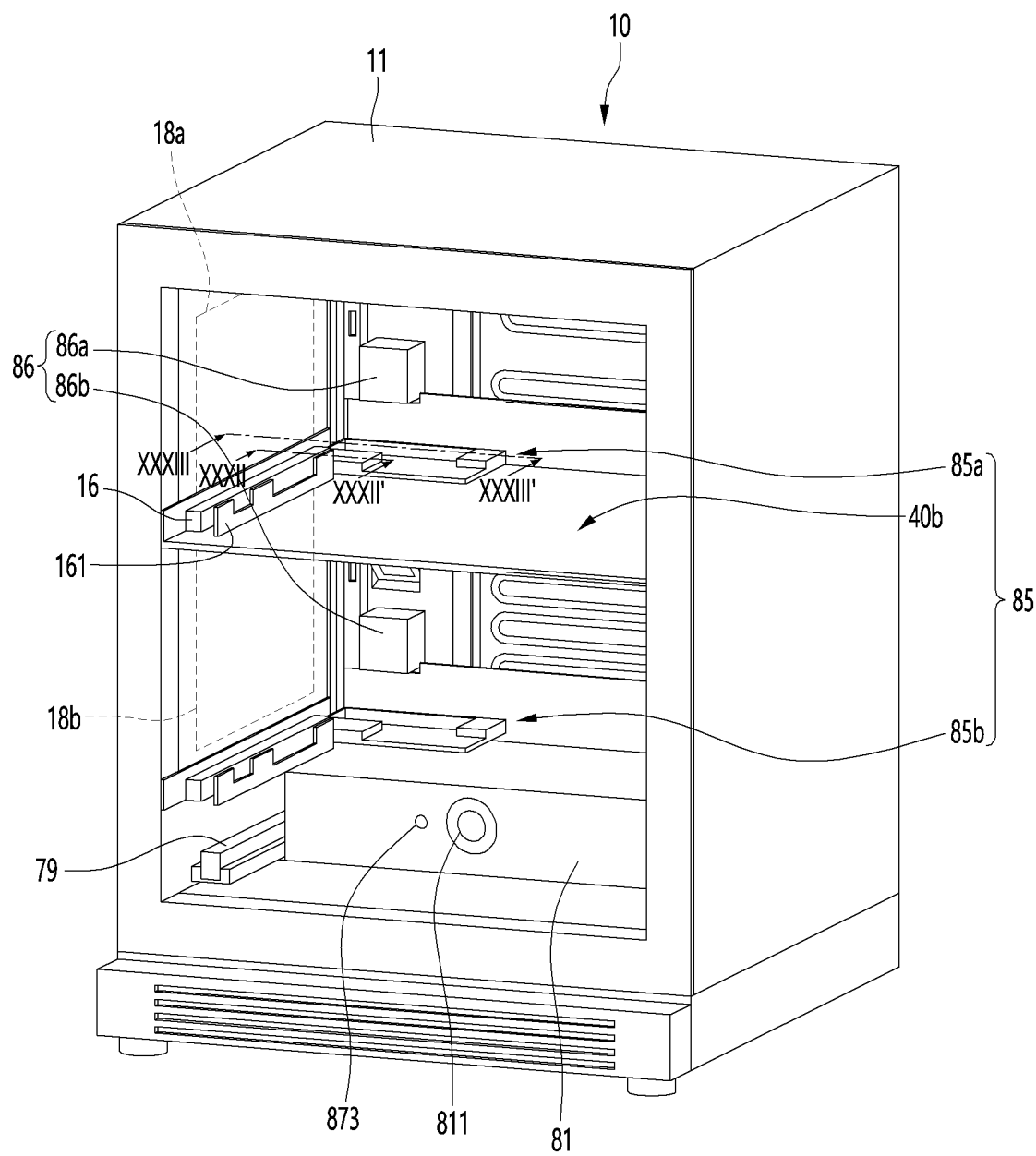
FIG. 29 is a perspective view illustrating a state in which the drain module is disposed.

FIG. 27 is a perspective view illustrating a water supply module and a drain module of the plant cultivation apparatus. FIG. 28 is a cutaway perspective view illustrating a state in which the water supply module is disposed. FIG. 29 is a perspective view illustrating a state in which the drain module is disposed.

A water supply module (fluid supply module) that supplies water to the cultivation shelf 30 and a drain module that drains water from the cultivation shelf may be provided inside the cultivation space 100. In addition, pump 82, valve 83, and tubes connected to these components may be disposed on the bottom surface of the cultivation space 100, that is, the bottom plate 121. In addition, the pump 82, the valve 83, and tubes connected to these components may be shielded by the pump cover 81.

The pump 82, the valve 83, and water supply tube 84, which are disposed to supply water to the cultivation shelf 30, may be referred to as a water supply module, and the water supply module may be provided in the inner space and the sidewall of the cultivation space 100 so as not to be exposed to the outside in a normally used state.

In the left and right surfaces defining the cultivation space 100, the water supply tube 84 may be disposed at one side (the right surface in FIG. 28). In addition, a water supply tube guide portion 122a may be disposed on the side plate 122 at the right side of the side plate 122. The water supply tube guide portion 122a may be configured to guide the water supply tube 84 that is directed to the cultivation shelf 30 and may be provided to be recessed so that the water supply tube 84 is accommodated.

The water supply tube 84 may be connected to the valve 83 and pass through the pump cover 81 so as to be disposed inside the sidewall of the cultivation space 100 and then may be disposed to face the cultivation shelf 30 again. The water supply tube 84 may have a structure that is connected to a plurality of components and is bent, and thus, the water supply tube 84 may be provided as a soft tube that is easy to be disposed and connected.

The water supply tube 84 may include upper water supply tube 84a, which is connected to upper valve 83a to supply water to the upper cultivation shelf 30a, and lower water supply tube 84b, which is connected to lower valve 83b to supply water to the lower cultivation shelf 30b. In addition, an upper water supply tube fixing member 841a and a lower water supply tube fixing member 841b may be provided in the upper water supply tube 84a and the lower water supply tube 84b, respectively. As the upper water supply tube fixing member 841a and the lower water supply tube fixing member 841b have the same structure and shape except for different mounting positions, only the upper water supply tube fixing member 841a will be described hereinafter.

The upper water supply tube fixing member 841a may be, for example, injection-molded using a plastic material and may communicate with the upper water supply tube 84a. As a whole, the upper water supply tube fixing member 841a may include a fixing member body 841 and a passage portion 842 provided in the fixing member body 841.

The fixing member body 841 may be provided in a plate shape and may be fixedly mounted to the rear plate 124. For this, a body fixing portion 842 to which a screw is coupled may be provided to protrude from the fixing member body 841. As the screw passes through the body fixing portion 842 and is coupled to the rear plate 124, the fixing member body 841 may be maintained in a fixed state at a set or predetermined position. Thus, the upper water supply tube 84a may be maintained in a mounted state at a position corresponding to the water supply unit 316 of the upper cultivation shelf 30 to supply the water to an accurate position.

In addition, a passage portion 842 may be provided in the fixing member body 841. The passage portion 842 may be provided to accommodate a discharge tube 844 connected to the upper water supply tube 84a. The discharge tube 844 may be provided through insert injection molding while being inserted into the passage portion 842. In this case, the discharge tube 844 may be bent so that left and right both ends face downward and may be accommodated inside the passage portion 842.

The fixing member body 841 may be provided, for example, as a single injection-molded product having the passage portion 842 provided therein, and if necessary, a front surface portion and a rear surface portion may be coupled to each other to define an overall shape including the passage portion 842. In addition, one end of both left and right ends of the discharge tube 844 may be connected to an upper end of the upper water supply tube 84a by a fitting member 845, and the other end may be bent toward the water supply portion 316. For this, both the left and right ends of the discharge tube 844 may protrude to the outside of the passage portion 842 to extend downward to be exposed to the outside.

Alternatively, if necessary, the discharge tube 844 may not be provided, and the passage portion 842 itself may define a water flow path. In this case, both ends of the passage portion 842 may protrude downward to replace the role of the discharge tube 844.

The lower water supply tube fixing member 841b differs only in that it is connected to the lower water supply tube 84b, but its structure and shape will be the same as the upper water supply tube fixing member 841a.

The drain module may be disposed at the other side facing one side of the cultivation space 100 in which the water supply module is disposed. The drain module may be configured to drain the water from the cultivation shelf 30 to the water tank 70 and may include a drain tray 85 and a drain tube 87.

The drain tube 87 may be disposed at the other side (left side in FIG. 29) facing the side at which the water supply tube 84 is disposed among the left and right surfaces that defines the cultivation space 100. In addition, the drain tray 85 may be provided on an edge area adjacent to the rear surface of the cultivation space 100 adjacent to the drain tube 87.

A drain tube guide 122c recessed inward may be provided in the side plate 122 defining the left surface of the cultivation space 100. The drain tube 87 may extend in the vertical direction, and all the water drained from the upper and lower cultivation shelves 30a and 30b disposed vertically may be drained through one drain tube 87.

In a state in which the drain tube 87 is mounted on the drain tube guide 122c, the drain tube 87 may not protrude to the inside of the cultivation space. Thus, the drain tube 87 may be prevented from interfering with the cultivation shelf 30 even when the cultivation shelf 30 is drawn in and out. In addition, the drain tube 87 may be connected to the drain tray 85 in a state of being disposed inside the drain tube guide portion 122c to discharge the water drained from the cultivation shelf 30 into the pump cover 81.

For this, the drain tube 87 may include the drain guide tube 871 extending in the vertical direction, and a drain tube 872 connected to the drain guide tube 871. The drain guide tube 871 may have a larger cross-sectional area than the drain tube 872 so that a large amount of water discharged from the drain tray 85 is effectively drained. In addition, the drain guide tube 871 may have a structure in which all the tray drain portions 857 of the upper drain tray 85a and the lower drain tray 85b are inserted therein. For example, the drain guide tube 871 may be made of a plastic material, and a plurality of portions may be coupled to have a tube-like shape.

The drain tube 872 may be connected to an end of the drain guide tube 871 and may be connected to a drain nozzle 873 provided at the rear of the water tank 70. The drain nozzle 873 may protrude forward from the nozzle mounting portion 873a, and the nozzle mounting portion 873a may be fixedly mounted on a front surface of the pump cover 1. In addition, the drain tube 872 connected to the drain nozzle may be disposed inside the pump cover 1.

The drain nozzle 873 may protrude forward from a front surface of the pump cover 1, and thus, may be inserted into the water tank 70 while the water tank 70 is inserted.

Also, although not shown, the drain nozzle 873 may have a valve-like structure and may have a structure that is opened when the water tank 70 is drawn in and closed when the water tank 70 is drawn out.

In addition, a fitting portion 821 may be provided on the front surface of pump cover 81. The fitting portion 821 may be configured to insert a tank water outlet 78 of the water tank 70 so that the water of the water tank 70 is suctioned into the pump 82. A pump input tube 822 connected to the pump 82 may be connected to an end of the fitting portion 821. The pump 82 may be connected to the valve 83 by a pump output tube 823 so that water in the water tank 70 is supplied to the valve 83 when the pump 82 is driven and is supplied to the cultivation shelf 30 through the water supply tube 84.

The drain tray 85 may be disposed below the cultivation shelf 30 and be disposed adjacent to the rear wall surface of the cultivation space 100 so as not to be exposed to the outside. In addition, the water drained from the cultivation shelf 30 may be collected in the drain tray 85 and then guided to the drain tube 87.

In this case, the drain tray 85 may include an upper drain tray 85a through which the water of the upper cultivation shelf 30a is drained and a lower drain tray 85b which is disposed below the upper drain tray 85a and through which the water of the lower cultivation shelf 30b is drained.

Hereinafter, the drain tray 85 will be described with reference to the accompanying drawings. As upper drain tray 85a and lower drain tray 85b have the same structure except for mounted positions, only the upper drain tray 85a will be described.

Figure 30:
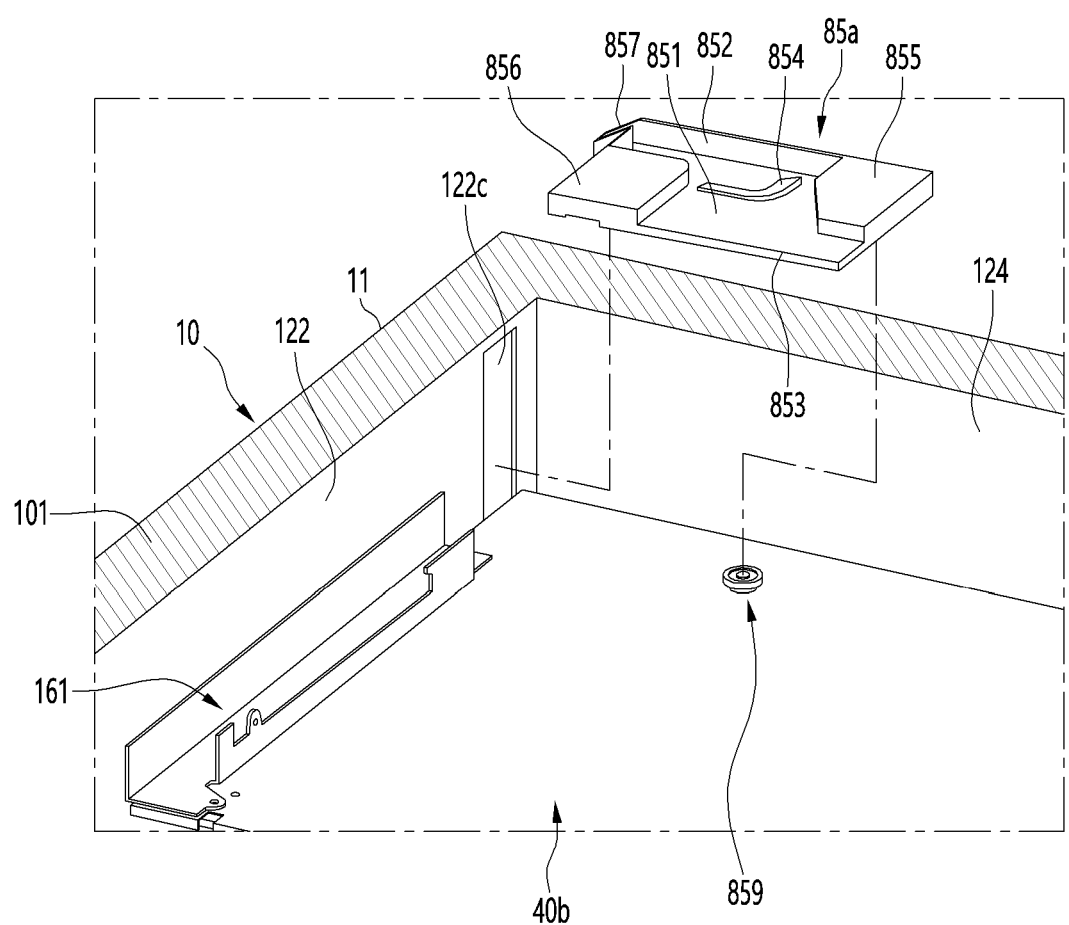
FIG. 30 is a view illustrating a state in which a drain tray of the drain module is separated.
Figure 31:
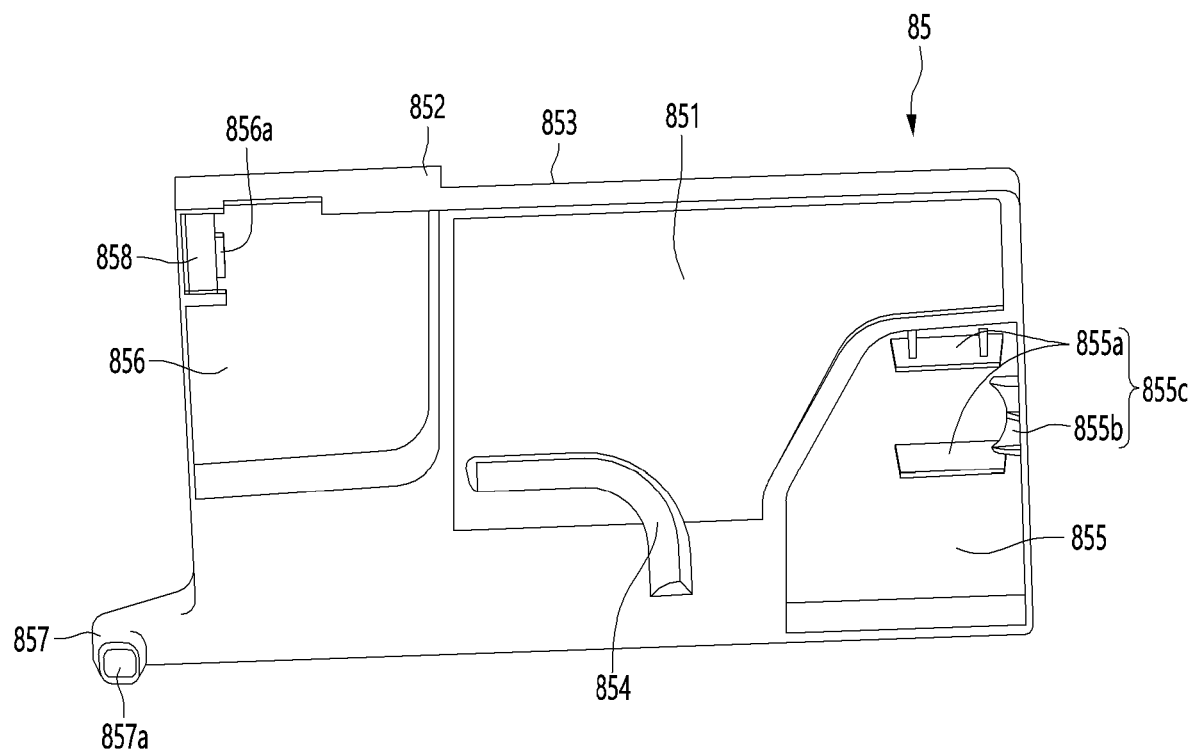
FIG. 31 is a bottom perspective view of the drain tray.
Figure 32:
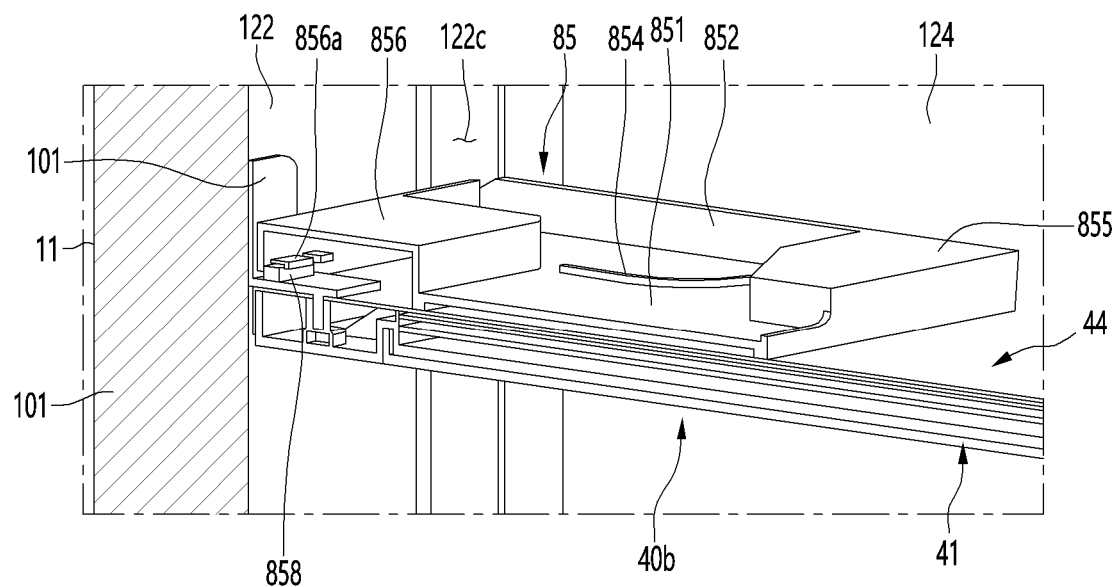
FIG. 32 is a cutaway perspective view, taken along line XXII-XXII' of FIG. 29.
Figure 33:
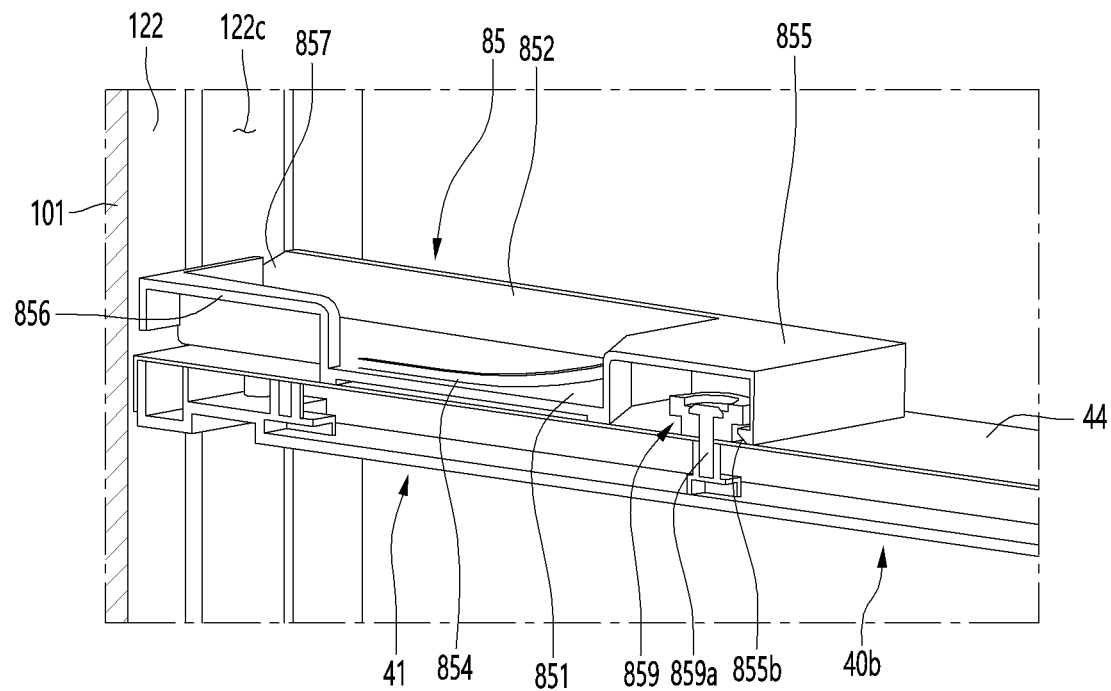
FIG. 33 is a cutaway perspective view, taken along line XXIII-XXIII' of FIG. 29.

FIG. 30 is a view illustrating a state in which the drain tray of the drain module is separated. FIG. 31 is a bottom perspective view of the drain tray. FIG. 32 is a cutaway perspective view, taken along line XXII-XXII' of FIG. 29. FIG. 33 is a cutaway perspective view, taken along line XXIII-XXIII' of FIG. 29.

As illustrated in the drawings, the drain tray 85 may include a plate-shaped tray bottom surface 851, and a tray circumferential portion 852 extending upward along a circumference of the tray bottom surface 851. The tray bottom surface 851 may be configured to define an area in which at least the drain portion 318 of the cultivation shelf 30, a drain hole 319a, and the drain guide tube 871 are provided. That is, the tray bottom surface 851 may have a predetermined area so that the water drained from the drain portion 318 and the drain hole 319a of the cultivation shelf 30 is drained toward the drain guide tube 871. In addition, the tray bottom surface 851 may be inclined to allow the water discharged from the cultivation shelf 30 to flow more smoothly toward the drain guide tube 871.

More particularly, a first protrusion 856 and a second protrusion 855, which protrude upward, are disposed on both lateral or left and right sides of the tray bottom surface 851, respectively, and may provide a space, in which the water drained from the cultivation shelf 30 flows, between the first protrusion 856 and the second protrusion 855.

The tray circumferential portion 852 may protrude upward to prevent the water flowing along the drain tray 85 from overflowing. In addition, a portion of a first half adjacent to the rear end of the cultivation shelf 30 of the tray circumferential portion 852 may have a tray cutoff portion 853 that is cut downward. Thus, the bottom surface of the cultivation shelf 30 and the drain tray 85 may be prevented from interfering with each other while the cultivation shelf 30 is drawn out.

An overflow prevention portion 854 may be disposed on the tray bottom surface 851 corresponding to the tray cutoff portion 853. The overflow prevention portion 854 may protrude upward from an area between the first protrusion 856 and the second protrusion 855. In addition, the overflow prevention portion 854 may protrude from the tray bottom surface 851 to extend in a shape parallel to the front and side surfaces, thereby preventing the water drained into the drain tray 85 from overflowing toward the tray cutoff portion 853.

In addition, the tray bottom surface 851 may be provided so that a portion at which the overflow prevention portion 854 is disposed is higher and then gradually lowered toward a portion at which the tray drain portion 856 is disposed. Thus, the water may be prevented from overflowing from the drain tray 85 to facilitate the drainage from the drain tray 85.

A tray drain portion 856 protruding outward may be disposed on each of edges of left and rear ends of the drain tray 85. The tray drain portion 856 may protrude to the outside of the drain tray 85 and be inserted into the drain guide tube 871. In addition, the tray circumferential portion 852 may extend along the circumference of the tray drain 856, and thus, the water guided to the tray drain 856 may not overflow and may be directed toward the drain guide tube 871.

In addition, the tray drain 856 may extend downward so that all of the water flowing into the tray drain 856 is introduced into the drain guide tube 871 without leaking or splashing to the outside. In addition, the tray drain 856a for draining may be opened at the extending lower end of the tray drain 856.

The drain tray 85 has to be mounted at an accurate position so that the water drained from the cultivation shelf 30 is smoothly discharged to the drain guide tube 871. In addition, to maintain the drain tray 85 mounted at an accurate position, the drain tray 85 may include a first mounting portion 856a and a second mounting portion 855c.

The first mounting portion 856a may be disposed at one side (left side in FIG. 30) of the bottom surface 851 of the tray. The first mounting portion 856a may be disposed at the same side as the tray drain portion 857 and may be provided to accommodate a magnet 858. The first mounting portion 856a may be open downward and may have a structure in which the magnet 858 is press-fitted from the bottom to be fixed by extending from the tray circumferential surface 852.

In addition, a rail bracket 161 on which the shelf rail is mounted may be provided on the side surface of the cultivation space 100. The rail bracket 161 may be provided in a steel shape, and a portion of a side surface of the rail bracket 161 may extend backward to a position corresponding to the magnet 858 of the drain tray 85.

Therefore, when the drain tray 85 is mounted, the magnet 858 may be in close contact with the rail bracket 161 by magnetic force, and thus, one surface of the drain tray 85 on which the tray drain portion 857 is disposed may be in close contact with the side surface of the cultivation space 100 on which the rail bracket 161 is disposed. Thus, the tray drain 857 may be secured to be inserted into the drain guide tube 871, and the drain tray 85 may be placed at the accurate position by the magnetic force without a separate alignment operation.

The second mounting portion 855*c* may be disposed at the other side (right side in FIG. 30) of the tray bottom surface 851 opposite to the first mounting portion 856*a*. The second mounting portion 855*c* may be coupled to a tray fixing member 859 disposed below the drain tray 85 for fixing the drain tray 85.

The tray fixing member 859 may be provided at a lower portion corresponding to the position of the second mounting portion 855*c* when the drain tray 85 is mounted at the correct position. For example, the tray fixing member 859 provided below the upper drain tray 85*a* may be provided in the upper lighting device 40*a* as illustrated in FIG. 29, and the tray fixing member 859 provided below the lower drain tray 85*b* may be provided on the bottom plate 121.

The tray fixing member 859 may be provided in a circular shape. A screw 859*a* may be coupled to a center of the tray fixing member 859 so that the tray fixing member 859 is fixedly mounted so as to be somewhat spaced apart from the top surface of the lighting device or the top surface of the bottom plate 121.

The second mounting portion 855*c* may include a restriction rib 855*b* and a pair of guide ribs 855*a*. The restriction rib 855*b* may protrude from an inner surface of the tray circumferential surface 852 defining the right surface of the drain tray 85. In addition, the restriction rib 855*b* may be inserted into a space between the tray fixing member 859 and the top surface of the lighting device 40 or the top surface of the bottom plate 121 to prevent the tray fixing member 859 from moving in the upward direction and being separated.

The pair of guide ribs 855*a* may extend in parallel with each other and may extend in a direction crossing an extending direction of the restriction rib 855*b*. A distance between the pair of guide ribs 855*a* may correspond to a diameter of the tray fixing member 859, and the restriction ribs 855*b* may be disposed between the pair of guide ribs 855*a*.

Thus, to mount the drain tray 85, the drain tray 85 may be disposed on each of edge areas of the left surface and the rear surface of the cultivation space 100, and the tray fixing member 859 may move laterally to be restricted by the restriction rib 855*b* by passing through the guide ribs 855*a*. A moving direction of the drain tray 85 may be directed toward the left wall, and at this time, the magnet 858 may be disposed at a fixed position while being attached to the rail bracket 161 by the magnetic force. In a state in which the drain tray 85 is disposed at its original position, the drain tray 85 may be firmly mounted by the magnet 858 and the restriction rib 855*b*.

Hereinafter, the water tank 70 and the mounting structure of the water tank 70 will be described with reference to the drawings.

Figure 34:
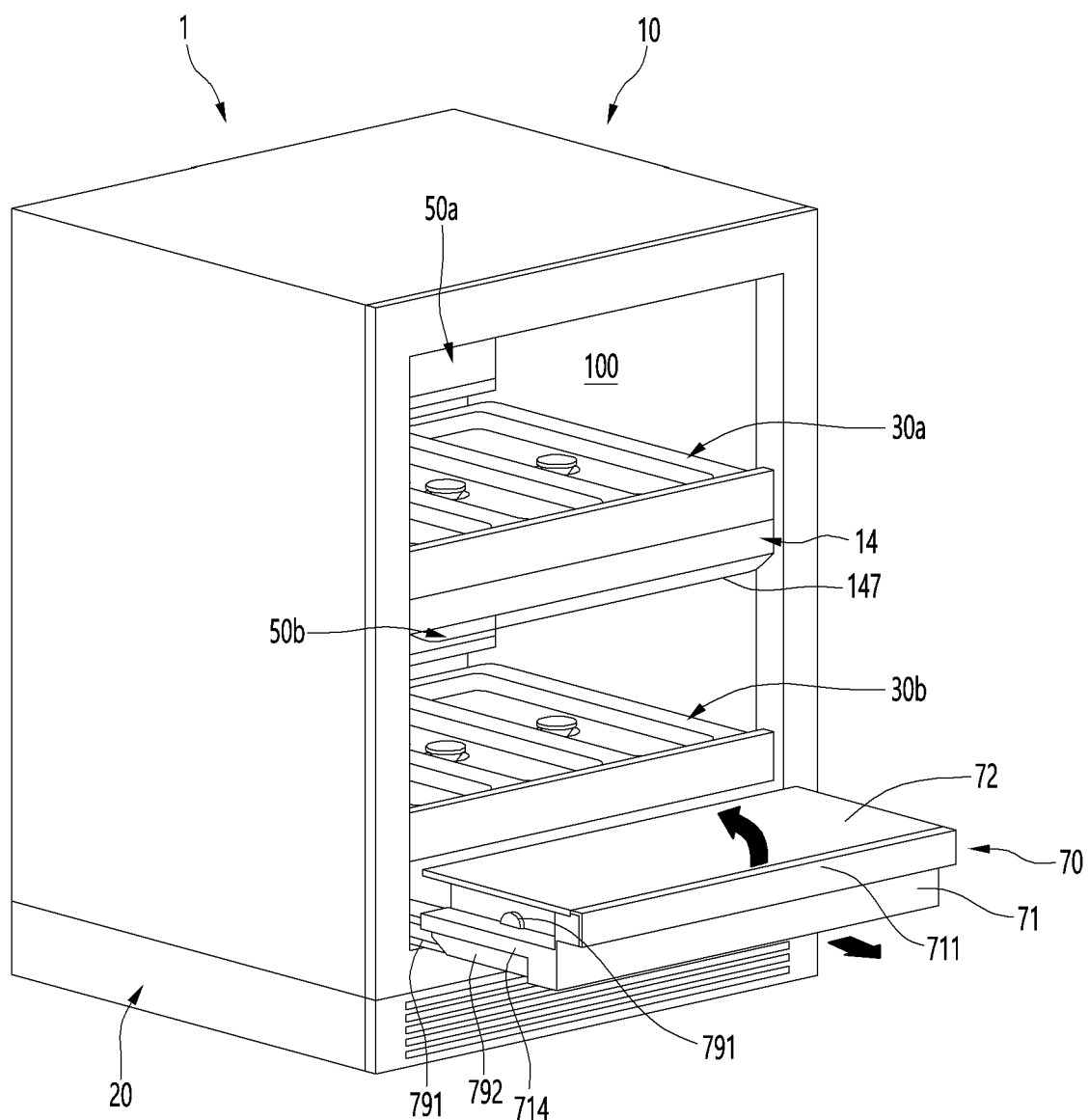
FIG. 34 is a perspective view illustrating a state in which a water tank of the plant cultivation apparatus is drawn out.
Figure 35:
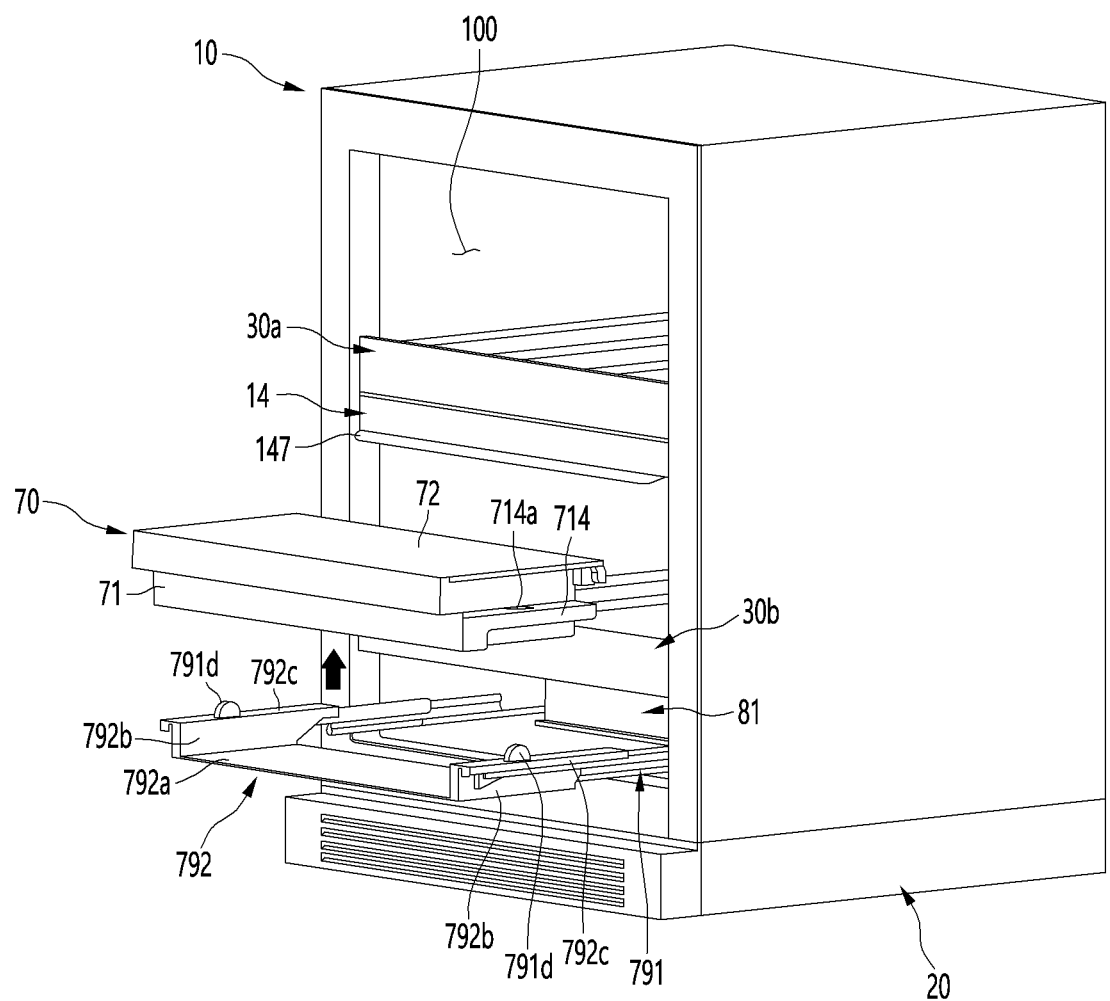
FIG. 35 is an exploded perspective view illustrating a state in which the water tank is separated from a tank rail.
Figure 36:
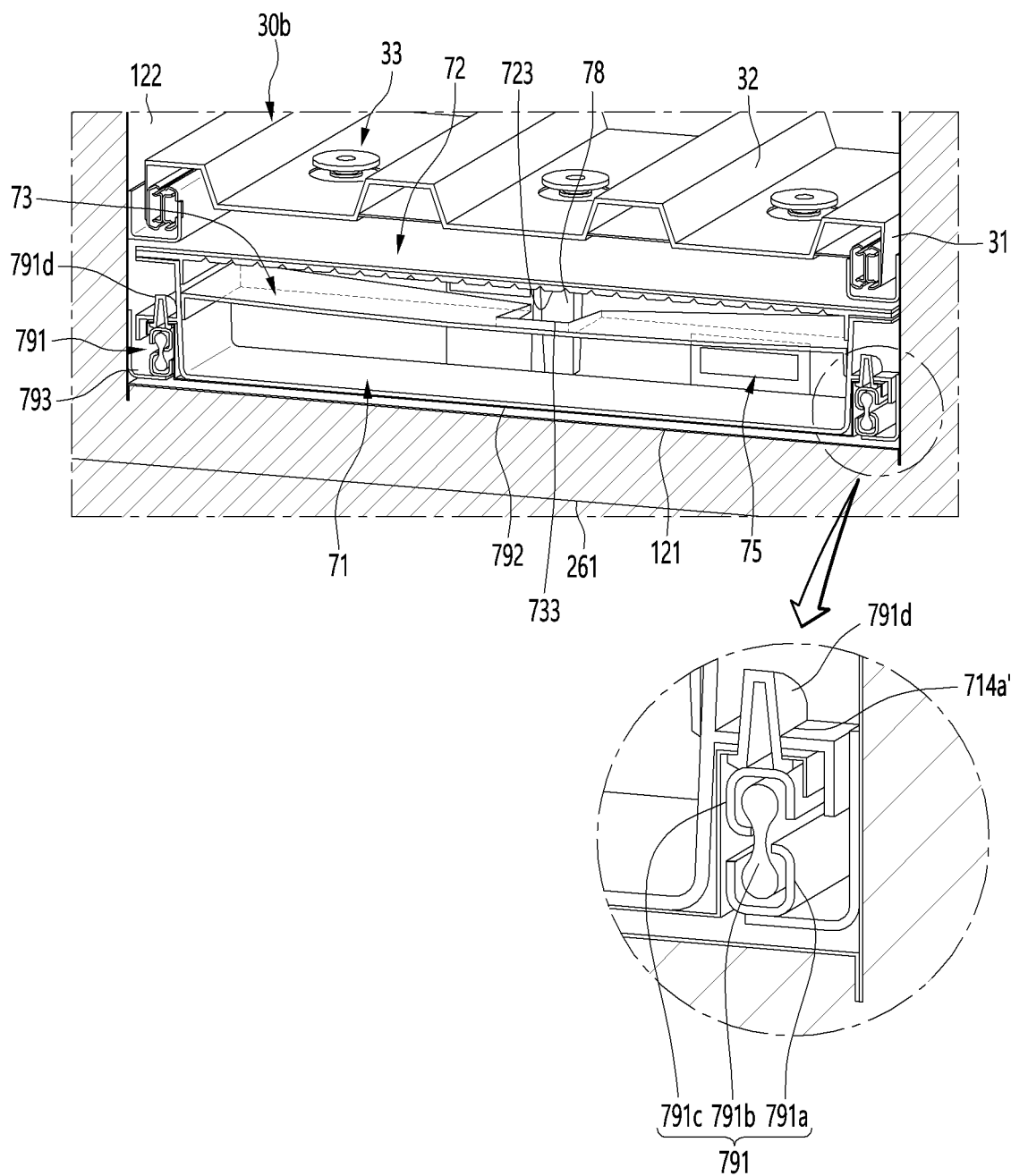
FIG. 36 is a cutaway perspective view illustrating a state in which the water tank is mounted.
Figure 37:
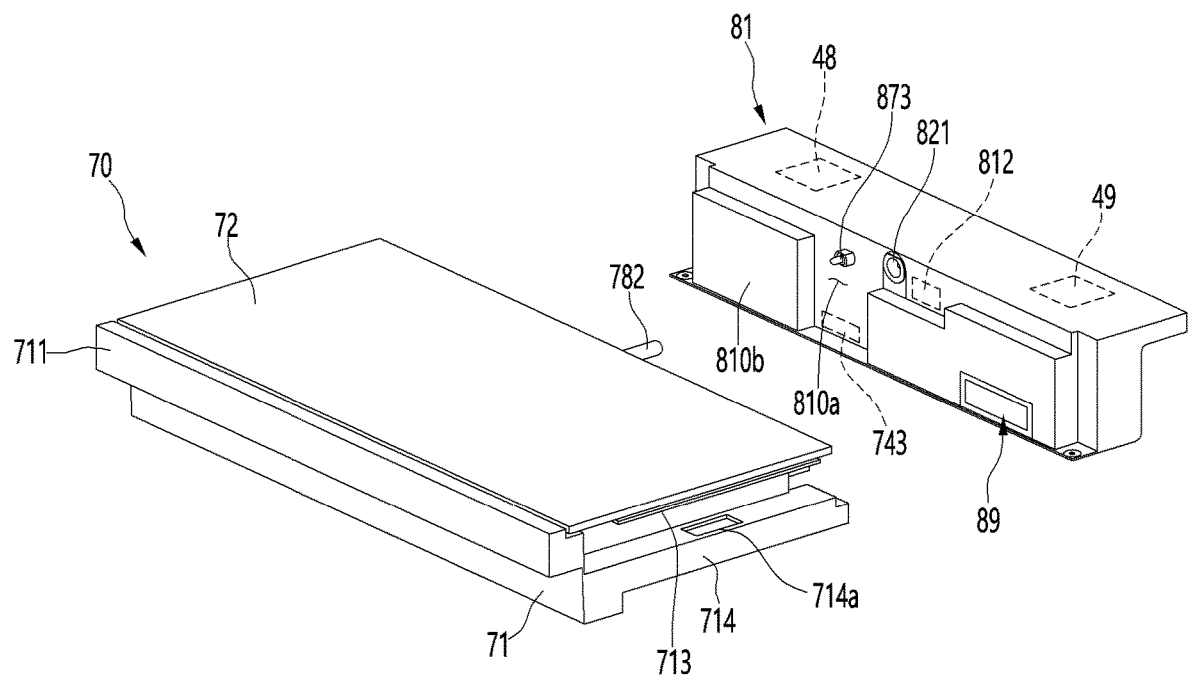
FIG. 37 is an exploded perspective view of the water tank and a pump cover.

FIG. 34 is a perspective view illustrating a state in which the water tank of the plant cultivation apparatus is drawn out. FIG. 35 is an exploded perspective view illustrating a state in which the water tank is separated from a tank rail. FIG. 36 is a cutaway perspective view illustrating a state in which the water tank is mounted. FIG. 37 is an exploded perspective view of the water tank and the pump cover.

As illustrated in the drawings, the water tank 70 may be provided at a lowermost portion of the cultivation space 100 and may be disposed so as to be drawn in and out in the frontward and rearward direction. The water tank 70 may be provided in a size at which the spaces of the bottom surface of the cultivation space 100 and the bottom surface of the lower cultivation shelf 30*b* are filled in the retracted state. In addition, in the state in which the water tank 70 is drawn in, the water tank 70 may be disposed on a same plane as the front surface of the lower cultivation shelf 30*b* to provide a sense of unity.

In addition, the tank rails 791 may be coupled to both left and right surfaces of the water tank 70, respectively. Each of the tank rails 791 may be fixed to the side plate 122 and has a structure that is capable of extending in multiple stages so that the water tank 70 is drawn in and out in the frontward and rearward direction.

The entire water tank 70 may be withdrawn completely forward, and at least the tank cover 72 may rotate upward to open the tank body 71 in which water is stored. The user may open the tank body 71 in a state in which the water tank 70 is drawn out, and water may be filled into the water tank 70, or nutrients necessary for the plant cultivation may be put so that the water that is in the culture medium is circulated through the water supply module.

The water tank 70 may have a structure capable of being easily detached from the drawn-out state. That is, the water tank 70 may have a structure that is capable of being easily detached from the tank rail 791 for cleaning or replenishing water.

The tank rail 791 has a structure capable of extending in multiple stages. For example, the tank rail 791 may include a fixed rail 791*a* mounted on each of both surfaces of the cultivation space 100, a drawn-out rail 791*c* mounted on each of both surfaces of the water tank 70, and a connection rail 791*b* connecting the fixed rail 791*a* to the withdrawal rail 791*c*.

The fixed rail 791*a* may be fixedly mounted to the rail bracket 793 provided on a side surface of the cultivation space 100. In addition, the drawn-out rail 791*c* may be mounted on rail mounting portions 714 disposed on both lateral or left and right surfaces of the water tank 70.

A tank supporter 792 connecting the pair of tank rails 791 disposed on both the left and right sides to each other may be further provided. The tank supporter 792 may be provided in a plate shape to support the water tank 70 from below.

The tank supporter 792 may be provided in a metal plate shape and may be bent multiple times. The tank supporter 792 may include a supporter bottom surface 792*a* that supports the bottom surface of the water tank 70 and a supporter side surface 792*b* extending upward from each of both left and right ends of the supporter bottom surface 792*a*. The bottom surface 792*a* of the supporter may have a size corresponding to that of the bottom surface of the water tank 70 and may correspond to a distance between the tank rails 791. In addition, the supporter side surface 792*b* may extend above the drawn-out rail 791*c*.

In addition, a supporter top surface 792*c* bent to the outside of the supporter side surface 792*b* may be disposed on an upper end of the supporter side surface 792*b*. The supporter top surface 792*c* may be supported on the top surface of the drawn-out rail 791*c*. In addition, an outer end of the supporter top surface 792c may be bent downward so that the supporter top surface 792c is stably seated on the top surface of the drawn-out rail 791c.

A tank fixing protrusion 791d protruding upward may be disposed on the top surface of the drawn-out rail 791c. The tank fixing protrusion 791d may pass through the top surface 792c of the supporter to further protrude upward. Thus, the tank supporter 792 may be maintained in a stable coupling state between the drawn-out rails 791c. Therefore, the tank rails 791 on both the left and right sides may be drawn in and out in a state of being connected by the tank supporter 792, and thus, the tank rail 791 may always move together regardless of whether the water tank 70 is detached. If the tank supporter 792 is not disposed, the tank rail 791 may not be aligned in the state in which the water tank 70 is separated, and thus, it is inconvenient to detach the water tank 70. In addition, in a state in which the water tank 70 is filled with water, a weight of the water tank 70 increases, and the bottom surface of the water tank 70 may be stably supported by the tank supporter 792 to further improve the drawn-in and out and stability of the mounted state of the water tank 70.

The tank fixing protrusion 791d may further protrude upward to pass through the supporter top surface 792c, and when the water tank 70 is mounted, the tank fixing protrusion 791 may pass through a tank fixing hole 714a defined in the top surface of the rail mounting portion 714 of the water tank 70. Thus, the water tank 70 may be stably maintained in a state of being seated on the tank supporter 792 and a state of being mounted on the tank rail 791, and even when the water tank 70 is drawn in and out, the water tank 70 may not be arbitrarily detached or separated from the mounted position.

More particularly, the tank fixing protrusion 791d may have a thinner thickness as it protrudes upward, and at least a portion of an upper end thereof may be rounded. Thus, when the water tank 70 is mounted, the tank fixing protrusion 791d may be guided to be more easily inserted into the tank fixing hole 714a. In addition, it is ensured that the water tank 70 is arranged at a correct position by the coupling of the tank fixing protrusion 791d and the tank fixing hole 714a.

The pump cover 81 may be provided behind the water tank 70. The pump cover 81 may be fixedly mounted to the bottom plate 211, and when the pump cover 81 is mounted, a plurality of components, such as the pump 82 and the valve 83, may be accommodated in an inner space of the pump cover 81.

In addition, a pump cover protrusion 810b protruding forward and a pump cover recessed portion 810a recessed backward between a front surface of the pump cover 81 and the pump cover protrusion 810b may be provided on the front surface of the pump cover 81.

A protruding water inlet 744 of the water tank 70 may be accommodated in the pump cover recessed portion 810a. In addition, a drain nozzle 873 and a fitting portion 821 for selective connection with the water tank 70 may be disposed inside of the pump cover recessed portion 810a. Thus, in a state in which the water tank 70 is fully inserted, the drain nozzle 883 may be inserted into a nozzle insertion hole 744a of the water accommodation portion 744 of the water tank 70 to drain the water into the water tank 70, and the tank water outlet 78 of the water tank 70 may be inserted into the fitting portion 821 so that water is supplied to the cultivation shelf 30.

Alternatively, when the water tank 70 is drawn out, contact with the drain nozzle 873 may be released, the drain nozzle 873 may be closed, and the tank water outlet 78 may be separated from the fitting portion 821, and thus, the water supply to the cultivation shelf 30 may be stopped. That is, the water tank 70 is in a state in which both water supply and drainage are possible in the drawn-in state, and the water supply and drainage may be stopped at the moment when the water tank 70 is drawn out to prevent water from leaking.

A water level detection device (water level detector) 743 may be provided at one side of the recessed portion of the pump cover 81. The water level detection device 743 may be configured to detect a water level of the water tank, and thus, may detect the water level of the water tank 70 by detecting a magnet of a tank floater 742 described hereinafter.

In addition, a tank detection device (tank detector) 812 may be provided on the front surface of the pump cover 81. The tank detection device 812 may detect that the water tank 70 is completely drawn in. If the tank detection device 812 does not detect the drawn-in of the water tank 70, the water supply and drainage may be stopped to output notification to the outside.

In addition, shelf detection device 48 that detects the complete drawn-in of the lower cultivation shelf 30b may be provided on the top surface of the pump cover 81. The shelf detection device 48 may allow the lower cultivation shelf 30b to be completely drawn in so that the water supply and drainage are performed at an accurate location. In addition, water level detection device 49 that detects a water level of the lower cultivation shelf 30b may be provided on an inner top surface of the pump cover 81.

The shelf detection device 48 and the water level detection device 49 provided inside the pump cover 81 may be the same as the shelf detection device 48 and the water level detection device 49, which are provided inside the lower lighting device 40b.

Figure 38:
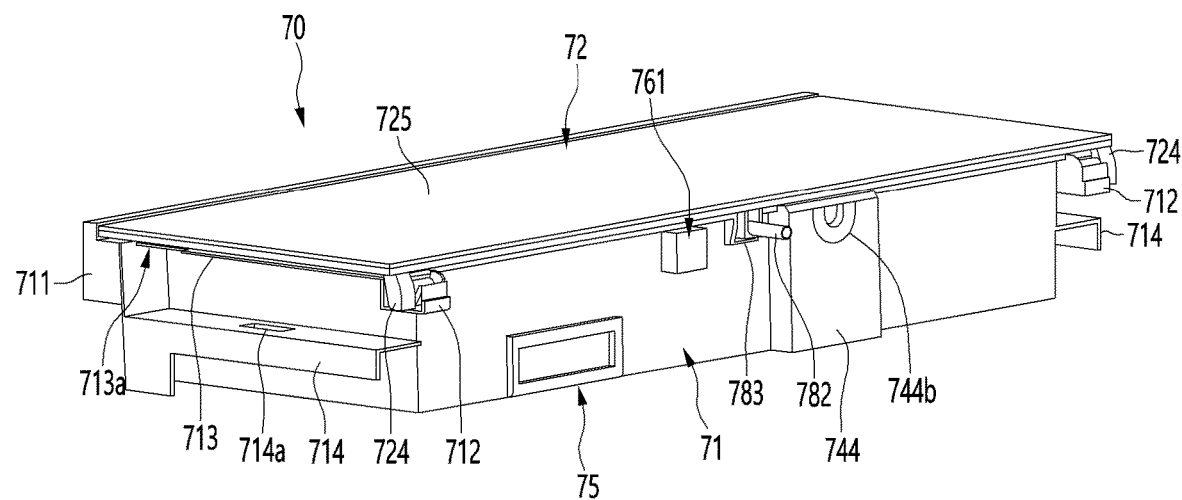
FIG. 38 is a rear perspective view of the water tank.
Figure 39:
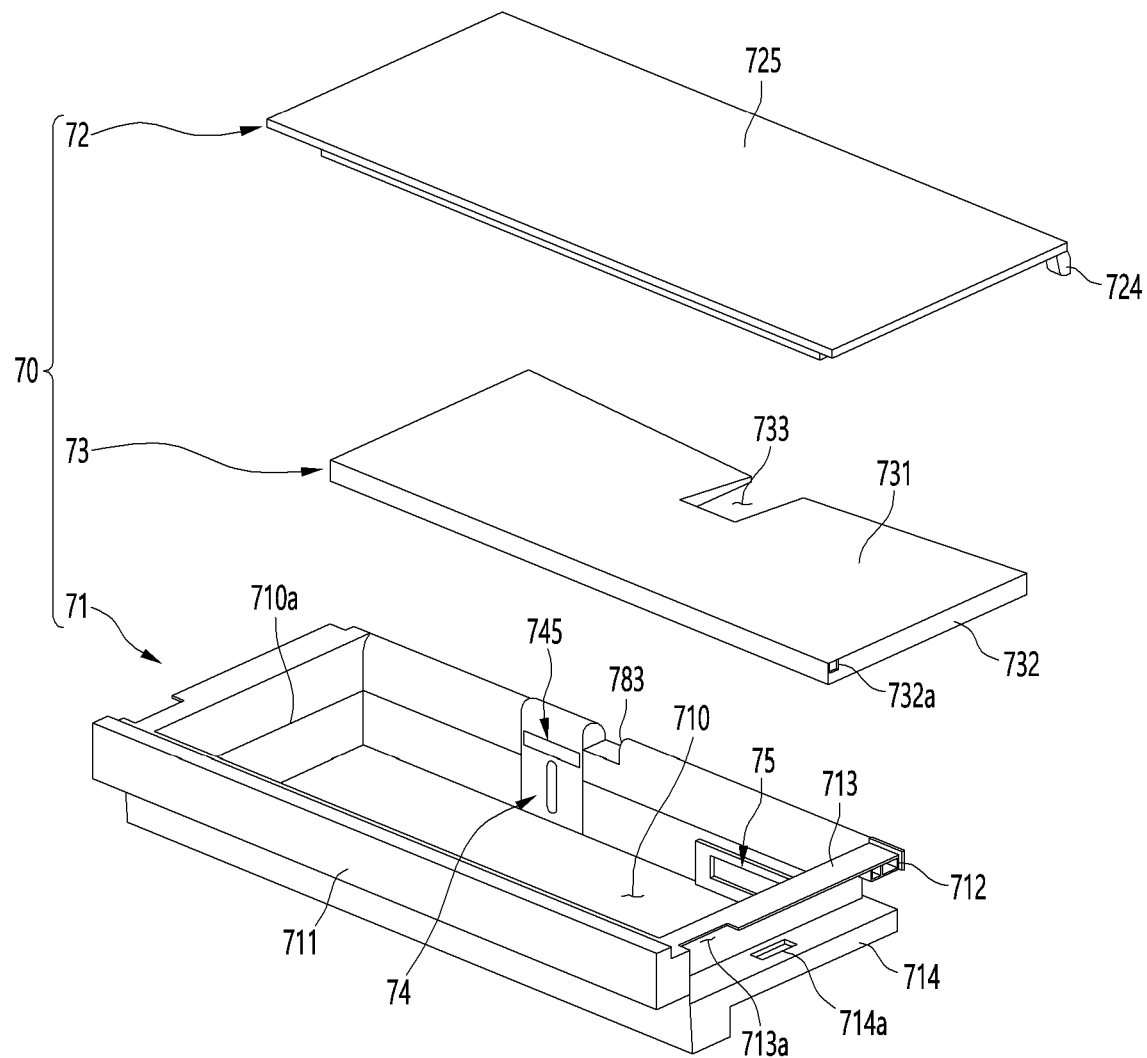
FIG. 39 is an exploded perspective view of the water tank.
Figure 40:
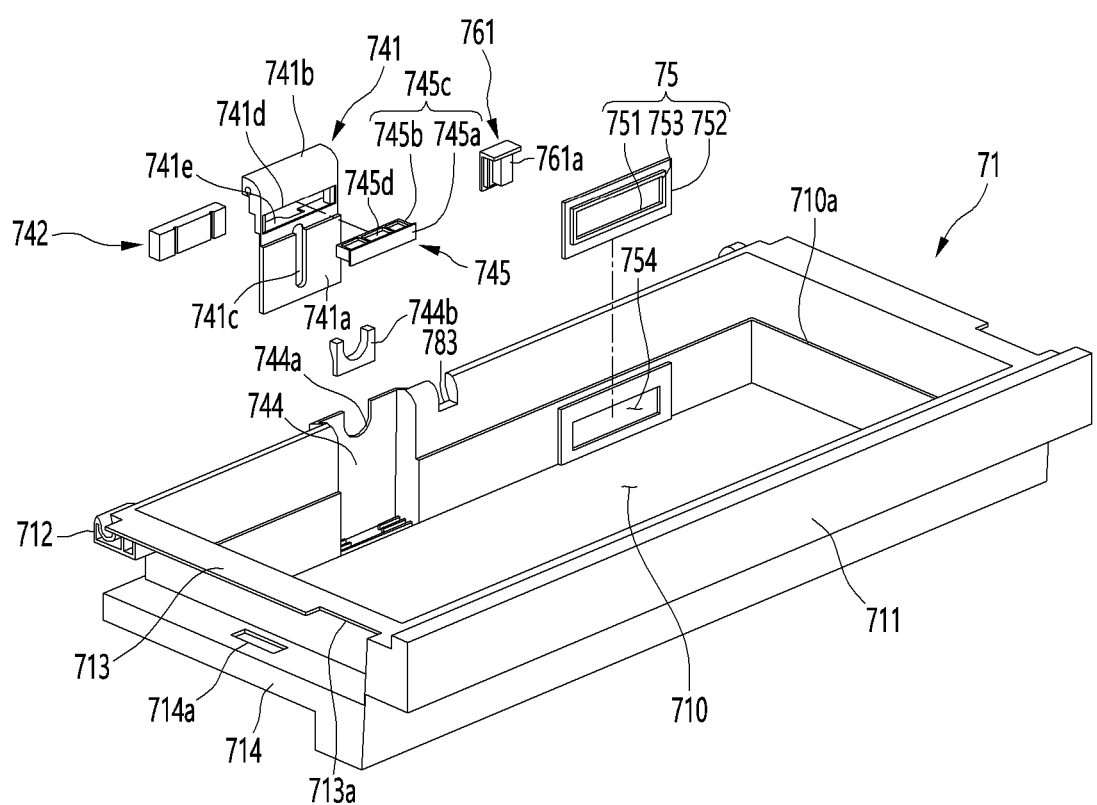
FIG. 40 is a front perspective view illustrating a tank body of the water tank.
Figure 41:
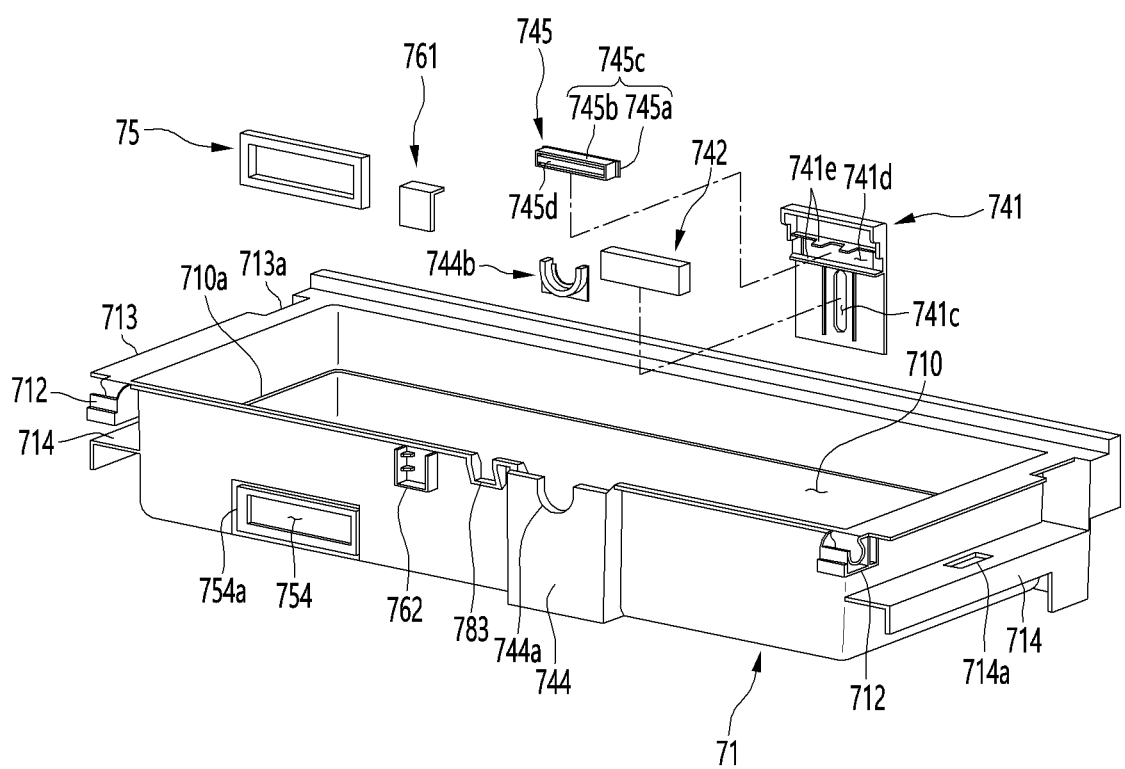
FIG. 41 is an exploded rear perspective view of the tank body.

FIG. 38 is a rear perspective view of the water tank. FIG. 39 is an exploded perspective view of the water tank. FIG. 40 is a front perspective view illustrating the tank body of the water tank. FIG. 41 is an exploded rear perspective view of the tank body.

As illustrated in the drawings, the water tank 70 may include a tank body 71, in which water supplied to the cultivation shelf 30 and water drained from the cultivation shelf 30 are stored, a tank cover 72 that opens and closes an open top surface of the tank body 71, and an inner cover 73 provided inside the tank body 71. A tank handle 711 configured to be held by the user may be disposed on a front surface of the tank body 71 to draw in and out the water tank 70, and a rail mounting portion 714 coupled to the tank rail 791 may be disposed on each of both lateral or left and right sides of the tank body 71. A bottom surface of the rail mounting portion 714 may be open to be seated on the tank rail 791.

The tank fixing hole 714a may be defined in the top surface of the rail mounting portion 714. The tank fixing hole 714a may be open at a position corresponding to the tank fixing protrusion 791d, and when the water tank 70 is installed, the tank fixing protrusion 791d may be inserted into the tank fixing hole 714a.

A side edge 713 protruding to the outside may be disposed on an upper end of each of both side surfaces of the tank body 71, and a cover groove 713a recessed inward may be defined in the side edge 713. When the tank cover 72 is opened, a user's finger may pass through the cover groove 713a to lift the tank cover 72, thereby opening the tank cover 72.

A cover connection portion 712 on which a protruding cover rotational shaft 724 is mounted on both sides of a rear end of the tank cover 72 may be disposed on each of both left and right ends of the rear surface of the tank body 71. Thus, the tank cover 72 may rotate with respect to the cover rotational shaft 724 and may open and close the open top surface of the tank body 71.

The water inlet 744 may be provided in a rear surface of the tank body 71. In addition, a nozzle insertion hole 744a may be defined in an upper end of the water inlet 744. The nozzle insertion hole 744a may be defined at a position corresponding to the drain nozzle 873 so that the drain nozzle 873 is inserted when the water tank 70 is drawn in.

A nozzle packing 744b may be further disposed on the nozzle insertion hole 744a. The nozzle packing 744b may be made of a soft rubber or silicon material, for example, and may be disposed along the nozzle insertion hole 744a. In addition, the nozzle packing 744b may be open so that the drain nozzle 873 is inserted, and when the drain nozzle 873 is inserted, the nozzle packing 744b may be in contact with a circumference of the drain nozzle 873 to prevent water from leaking.

The drain nozzle 873 may pass through the nozzle insertion hole 744a to protrude to the inside of the water inlet 744. The water discharged from the drain nozzle 873 may be introduced into the water tank 70 through the nozzle insertion hole 744a.

The water inlet 744 may protrude backward from the rear surface of the tank body 71 and may define a space recessed backward therein. In addition, a water inlet cover 741 may be disposed on the inner surface of the tank body 71 corresponding to the water inlet 744. The water inlet cover 741 may be coupled to the tank body 71 to shield the open front and top surfaces of the water inlet 744. In a state in which the water inlet cover 741 is mounted, a space in which the tank floater 742 is accommodated may be defined between the water inlet 744 and the water inlet cover 741.

The water inlet cover 741 may include, as a whole, a cover front surface 741a spaced apart from the water inlet 744, and a cover top surface 741b extending backward from an upper end of the cover front surface 741a. In the state in which the water inlet cover 741 is mounted, the cover front surface 741a may define an inner surface of the tank body 71. In addition, a cover top surface 741b may shield a top surface of the inner space of the water inlet 744.

A water level display opening 741c that is cut in the vertical direction may be open in the cover front surface 741a. The water level display opening 741c may define a path through which water is introduced into the water tank 70 together with display of a water level of the tank body 71.

A tank floater 742 may be provided in the space 740 spaced apart between the water inlet cover 741 and the tank body 71. The tank floater 742 may be made of a foamable material that floats on water and may have an identifiable color. Thus, the tank floater 742 may move vertically according to the water level of the tank body 71, and the water level of the tank body 71 may be intuitively displayed through the water level display opening 741c. In addition, the tank floater 742 may include a magnet and may be disposed at a position corresponding to the tank water level detection device 743.

The water inlet 744 may be provided with a water filter 745 for removing foreign substances in the water. The water filter 745 may be disposed between the nozzle insertion hole 744a and the water level display opening 741c, and thus, may filter the foreign substances in the water introduced into the tank body.

For example, the water filter 745 may be mounted on the water inlet cover 741. A filter mounting hole 741d may be open on the cover front surface of the water inlet cover 741. The filter mounting hole 741d may extend in a horizontal direction and may extend above the water level display opening 741c in a direction crossing the water level indication opening 741c. In addition, the filter mounting hole 741d may be defined below the nozzle insertion hole 744a. In addition, the filter mounting hole 741d and the water filter 745 may be disposed between the drain nozzle 873 and the inner cover 73.

The water filter 745 may be inserted and mounted inside the tank body 71 through the filter mounting hole 741d. In addition, the water filter 745 may be detachable to be replaceable, if necessary, and may be periodically replaced to maintain purification performance for the foreign substances in the water introduced into the water tank 70.

An insertion guide 741e for guiding the insertion of the water filter 745 may be disposed on each of top and bottom surfaces of the filter mounting hole 741d. The insertion guide 741e may be disposed along each of upper and lower ends of the filter mounting hole 741d and may extend backward so as to be supported even in a state in which the water filter 745 is mounted.

The water filter 745 may include a filter member 745d that filters the foreign substances, and a filter case 745c in which the filter member 745d is mounted. The filter member 745d may be configured to filter foreign substances, algae, and mold, for example, in water and may be configured to a degree that is sufficient to filter only foreign substances while allowing water to pass therethrough. For example, the filter member 745d may be made of a mesh or fabric material.

The filter member 745d may have a size capable of being accommodated in the filter case 745c and may partition the water filter 745 in a state in which the water filter 745 is mounted on the water inlet 744. Therefore, all of the water introduced into the water inlet 744 may pass through the water filter 745.

The filter case 745c may include a case cover portion 745a that shields the filter mounting hole 741d, and a case frame portion 745b protruding backward from a rear surface of the case cover portion 745a and configured to accommodate the filter member 745d. The case frame portion 745b may protrude from the rear surface of the case cover portion 745a and may be disposed along a circumference of the filter member 745d. In addition, at least a portion of the upper and bottom surfaces of the case frame portion 745b may be open to allow water to pass therethrough. In addition, at least a portion of the case frame portion 745b may be separated to replace the filter member 745d as necessary. In the water filter 745, the case cover portion 745a may shield the filter mounting hole 741d in a state of being inserted into the filter mounting hole 741d, and the case frame portion 745b may partition the inside of the water inlet 744.

A water outlet groove 783 into which a tank water outlet 78 described hereinafter is inserted may be defined in the rear surface of the tank body 71. The water outlet groove 783 may be recessed downward from the upper end of the tank body 71 so that the tank water outlet 78 is accessible.

The tank water outlet 78 fixed to the tank cover 72 may be disposed to pass through the water outlet groove 783 when the tank cover 72 is closed. When the tank cover 72 is opened, the tank water outlet 78 may rotate together with the tank cover 72, and the water outlet groove 783 may interfere with the rotating tank water outlet 78.

The tank water outlet 78 may be a portion, through which water supplied to the cultivation shelf 30 is discharged from the inside of the water tank 70, and may protrude backward from the rear surface of the tank body 71. An end of the tank water outlet 78 may be inserted into the fitting 821 exposed on the front surface of the pump cover 81 when the water tank 70 is drawn in. The fitting portion 821 may be connected to the pump input tube 822, and water in the water tank 70 may be introduced to the pump 82 through the tank water outlet 78 and the pump input tube 822.

A detection member mounting portion 762 to which a tank detection member 761 is mounted may be disposed on the rear surface of the tank body 71. The tank detection member 761 may be disposed at a position facing the tank detection device 812 provided inside the pump cover 81 and may be configured to detect whether the water tank 70 is drawn in.

The tank body 71 may define an upwardly open water storage space 710. Water to be supplied to the cultivation space 100 and water collected from the cultivation space 100 may be stored in the water storage space 710.

In addition, a transmission window 75 may be provided on the rear surface of the tank body 71. The transmission window 75 may transmit light irradiated from a light irradiation device (sterilizer) 89 described hereinafter and may be disposed at a lower end of the rear surface of the tank body 71 and be disposed at a left side of both left and right sides with respect to a center of the tank body 71.

The transmission window 75 may be disposed at a position corresponding to the light irradiation device 89 and may be adjacent to the light irradiation device 89 in a state in which the water tank 70 is drawn in. Thus, light of the sterilizer may pass through the transmission window 75 and be irradiated into the tank body 71. In this case, the transmission window 75 and the light irradiation device 89 may be disposed below the inner cover 73 to effectively irradiate the water inside the water tank 70 with ultraviolet (UV) rays.

The transmission window 75 may include a transmission plate 751, a transmission window frame 752, and a transmission window gasket 753. The transmission plate 751 may be made of a transparent material, such as glass or acrylic and may shield a rear opening 754 defined in the tank body 71. In this case, a size of the rear opening 754 may be less than that of the transmission plate 751. In addition, a recessed frame mounting portion 754*a* may be disposed on a circumference of the rear opening 754 to seat a circumferential portion of the transmission window 75.

The transmission window frame 752 may be disposed around the transmission plate 751. The transmission window frame 752 may be disposed along a circumference of the transmission plate 751 and may be mounted on the frame mounting portion 754*a*. In addition, the transmission window gasket 753 may be provided on the transmission window frame 752, and the transmission window gasket 753 may seal a gap between the transmission window frame 752 and the rear surface of the tank body 71.

The tank cover 72 may include a cover plate 721 that is provided in a plate shape to shield the open top surface of the tank body 71, and a cover guide portion 722 protruding from a bottom surface of the cover plate 721. The cover plate 721 may define the top surface of the water tank 70 in a closed state. A separate decoration plate 721*a* for an exterior may be further provided on the top surface of the cover plate 721.

The cover rotational shaft 724 serving as a rotational shaft of the tank cover 72 may be disposed on both lateral or left and right sides of a rear end of the cover plate 721 and may be rotatably connected to the cover connection part 712 of the tank body 71.

Figure 42:
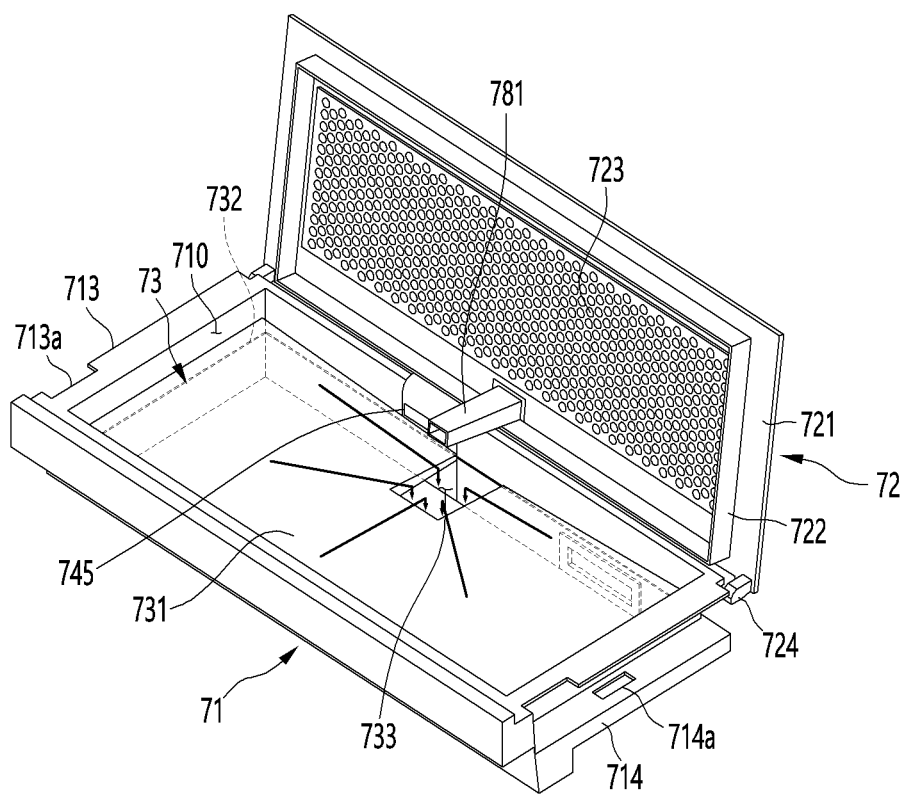
FIG. 42 is a perspective view illustrating a state in which the water tank is opened.
Figure 43:
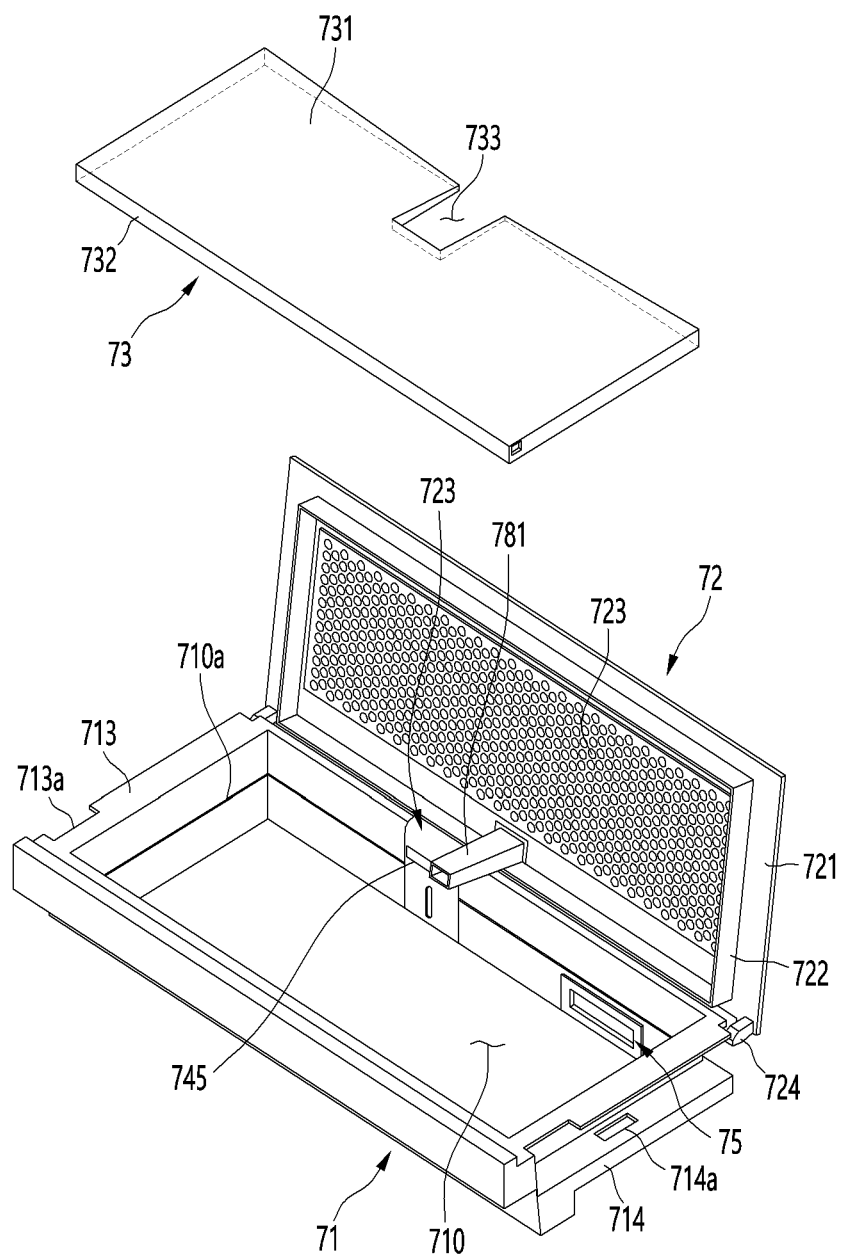
FIG. 43 is a perspective view illustrating a state in which an inner cover of the water tank is separated.

FIG. 42 is a perspective view illustrating a state in which the water tank is opened. FIG. 43 is a perspective view illustrating a state in which the inner cover of the water tank is separated.

As illustrated in the drawings, a cover guide portion 722 may be disposed on a bottom surface of the tank cover 72. The cover guide portion 722 may protrude downward from the bottom surface of the cover plate 721 and may be provided in a shape corresponding to the open top surface of the water storage space 710. Thus, when the tank cover 72 is closed, the cover guide portion 722 may be in contact with the inner surface of the water storage space 710. Thus, when water droplets generated on the rear surface of the tank cover 72 flow down when the tank cover 72 is opened, the water may be introduced into the water storage space 710 through the cover guide portion 722.

A water collection portion 723 may be disposed in an inner region of the cover guide portion 722. The water collection portion 723 may be provided as a small groove that is sufficient to allow water droplets to form and may be provided to occupy most of the inner region of the cover guide portion 722. Therefore, even if dew condensation occurs on the rear surface of the tank cover 72, the water droplets may be maintained in the water collection portion 723 by surface tension of water, and when the tank cover 72 is opened, a large amount of water may not flow along the tank cover 72.

The tank water outlet 78 may be provided in a center of the rear end of the tank cover 72. The tank water outlet 78 may define a passage through which the water of the water tank 70 is supplied to the outside of the water tank 70 and may extend from an inner lower end of the tank cover 72 to protrude toward the rear surface of the tank 70.

The tank water outlet 78 may include a first water outlet 781 and a second water outlet 782. The first water outlet 781 may extend from the bottom surface of the tank cover 72 to the bottom surface of the tank body 71 to define a first passage. In this case, at least a portion of the lower end of the first water outlet 781 may be spaced apart from the bottom surface of the tank body 71 to define an inlet through which the water inside the tank body 71 is introduced.

A buffer member (buffer) 784 may be inserted into a lower end of the first water outlet 781. The buffer member 784 may be made of a rubber or silicone material, for example, and may be mounted on a lower end of the first water outlet 781. Thus, even if the lower end of the first water outlet 781 is in contact with the tank body 71 during the opening and closing process of the tank cover 72, the tank cover 72 may be prevented from being damaged by an impact. In addition, the buffer member 784 may be provided so that a center thereof communicates with the first water outlet 871.

In addition, the second water outlet 782 may extend from an upper end of the first water outlet 781 to the rear side, that is, in a direction in which the water tank 70 is drawn in, to define a second passage and also may extend backward by passing through the tank body 71. In this case, the second passage may communicate with the first passage.

The second water outlet 782 may be inserted into the fitting portion 821 in a state in which the water tank 70 is drawn in to communicate with the water tank 70 and the sub tank 82. The second water outlet 782 may protrude through the water outlet groove 783. In addition, the second water outlet 782 may rotate together when the tank cover 72 rotates, and the second water outlet 782 may not interfere with the tank body 71 even when the tank cover 72 rotates by the recessed water outlet groove 783.

The tank water outlet 78 may be integrated with the tank cover 72. At least a portion of the tank cover 72 may be injection-molded using a plastic material, for example, and the tank water outlet 78 may be molded together when the tank cover 72 is molded. For example, the tank water outlet 78 may be molded together with the cover plate 721. Thus, the tank water outlet 78 may not provide a coupling portion through which the water leaks and may maintain a negative pressure when the water inside the water tank 70 is suctioned so that a set or predetermined amount of water is supplied via the first passage and the second passage when the pump 82 is driven.

If the tank water outlet 78 is separately molded into a first water outlet 781 and a second water outlet 782 and has a structure coupled to the tank cover 72, a disconnected portion may occur between the first passage and the second passage, and thus, external air may be introduced by assembly dispersion when the pump 82 is driven. When water and air are mixed into the tank water outlet 78 during the suction process by driving the pump 82, a normal operation of the pump 82 may be disturbed by the air introduced into the pump 82. However, the tank water outlet 78 in this embodiment may be integrated with the tank cover 72, and thus, there is no assembled portion between the first passage and the second passage, thereby preventing possibility of such a limitation from occurring. In addition, the cover plate 721, the cover guide portion 722, the water collection portion 723, and the tank water outlet 78, which constitute the tank cover 72, may be integrally injection-molded.

An inner cover mounting portion 710a on which the inner cover 73 is seated may be provided on the inner surface of the tank body 71, that is, the water storage space 710. The inner cover mounting portion 710a may be disposed along the inner surface of the tank body 71 and may be provided to have a same height. In addition, a height of the inner cover mounting portion 710a may correspond to a height that is capable of being recognized as a full water level by the tank water level detection device 743. Thus, the inner cover 73 may intuitively display the full water level while being mounted on the inner cover mounting portion 710a.

The inner cover 73 may be mounted inside the tank body 71 to facilitate a user's water supply and may be configured to prevent water within the water tank 70 from overflowing.

The inner cover 73 may be mounted inside the tank body 71 and may have a size capable of partitioning the water storage space 710 vertically. In addition, the inner cover 73 is provided to be transparent or translucent, and thus, the water level of the water storage space 710 under the inner cover 73 may be confirmed in the state in which the inner cover 73 is mounted on the tank body 71.

The inner cover 73 may include a plate portion 731 defining a top surface, and an edge portion 732 extending downward along a circumference of the plate portion 731. The plate portion 731 may correspond to a cross-sectional shape of the inside of the tank body 71, that is, the water storage space 710 to partition the inside of the water storage space 710 vertically.

In addition, a plate cutoff portion 733 may be defined in a center of a rear end of the plate portion 731. The plate cutoff portion 733 may be recessed at a rear end of the plate 731 and may be defined at a position corresponding to the tank water outlet 78.

The tank water outlet 78 may rotate together when the tank cover 72 rotates, and the plate cutoff portion 733 may be recessed more than a rotational radius of the tank water outlet 78 to prevent the tank cover 72 from rotating. Thus, even when the tank cover 72 is opened and closed, the inner cover 73 and the tank water outlet 78 may not interfere with each other. That is, the plate cutoff portion 733 may be recessed more than a length of the first water outlet 781 and may be cut larger than a width of the first water outlet 781.

The plate cutoff portion 733 may serve as an inlet through which the water is introduced when the box is filled with water. For this, the plate portion 731 may have an inclination that gradually decreases backward from the front and an inclination that gradually decreases toward a center from both lateral of left and right sides. That is, a height of the plate portion 731 may be lowered from an outer end of the plate portion 731 toward the plate cutoff portion 733.

Thus, as illustrated in FIG. 42, when water is supplied to the top surface of the inner cover 73, that is, to the plate portion 731 in a state in which the inner cover 73 is mounted, the water supplied by the inclined structure may fall downward after passing through the plate cutoff portion 733 so as to be filled into the tank body 71. That is, even if water is supplied from any position inside the tank body 71 in the state in which the tank cover 72 is opened, the water may flow along the plate 731 to fall downward through the plate cutoff portion 733.

In this case, the user may fill the water into the tank body 71 up to the inner cover 73. A mounted position of the inner cover 73 may corresponds to a full water level of the tank body 71. Thus, the user may fill the water up to a position of the inner cover 73 so that the water tank is filled to a full and appropriate water level. That is, there is an advantage that the full water level and the appropriate water level may be intuitively determined without checking the water level of the tank body 71 when water added.

In addition, the edge portion 732 may extend downward, and an extending lower end of the edge portion 732 may be supported by the inner cover mounting portion 710a. Thus, in the inner cover 73, the edge portion 732 may be supported from below by the inner cover mounting portion 710a, and the edge portion 732 may be in contact with the inner surface of the tank body 71.

The inner cover mounting portion 710a may be provided to be stepped on the inner surface of the tank body 71, and the protruding upper end may support a lower end of the edge portion 732. In this case, the inner cover mounting portion 710a and the edge portion 732 may be provided to be stepped in a shape to be engaged with each other and may be more firmly coupled to each other.

In addition, a cover restriction groove 732a may be further defined in each of both side surfaces of the edge portion 732. The cover restriction groove 732a may be defined so that the cover restriction protrusion (see reference numeral 710b in FIG. 47) protruding from the inner surface of the tank body is inserted. In the state in which the inner cover 73 is mounted to be supported by the inner cover mounting portion 710a, the cover restriction protrusion 710b may be inserted into the cover restriction groove 732a. Thus, the inner cover 73 may be maintained in a stably mounted state inside the tank body 71.

If necessary, the user may transport the water tank 70 by separating the water tank 70 from the tank rail 791. More particularly, even when the water tank 70 is filled with a large amount of water, or a culture solution is added, the water tank 70 may be moved and transported in the state in which the water is filled.

In the state in which the inner cover 73 is mounted inside the tank body 71, the water storage space 710 may be partitioned vertically. Therefore, even when the water tank 70 is drawn out, or the water tank 70 is separated from the tank rail 791 to move, the water inside the water tank 70 may be prevented from overflowing by the inner cover 73.

The inner cover 73 may be mounted to be detachable from the tank body 71 as necessary. The inner cover 73 may be removed for cleaning the inside of the tank body 71 or replacing or maintaining the water filter 745. In this case, the inner cover 73 may be separated upward in the state in which the tank cover 72 is opened.

Hereinafter, a connection state at a main portion of the water tank 70 will be described with reference to the drawings.

Figure 44:
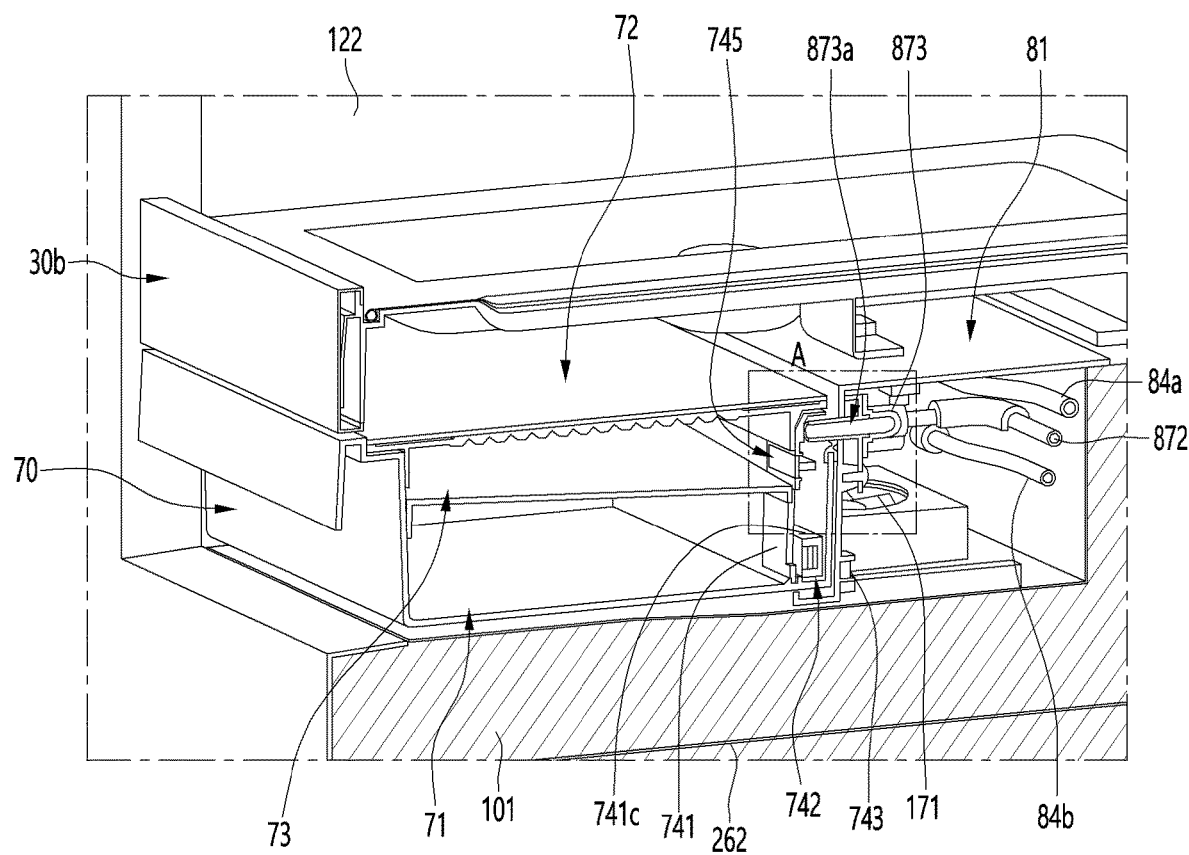
FIG. 44 is a cutaway perspective view illustrating a structure in which water is introduced into the water tank.
Figure 45:
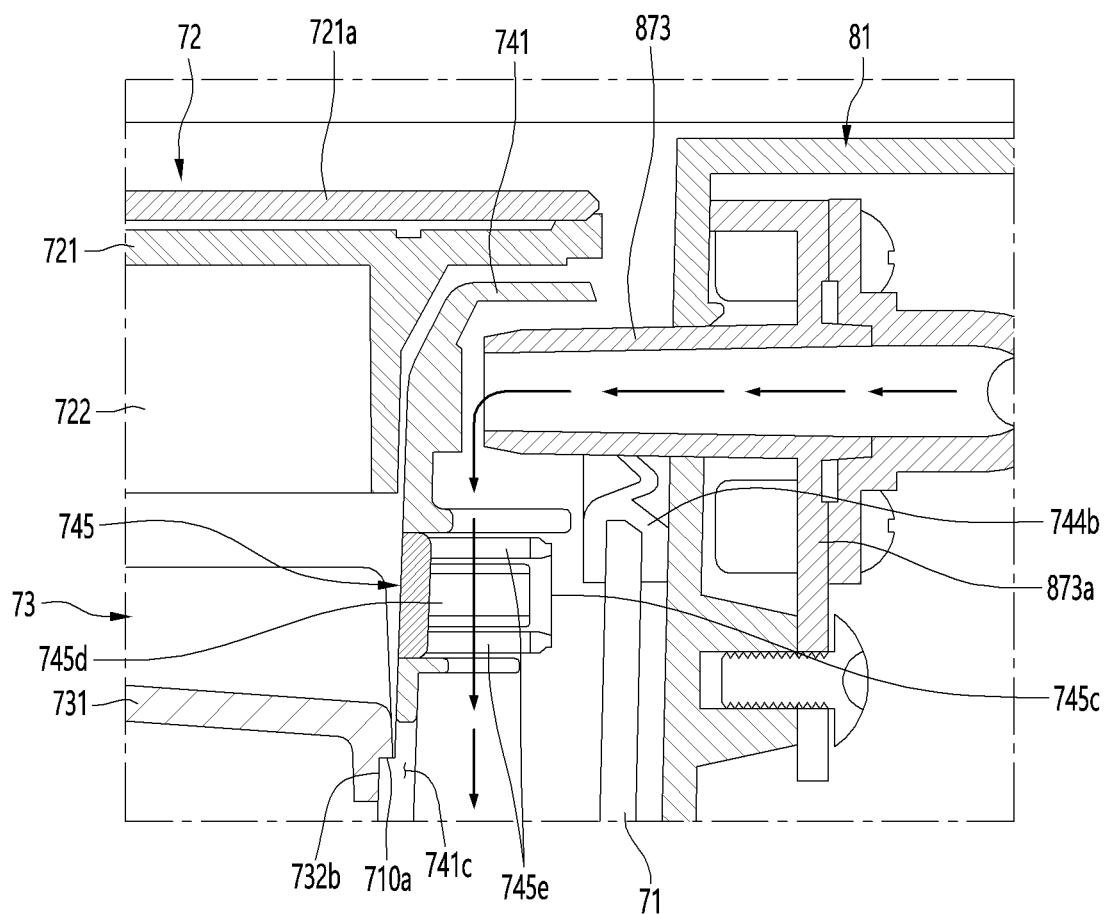
FIG. 45 is an enlarged view illustrating a portion A of FIG. 44.

FIG. 44 is a cutaway perspective view illustrating a structure in which water is introduced into the water tank. FIG. 45 is an enlarged view illustrating a portion A of FIG. 44.

Referring to the drawings, the water drained from the cultivation shelf 30 may flow along the drain tube 87 and may be discharged to the water tank 70 through the drain nozzle 873. In the state in which the water is drained to the cultivation shelf 30, the water tank 70 is maintained in a fully drawn-in state. In addition, in the state in which the water tank 70 is drawn in, the drain nozzle 873 may be inserted into the nozzle insertion hole 744a so as to be disposed inside the water inlet 744. In such a state, when the water of the cultivation shelf 30 is drained along the water supply tube 84, the water may be introduced into the accommodation portion 744 through the drain nozzle 873, and the outlet of the drain nozzle 873 may be disposed above the water filter 745 in the inside of the water inlet 744.

Thus, the water drained through the drain nozzle 873 may pass through the water filter 745 while falling from the inside of the water inlet 744. The outlet of the drain nozzle 873 and the water filter 745 may be adjacent to each other, and thus, even if the water filter 745 does not completely partition the inside of the water inlet 744, most of the drained water may pass through the water filter 745.

The water filter 745 may filter foreign substances, such as algae and mold, contained in the water drained through the drain nozzle 873, and thus, the filtered water may be supplied to the inside of the water tank 70. Thus, the occurrence of algae or mold in the water stored in the water tank 70 may be prevented, and further, clean water may be circulated through the cultivation shelf 30 and the water tank 70.

The water passing through the water tank 70 may fall downward from the inside of the water inlet 744. In addition, the water may flow into the inner space of the water tank 70, that is, the water storage space through the water level display opening opened in the water inlet 744.

The water inlet 744 and the water storage space 710 may communicate with each other through the water level display opening 741c, and when a water level of the water storage space 710 ascends, the water level inside the water inlet 744 may also ascend in the same manner, and thus, the tank floater 742 ascends. Thus, the water level of the water tank 70 may be visually displayed, and water level information may be detected through the tank level detection device 743.

The full water level of the water storage space 710 may be up to the lower end of the inner cover 73. Therefore, even if there is movement of the plant cultivation apparatus 1 or the water tank 70 in the state in which the water is filled up to the full water level, the water in the water tank 70 may not overflow to the outside. The full water level of the water storage space 710 may correspond to the inner cover mounting portion 710a.

Figure 46:
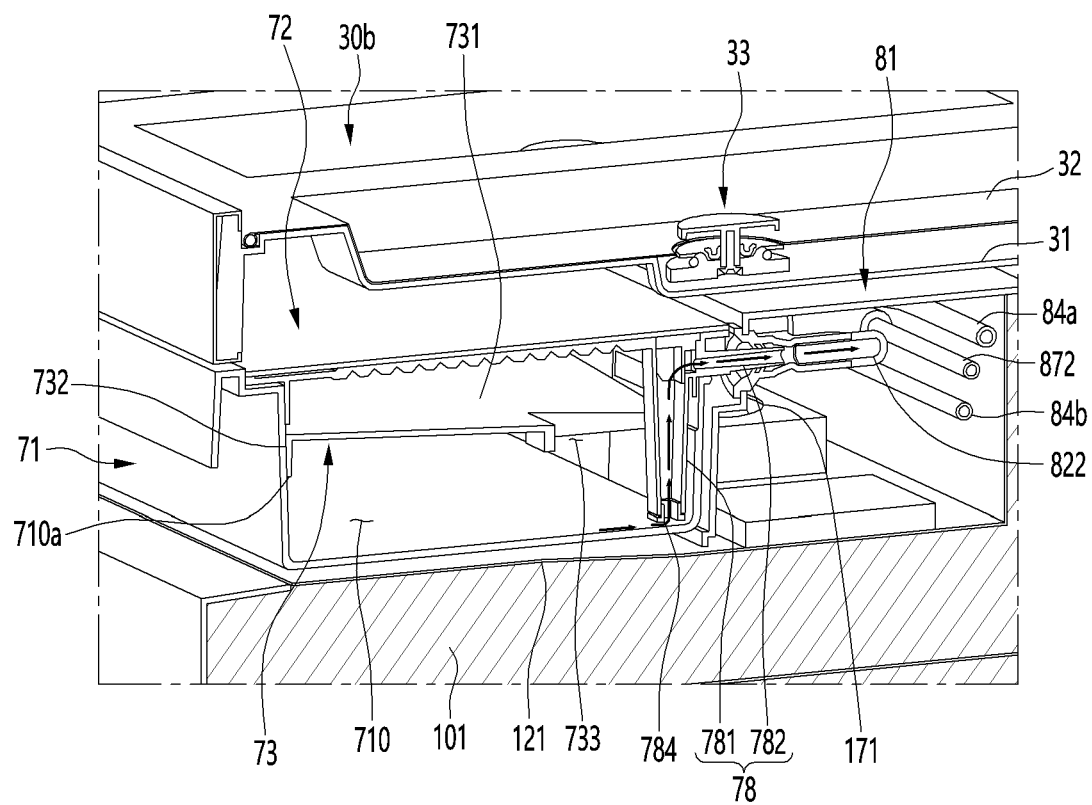
FIG. 46 is a cutaway perspective view illustrating a structure in which the water is discharged from the water tank.

FIG. 46 is a cutaway perspective view illustrating a structure in which the water is discharged from the water tank. Referring to the drawing, in the state in which the water tank 70 is drawn in, the rear end of the tank water outlet 78 of the water tank 70 may be inserted into the fitting portion 821. Thus, the tank water outlet 78 and the pump input tube 822 may be connected to each other through the fitting portion 821, and the water tank 70 and the pump 82 may communicate with each other. In this state, when the pump 82 is driven, the water in the water tank 70 may be supplied to the pump 82, and the pump 82 may be driven for a set or predetermined time to supply a set or predetermined amount of water to the cultivation shelf 30.

The first water outlet 781 may extend to the bottom of the water tank 70 to suction the water inside the water tank 70, and also, the water within the water tank 70 may be supplied until the water within the water tank 70 runs out completely. In addition, when the water level of the water tank 70 is below a set or predetermined water level, the tank level detection device 743 may detect this situation to stop the pump 82. Thus, the state in which water is filled above the set water level in the sub tank 82 may be maintained to prevent air from being mixed into the pump 82.

The second water outlet 782 may extend backward from the upper end of the first water outlet 781 so as to be inserted into the fitting portion 821. Thus, the water suctioned through the first water outlet 781 and flowing upward may flow backward through the second water outlet 782 and then be supplied to the pump 82 through the fitting portion 821 and the pump input tube 822.

The water in the water tank 70 may be supplied to the cultivation shelf 30 by driving the pump 82. The pump output tube 823 may be connected to the valve 83 to selectively supply water to the upper cultivation shelf 30a and the lower cultivation shelf 30b according to the selective opening and closing of the upper valve 83a and the lower valve 83b.

In addition, continuous water circulation may be performed between the water tank 70 and the cultivation shelf 30 by the water supply module and the drain module. Therefore, when a certain amount of water is filled, water that is necessary for the plant growth may be repeatedly supplied and circulated, and thus, frequent water supply may not be required. The water circulated between the water tank 70 and the cultivation shelf 30 may allow the foreign substances, such as green algae and mold, to be filtered in the water filter 745, thereby maintaining a clean state.

In the structure according to an embodiment, in which plants are grown in a sealed space, and water containing nutrients is circulated between the water tank and the cultivation shelf, it is very important to maintain the circulated clean water. For this, in the cultivation shelf 30, the exposure of the supplied water may be fundamentally prevented to minimize possibility of contamination, and the foreign substances in the circulated water may be physically removed using the water filter 745, and also, the water stored in the water tank 70 may be sterilized using the plant cultivation apparatus 1 so as to be maintained in a more sanitary and clean state.

Figure 47:
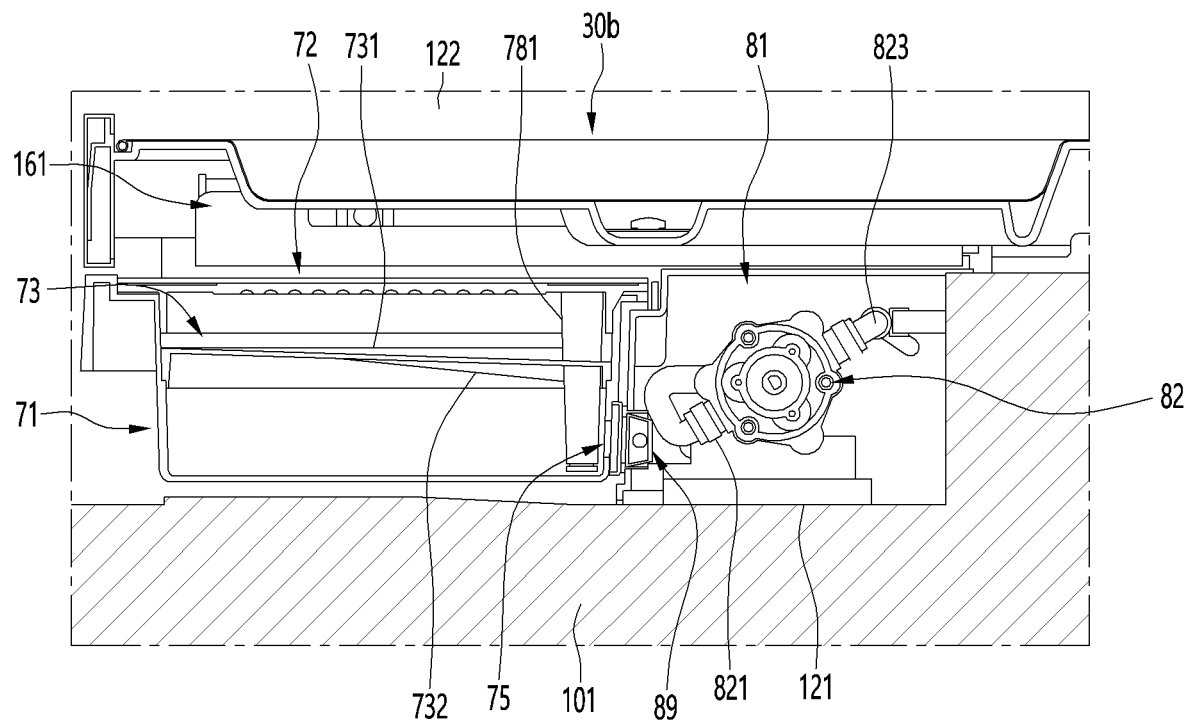
FIG. 47 is a cutaway perspective view illustrating a structure in which light is irradiated to the water tank.
Figure 48:
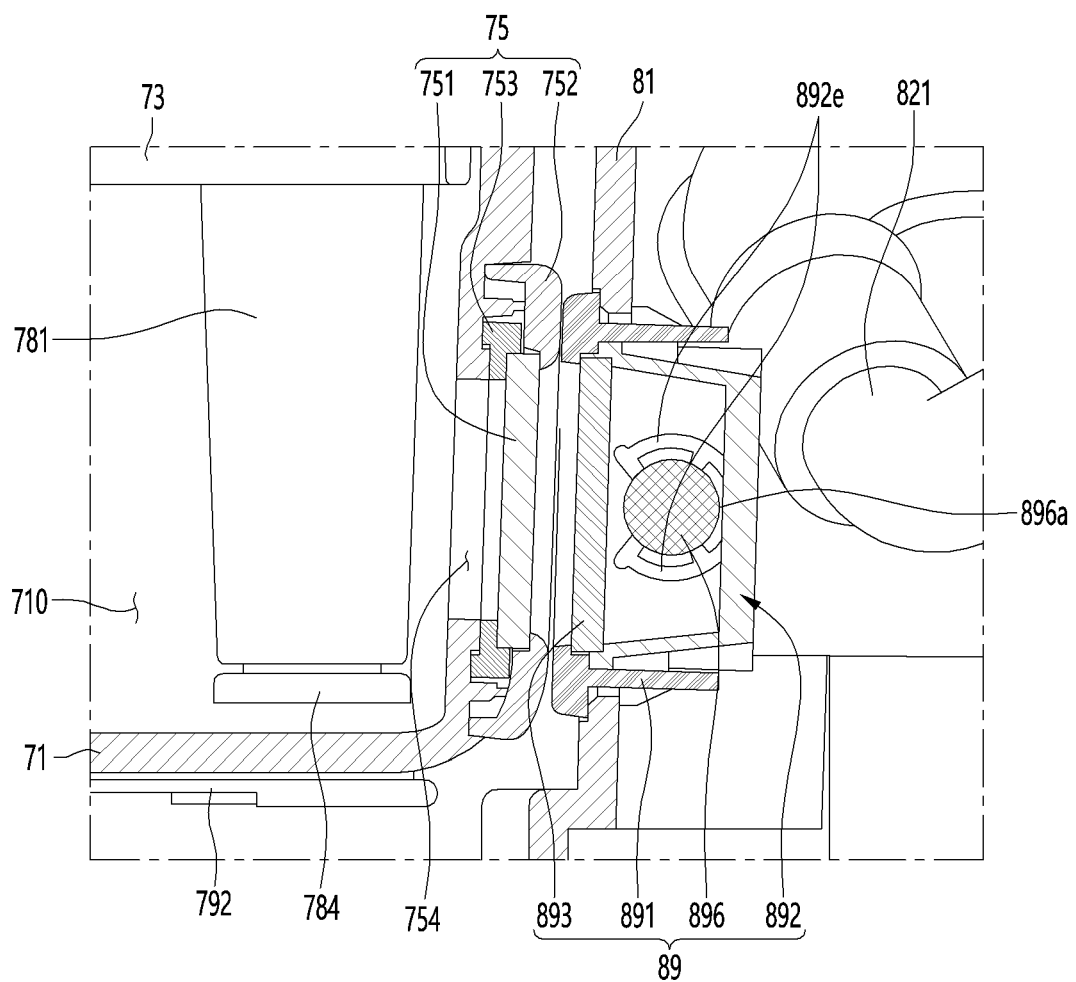
FIG. 48 is an enlarged view illustrating a portion B of FIG. 47.

FIG. 47 is a cutaway perspective view illustrating a structure in which light is irradiated to the water tank. FIG. 48 is an enlarged view illustrating a portion B of FIG. 47.

Referring to the drawings, a light irradiation device 89 that irradiates ultraviolet rays (UV) into the water tank 70 is disposed behind the water tank 70 to sterilize the water inside the water tank 70 and further prevent pollutants, such as algae and mold, from growing. The light irradiation device 89 may be provided on the front surface of the pump cover 81 and may be provided at a position facing the transmission window 75. The light irradiation device 89 may sterilize the water inside the water tank 70 by irradiating ultraviolet rays, and thus, may be referred to as a sterilization device or sterilizer, or an ultraviolet irradiation device. Alternatively, the light irradiation device 89 may be configured to irradiate other light capable of sterilizing the water inside the water tank 70, for example, rather than ultraviolet rays.

The light irradiation device 89 may irradiate a light beam from the front surface of the pump cover 81 toward the front, and at least a portion of the light irradiation device 89 may overlap the transmission window 75 to irradiate the light beam into the water tank 70. The window plate 893 and the transmission window 75 defining the front surface of the light irradiation device 89 may have sizes corresponding to positions corresponding to each other.

Thus, in a state in which the water tank 70 is completely drawn in, the transmission window 75 and the front surface of the light irradiation device 89 may be adjacent to each other at positions facing each other. When the light irradiation device 89 is turned on in this state, light of a light source (UV LED) 895, which is irradiated from the light irradiation device 89, may pass through the transmission window 75 and be irradiated into the water tank 70 to sterilize the water inside the water tank 70.

The light irradiation device 89 may include, as a whole, a front case 891 mounted to the pump cover 81, a window plate 893 mounted to the front case 891, a rear case 892 coupled to the front case 891, and a light guide 896 and a light source 897, which are provided in the light irradiation device 89.

Hereinafter, the light irradiation device 89 will be described with reference to the drawings.

Figure 49:
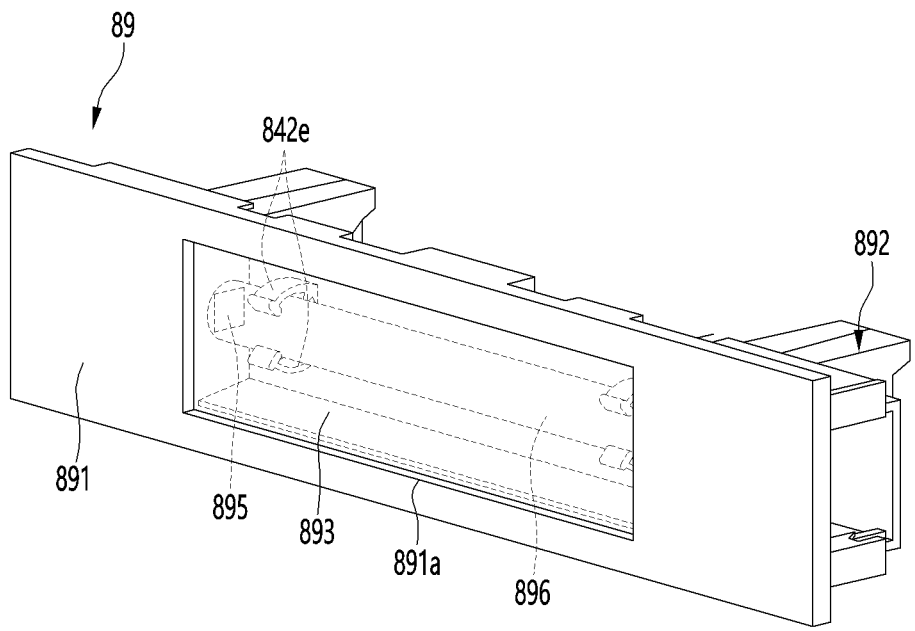
FIG. 49 is a front perspective view illustrating a light irradiation device of the plant cultivation apparatus.
Figure 50:
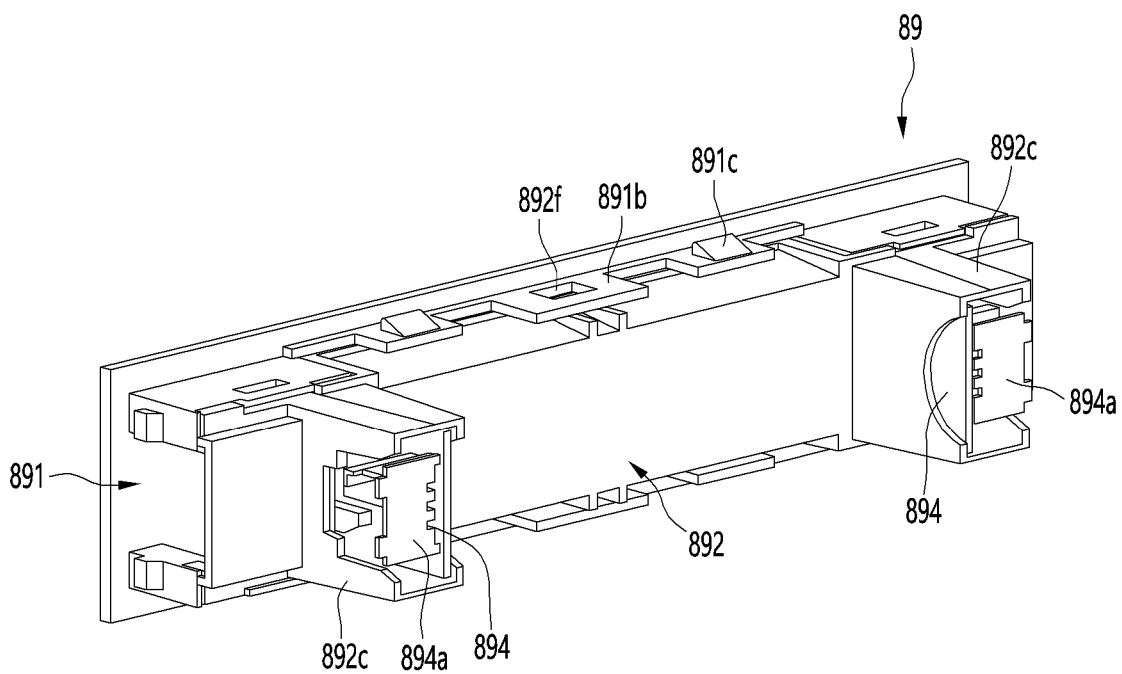
FIG. 50 is a rear perspective view of the light irradiation device.
Figure 51:
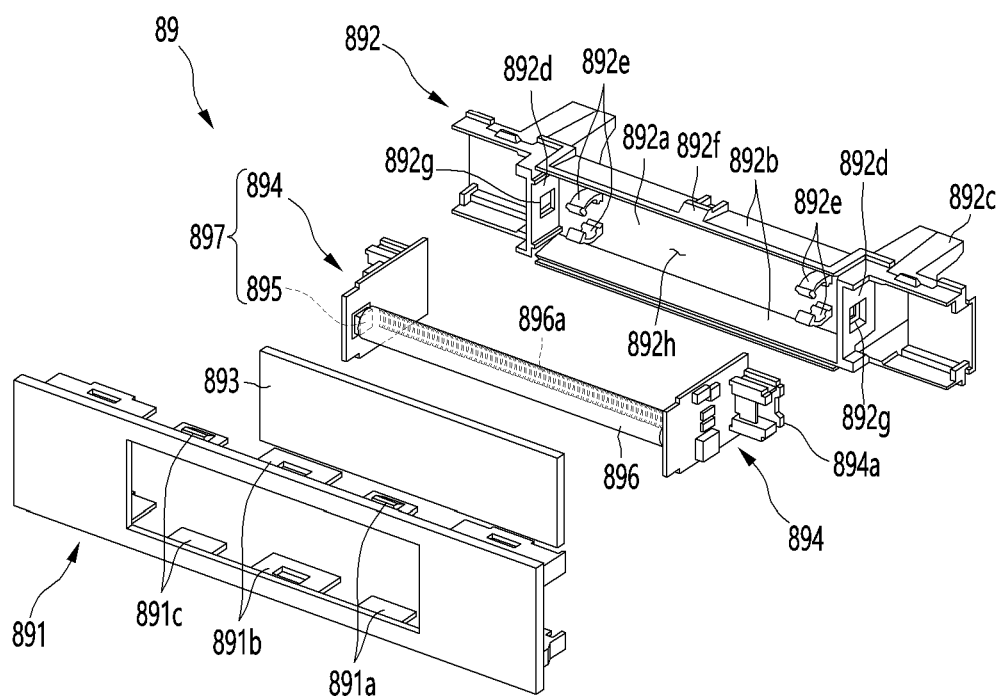
FIG. 51 is an exploded perspective view of the light irradiation device.
Figure 52:
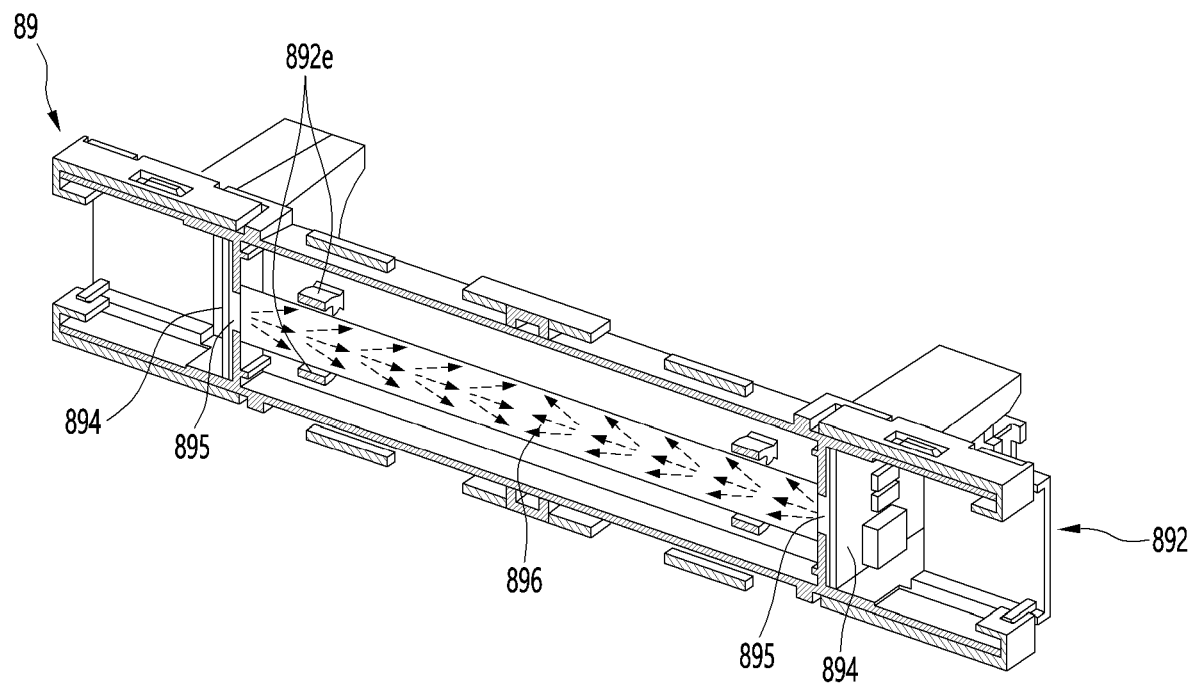
FIG. 52 is a cutaway perspective view, taken along line VXII-VXII' of FIG. 49.

FIG. 49 is a front perspective view illustrating the light irradiation device of the plant cultivation apparatus. FIG. 50 is a rear perspective view of the light irradiation device. FIG. 51 is an exploded perspective view of the light irradiation device. FIG. 52 is a cutaway perspective view, taken along line VXII-VXII' of FIG. 49.

As illustrated in the drawings, the light irradiation device 89 may include front case 891, rear case 892, window plate 893, light guide 896, and light source 897. The front case 891 defines a front surface of the light irradiation device 89 and may be mounted on the front surface of the pump cover 81. Thus, the front case 891 may define an outer appearance exposed to the outside of the pump cover 81.

A front opening 891a may be defined in a center of the front case 891. The front opening 891a may have a width corresponding to a length of the light guide 896, and the entire light guide 896 may be exposed through the front opening 891a. In addition, a vertical width of the front opening 891a may be greater than that of the light guide 896 so that the ultraviolet rays irradiated from the light guide 896 are radiated widely.

The window plate 893 may be mounted in the front opening 891a. In addition, the window plate 893 may shield the front opening 891a in the mounted state. The window plate 893 may be made of a transparent material and may be made of a material capable of transmitting the ultraviolet rays. For example, the window plate 893 may be made of a glass or acrylic material.

A front hook 891c that fixes and mounts the front case 891 to the pump cover 81 may protrude from a rear surface of the front case 891. A plurality of front hooks 891c may be disposed on upper and lower rear surfaces of the front case 891 and may be coupled to the case mounting hole 810c opened in the pump cover 81.

In addition, a front coupling portion 891b may be disposed on a rear surface of the front case 891. The front coupling portion 891b may be configured to be coupled to the rear coupling portion 892f of the rear case 892, and a groove to which the rear coupling portion 892f provided in the hook shape is coupled may be defined. The front coupling portion 891b may be disposed vertically, and a plurality of front coupling portions 891b may be disposed along a circumference of the rear case 892. The front case 891 and the rear case 892 may be coupled to each other by coupling the front coupling portion 891b to the rear coupling portion 892f.

The rear case 892 may be coupled to the front case 891 to define a space in which the light source 897 and the light guide 896 are accommodated. The rear case 892 may be provided with a case body 892a that is spaced apart from the front surface of the front case 891 and faces the front case 891. The case body 892a may define a rear surface of the rear case 892 and thus may be referred to as a case rear surface.

In addition, an extension wall 892b extending forward may be disposed on each of upper and lower ends of the case body 892a. The extension wall 892b may be in contact with the front surface of the front case 891 and substantially define a space in which the light guide 896 is accommodated. In addition, the rear coupling portion 892f may be disposed on the extension wall 892b. The rear coupling portion 892f may be disposed at a position corresponding to the front coupling portion 891b and may protrude in a hook shape to be hooked by the front coupling portion 891b.

A pair of sidewalls 892d may be disposed at lateral or left and right sides of the front surface of the case body 892a, respectively. The sidewall 892d may be disposed between the upper and lower extension walls 892b and may be open between the upper and lower extension walls 892b. Thus, there is a space in which the light guide 896 is accommodated in the front surface of the rear case 892 by the case body 892a, the pair of extension walls 892b, and the pair of sidewalls 892d.

The sidewall 892d may be spaced apart by a length corresponding to the length of the light guide 896, and thus, the light guide 896 may be disposed between the pair of sidewalls 892d. A plurality of guide fixing portions 892e may be disposed between the pair of sidewalls 892d. The guide fixing portion 892e may include a pair of protrusions spaced apart from each other and the light guide 896 may be press-fitted to be fixed therebetween. The guide fixing portion 892e may be provided in a shape, such as a pair of rings or rounded protrusions, facing each other. In addition, the guide fixing portions 892e may be spaced apart from each other to minimize a portion at which the light irradiated forward by the light guide 896 is blocked.

An inner surface of the light guide accommodation space 892h defined by the extension wall 892b and the sidewall 892d may be configured to reflect the ultraviolet rays. For example, a separate member for reflecting light on the inner surface of the light guide accommodation space 892h may be mounted or attached in the form of a film or sheet and may be configured to reflect the light by coating or deposition as necessary. Thus, the light guide accommodation space 892h may be referred to as a reflection portion.

The light guide 896 may be provided in a cylindrical rod shape, for example. In addition, the light guide 896 may be disposed between the pair of sidewalls 892d and fixed by the guide fixing portion 892e. In addition, the light sources 897 may be provided on both sides of the light guide 896 to irradiate light to both ends of the light guide 896, respectively.

The light guide 896 may transmit the light irradiated from the light source 897 forward and may be made of a material capable of transmitting light. For example, the light guide 896 may be made of a quartz material, acrylic, or a resin material, for example. The light irradiated to an end of the light guide 896 may be reflected in various directions while moving along the light guide 896.

A reflective pattern portion (reflective pattern) 896a may be disposed at one side of the light guide 896. The reflective pattern portion 896a may be provided in a fine uneven shape and may be disposed on a portion of a rear surface of an outer surface of the light guide 896. That is, the reflective pattern portion 896a may be disposed on a surface facing the case body 892a among the outer surface of the light guide 896. Thus, light moving along the light guide 896 may be reflected by the reflective pattern portion 896a and may be mostly directed forward.

Thus, although the light irradiated from both the sides of the light guide 896 moves along the light guide 896, most of the light may be directed forward by the reflective pattern portion 896a. In addition, the light directed in a direction other than the front may also be reflected forward by the reflection portion.

The light source 897 may be disposed on each of both left and right sides of the light guide 896. The light source 897 may irradiate the ultraviolet rays, and thus, may be referred to as an LED module, a chip LED, or a light emitting means, for example. The light source 897 may include UV LED 895 irradiating the ultraviolet rays, and a substrate 894 on which elements including the UV LED 895 are mounted.

The pair of light sources 897 may be disposed at both sides of the light guide 896, respectively, and the UV LEDs 895 may be disposed to face each other with the light guide 896 therebetween. That is, the pair of UV LEDs 895 may be disposed to face both ends of the light guide 896.

A substrate mounting portion 892c extending backward may be disposed outside the pair of sidewalls 892d. A space in which the light source 897 is accommodated may be defined in the substrate mounting portion 892c. The substrate mounting portion 892c may be open in the frontward and rearward direction, and the open front surface may be shielded by the front case 891. In addition, the substrate 894 may be exposed through the open rear surface of the substrate mounting portion 892c, and the substrate 894 may be connected to a cable. The substrate 894 may include a connector 894a connected to a cable, and the connector 894a may be exposed through an open rear surface of the substrate mounting portion 892c.

An LED hole 892g may be defined in the sidewall 892d defining one surface of the substrate mounting portion 892c. The LED hole 892g may be open at a position facing each of both ends of the light guide 896, and the UV LED 895 may be exposed. That is, the light guide 896, the UV LED 895, and the LED hole 892g may be aligned on a same extension line.

Figure 53:
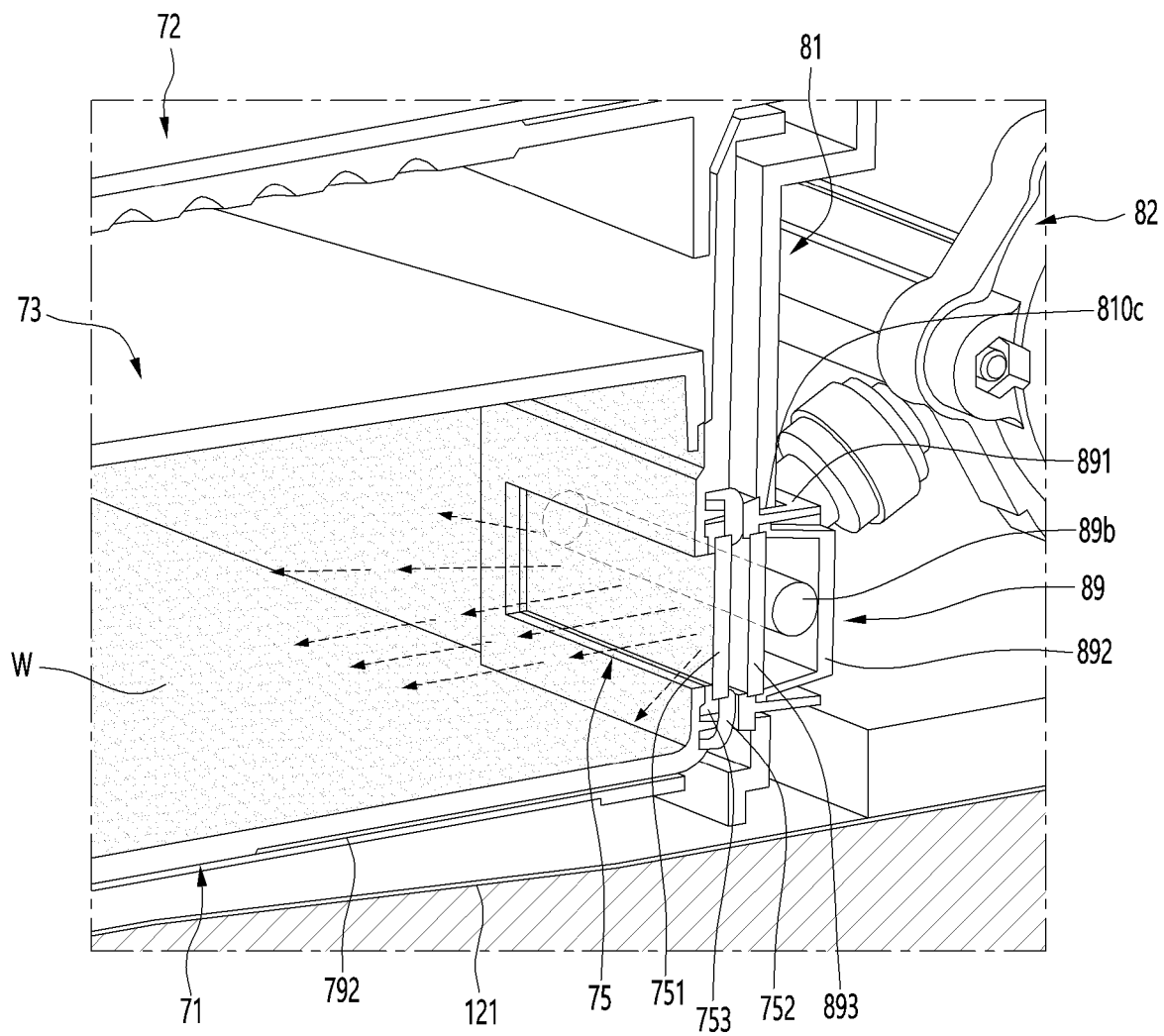
FIG. 53 is a cutaway perspective view illustrating a state in which ultraviolet (UV) rays are irradiated from the light irradiation device to the water tank.

FIG. 53 is a cutaway perspective view illustrating a state in which the ultraviolet rays are irradiated from the light irradiation device to the water tank. As illustrated in the drawing, the water accommodated in the water tank 70 may be sterilized by the light irradiation device 89. The water tank 70 may be maintained in a state of being filled with water supplied to the plants disposed on the cultivation shelf 30, and when the pump 82 is driven, the water may be supplied to the water tank 70 and the cultivation shelf 30, and when the drive device 86 is driven, the water may be drained to be collected again into the water tank 70.

Thus, except when the pump 82 is driven, the water may be maintained in the state of being accommodated in the water tank 70, and the light irradiation device 89 may operate to sterilize the water inside the water tank 70. When the light irradiation device 89 is turned on, the UV LED 895 may irradiate the ultraviolet rays into both the ends of the light guide 896. In addition, the ultraviolet rays moving along the light guide 896 may be reflected forward and sequentially pass through the window plate 893 and the transmission window 75 to irradiate the inside of the water tank 70.

The light irradiation device 89 may be disposed at a position biased toward one side of the left and right sides with respect to the center of the water tank 70. Even in this state, the light irradiated to the inside of the water tank 70 may be continuously reflected through the water of the water tank 70, and in particular, due to the reflection from the water surface, the ultraviolet rays may be transmitted throughout the water within the water tank 70. Therefore, even if the light irradiation device 89 has a position inclined to one side, it may be sufficient to sterilize the entire water inside the water tank 70. However, due to the unidirectional arrangement of the light irradiation device 89, space utilization inside the pump cover 81 may be improved, and a passage arrangement for supply and collection of water from the water tank 70 may be facilitated. Alternatively, the light irradiating device 89 may be disposed at the center rather than in the position biased to one side.

As described above, the water inside the water tank 70 may be sterilized by the ultraviolet rays irradiated from the light irradiation device 89 to prevent mold or green algae from occurring in the water inside the water tank 70. Therefore, the water supplied to the cultivation shelf 30 may be supplied in a clean state, and a sanitary condition of the entire water supply module and the drain module in addition to the cultivation shelf 30 and the water tank 70 may be maintained to prevent bad odor due to contamination from occurring. In addition, the UV lamp 824 may be periodically turned on and off at a set or predetermined cycle to ensure durability of the UV LED 895 while ensuring proper sterilization ability.

The light irradiation device 89 may be maintained in an ON state during the rest of the time, except for a time from the moment when water is supplied to the cultivation shelf 30 up to a time until the drainage is completed to the water tank 70. That is, the light irradiation device 89 may operate in a state in which as much water as possible is secured in the water tank 70, and thus, the sterilization ability for sterilizing the water inside the water tank 70 may be maximized. In addition, while the water is supplied to the cultivation shelf 30, the light irradiation device 89 may be turned off to ensure the lifespan of the UV LED 895. Alternatively, the light irradiation device 89 may be controlled to be turned on and off within a set or predetermined time or a set or predetermined time range regardless of the water supply and drainage to the cultivation shelf 30.

Hereinafter, operation of the plant cultivation apparatus 1 having the above structure will be described with reference to the drawings.

Figure 54:
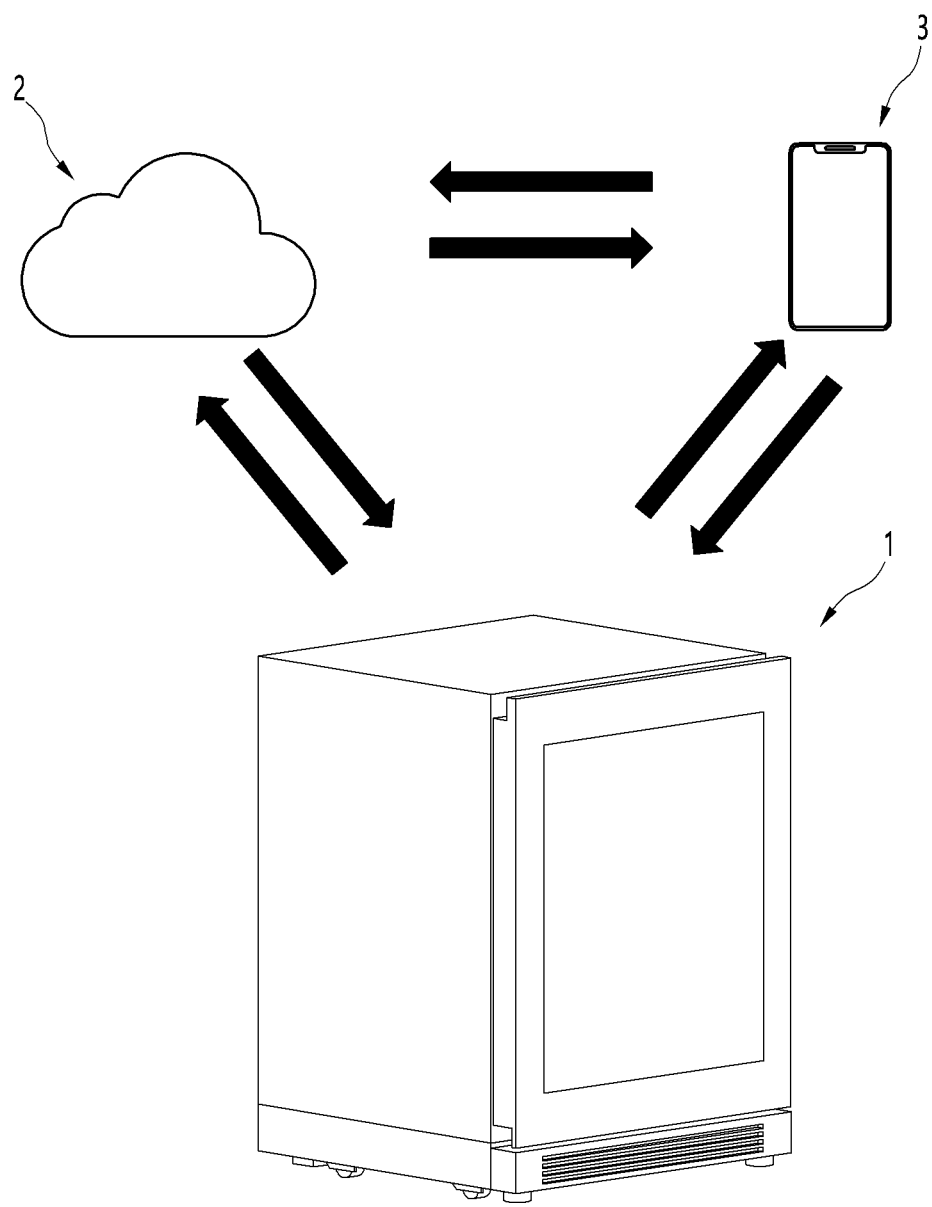
FIG. 54 is view illustrating a connection state between the plant cultivation apparatus, a server, and a user device.
Figure 55:
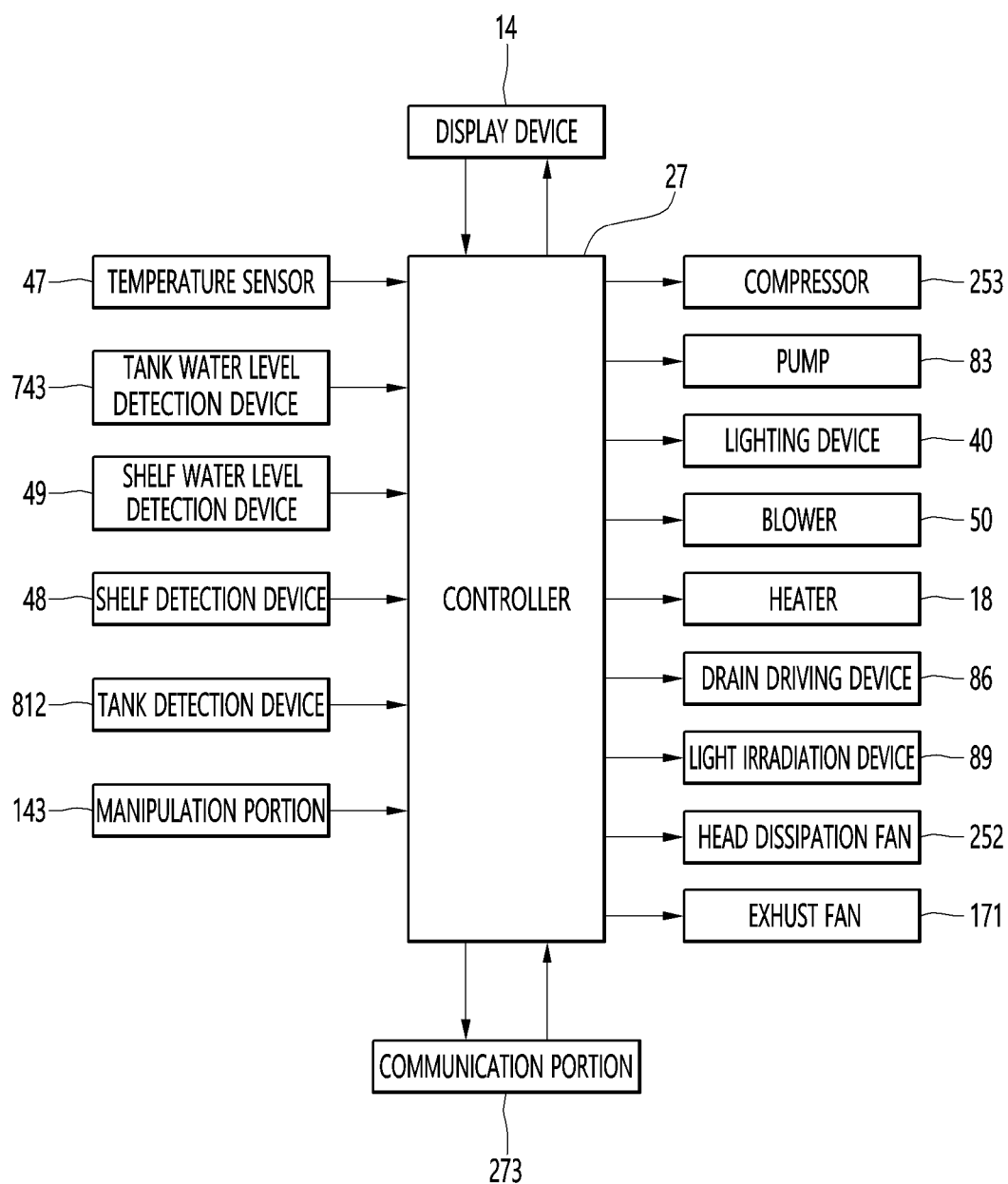
FIG. 55 is a block diagram illustrating a flow of a control signal of the plant cultivation apparatus.
Figure 56:
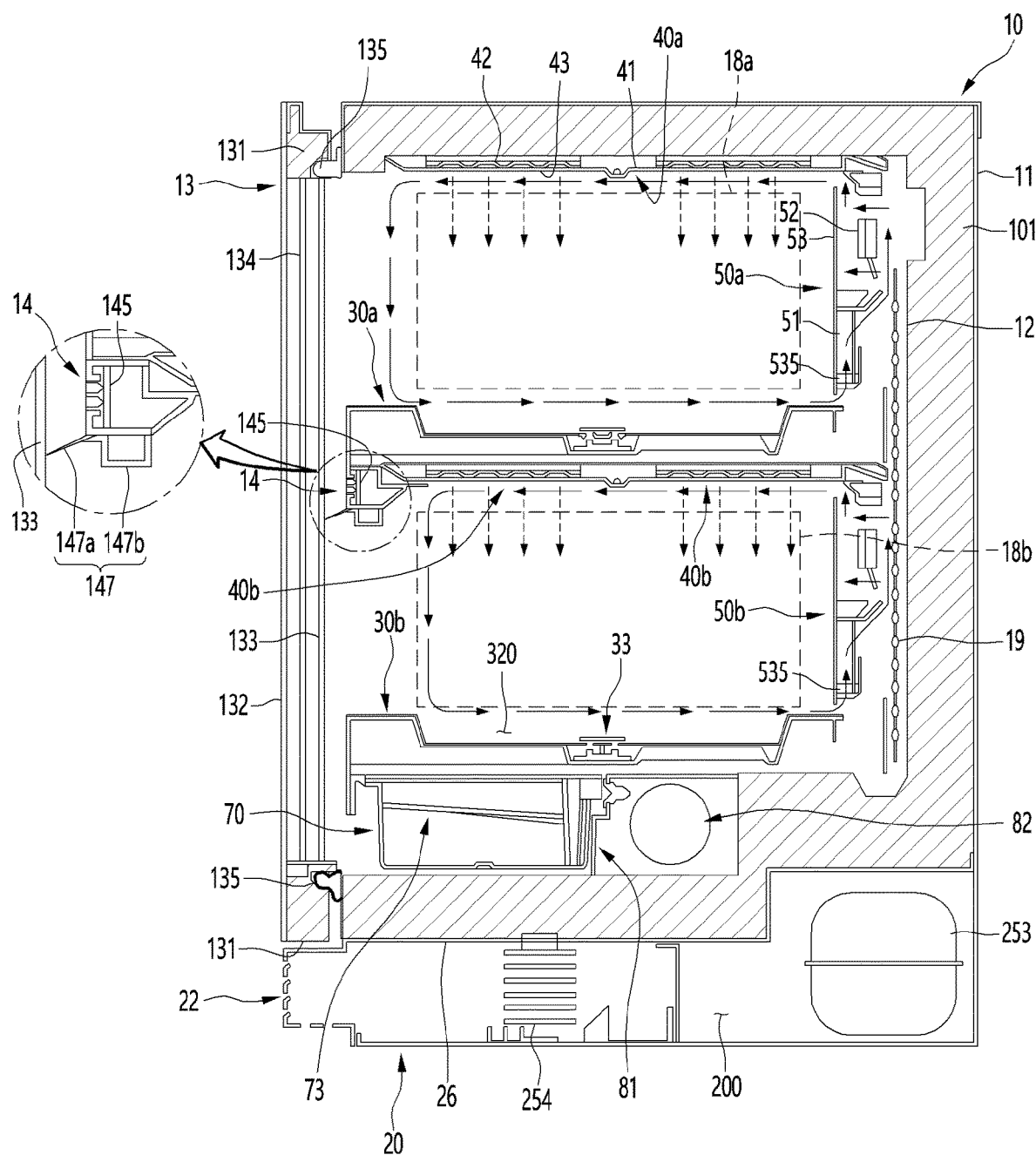
FIG. 56 is a cross-sectional view illustrating a state in which air is circulated, and light is irradiated in the plant cultivation apparatus.
Figure 57:
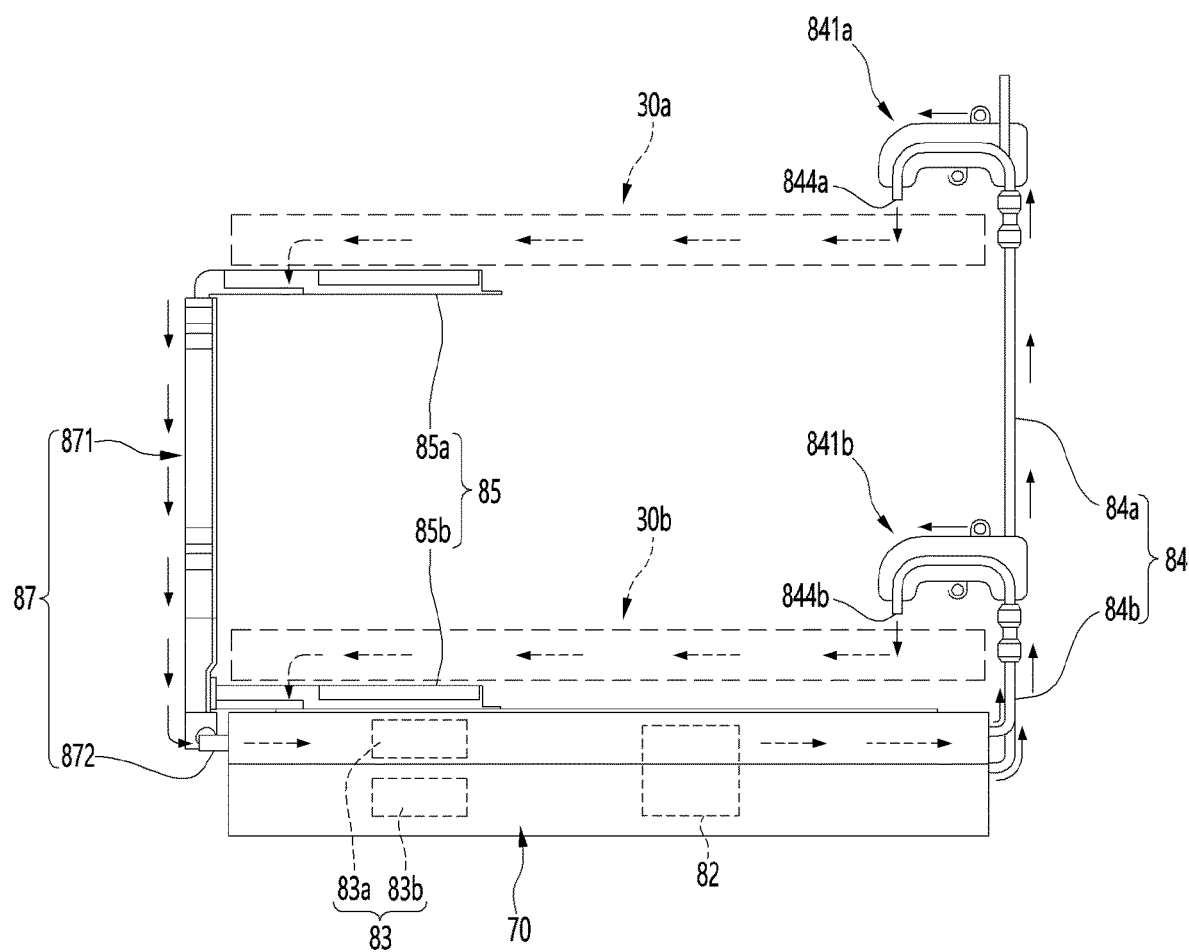
FIG. 57 is a view illustrating a state in which water is circulated between the cultivation shelf and the water tank.

FIG. 54 is view illustrating a connection state between the plant cultivation apparatus, a server, and a user device. FIG. 55 is a block diagram illustrating a flow of a control signal of the plant cultivation apparatus. FIG. 56 is a cross-sectional view illustrating a state in which air is circulated, and light is irradiated in the plant cultivation apparatus. FIG.

57 is a view illustrating a state in which water is circulated between the cultivation shelf and the water tank.

As illustrated in the drawings, the plant cultivation apparatus 1 may be set by inputting basic information, such as basic time and date, a temperature, and/or a region, for example, in a state of being installed for use. Alternatively, if the plant cultivation apparatus 1 is in a network-connected state, the plant cultivation apparatus 1 may be automatically synchronized, and the basic information may be set automatically without separate setting.

In addition, the plant cultivation apparatus 1 may be controlled to set and change operating conditions of the plant cultivation apparatus 1 through communication with a user device 3 carried by the user or a remote server 2. In addition, the plant cultivation apparatus 1 may exchange information or operation information on plants grown in the plant cultivation apparatus 1 with the user device 3 and the server 2. The user device 3 may be, for example, a mobile phone, or a tablet PC, for example, capable of outputting a screen and allowing the user to manipulate an input.

In a state in which power is applied to the plant cultivation apparatus 1, and an input of basic information is completed, the plant cultivation apparatus 1 may be in an operable state. In addition, for the cultivation of plants in such a state, an appropriate crop for cultivation may be selected, the corresponding seed package 90 may be mounted on the cultivation shelf 30, and water may be filled in the water tank, and thus, preparation for cultivation of plants will be completed.

In a state in which a power source is connected to the plant cultivation apparatus 1, the plant cultivation apparatus 1 may receive information that is necessary for operation. The input of information for the operation of the plant cultivation apparatus 1 may be performed to realize a standard operation input through the input of the manipulation portion 143 and may be performed to realize an operation input customized for plants, which is provided from the network-connected cloud server 2 or user device 3.

For example, a QR code, barcode, or NFC tag provided to the seed package 90, which are selected by the user, may be recognized using the plant cultivation apparatus 1 or the user device 3 and then be transmitted to a controller 27 to set the conditions for the operation. In this case, the conditions for the operation may be a set or predetermined temperature, illuminance, sunlight, and/or water supply, for example, of the plant cultivation apparatus.

Alternatively, the information for the operation may be set in detail through a direct manipulation input of the manipulation portion 143, and may also be set by selecting and inputting at least one standardized mode. In addition, when a plurality of cultivation shelves 30 is provided, information for different operations in each cultivation shelf 30 may be set.

After the seed package 90 is seated on the cultivation shelf 30, the user may close the door 13 and allow the plant cultivation apparatus 1 to operate according to a set or predetermined operation so as to grow plants, and the grown plants may be harvested at a desired time.

Looking at an example of the operation of the plant cultivation apparatus 1 in a state in which the seating of the seed package 90 and the setting of the information for the operation are completed, the lighting device 40 may be maintained in an ON state for approximately 14 hours and maintained in an OFF state for 10 hours based on 24 hours a day. In general, for effective growth of plants, about 14 hours of sunlight per day is required. Of course, the time for which the lighting device 40 is maintained in the ON state may not be fixed to about 14 hours, but may be adjusted as necessary. For example, the lighting device 40 may adjust the turn-on time in the range of about 10 hours to about 18 hours.

The lighting device 40 may be controlled based on a set or predetermined current time. That is, the lighting device 40 may be controlled to be turned on and off according to the actual sunrise and sunset times based on the current time. Thus, a plant requiring a change in season and sunlight time may be grown while receiving the same amount of sunlight as the external environment. Alternatively, the lighting device 40 may not correspond to the actual sunrise and sunset times and may operate to be turned on at any time of the week based on the current time set by the user and then turned off when the set time elapses. In addition, the on-off cycle of the lighting device 40 may be adjusted, or illuminance or an amount of light may be adjusted to control a harvest time of a cultivated crops.

The controller 27 may control the water supply and drainage based on the set operation information. When a water supply signal is input from the controller 27, the controller 27 may determine a water level in the water tank 70 through the tank level detection device 743 and then may start the water supply if there is a sufficient amount of water that is capable of being supplied. For example, the amount of water that is capable of being supplied may be approximately 1 L as the amount of water that is capable of being supplied to the cultivation shelf 30 once.

If the water level detected by the tank water level detection device 743 is lower than the set water level, the water shortage may be notified to the user through the display device 14 or the user device 3. When the tank level detection device 743 detects that the water level of the water tank 70 is higher than or equal to the set water level, the controller 27 may drive the pump 83 to start the water supply.

The water in the water tank 70 may be supplied to the cultivation shelf 30 through the water supply pipe 84 by driving the pump 83. The water supplied to the cultivation shelf 30 may be selectively supplied only to a position, at which the seed package 90 is seated, on the seating portions 320 of the cultivation shelf 30 to prevent the cultivation space 100 and the cultivation shelf 30 from being contaminated.

When the pump 83 is turned on, and a set or predetermined time elapses, it is determined that a fixed amount of water has been supplied to the cultivation shelf 30, and thus, the pump 83 may be turned off, and the water supply may be terminated. After the pump 83 is turned off, the cultivation shelf 30 may be maintained for a set or predetermined time while being filled with a set amount of water. For example, the set time may be about 1 hour and 30 minutes, and the cultivation shelf 30 may be filled with water for about 1 hour and 30 minutes after the water supply is completed. If the cultivation shelf 30 is filled with a set amount of water for about 1 hour and 30 minutes, a sufficient amount of water may be supplied into the seed package 90, and the plants inside the seed package 90 may sufficiently absorb a required amount of water regardless of kinds of plants.

When it is determined that the set time has elapsed after the pump 83 is turned off, the controller 27 starts the drainage. That is, the controller 27 may operate the drive device 86 to start the drainage. The opening/closing member 36 may rotate by the operation of the drive device 86 to open the drain hole 319a, and the water of the cultivation shelf 30 may be drained to the water tank 70 through the drain tray 85 and the drain tube 87.

The cultivation shelf 30 may be maintained in the drain state for a set or predetermined time so that the inside is dried and maintained in a sanitary state, and at the same time, oxygen supply may be promoted to roots of plants inside the seed package 90 for effective growth. For example, the cultivation shelf 30 may be maintained in the drain state for about 1 hour and 30 minutes. Thus, water may be repeatedly supplied to or drained from the cultivation shelf 30 every about 3 hours. When a plurality of the cultivation shelves 30 is provided, water in the cultivation shelf 30 may be supplied and drained at the same time. In order to allow water to be simultaneously supplied into or drained from the plurality of cultivation shelves 30, the water tank 70 having a relatively larger capacity may be required. Thus, in order to minimize and optimize a volume of the water tank 70, water may be alternately supplied into or drained from the plurality of cultivation shelves 30. For example, while water is supplied to the upper cultivation shelf 30a, the lower cultivation shelf 30b may be maintained in the drain state, and on the contrary, while water is supplied to the lower cultivation shelf 30b, the upper cultivation shelf 30a may be remained in the drain state. In this case, smooth water supply to the plurality of cultivation shelves 30 may be performed even in the water tank 70 having a relatively small capacity.

The light irradiation device 89 may sterilize the water inside the water tank 70 while being turned on and off at a set or predetermined cycle. For example, the light irradiation device 89 may be turned on for about 3 hours and turned off for about 6 hours to prevent algae or mold from being generated inside the water tank 70.

In addition, the light irradiation device 89 may operate to be interlocked with the state of the water supply and drainage to the cultivation shelf 30. The light irradiation device 89 may efficiently operate in a state in which the maximum amount of water is stored in the water tank 70. Therefore, the light irradiation device 89 is not turned on while water is being supplied to the cultivation shelf 30 or in a state in which water is supplied, and the light irradiation device 89 may operate only in a state that water is completely drained from the cultivation shelf 30.

The water tank 70 as well as the cultivation shelf 30 and the passage may be prevented odor from being generated by the operation of the light irradiation device 89. The inside of the cultivation space 100 may be maintained at a set or predetermined temperature suitable for the growth of the cultivated crop, and the controller 27 may control a refrigeration cycle and an operation of the blower 50. For example, the cultivation space 100 may be controlled to be maintained at a temperature between about 20° C. and about 27° C. during the day and about 16° C. to about 20° C. at night.

The evaporator 19 may generate cold air by driving the refrigeration cycle under the control of the controller 27, and the blower 50 may operate to supply the cool air into the cultivation space 100, thereby cooling the cultivation space 100 to a set temperature. The cold air generated by the blower 50 may be discharged from the upper end of the blower 50 to flow forward along the bottom surface of the lighting device 40. Thus, the lighting device 40 may be cooled by the cold air discharged from the blower 50.

Then, air in the cultivation space 100 may be introduced into the lower end of the blower 50, and at this time, the air may flow along the top surface of the cultivation shelf 30. Thus, the plants disposed on the cultivation shelf 30 may be shaken according to the flow of the air flowing along the top surface of the cultivation shelf 30 to apply appropriate stress so as to help the growth.

The cold air circulated in the cultivation space 100 by the blower 50 may cool the cultivation space 100 to maintain a set or predetermined temperature or temperature range. When the temperature of the cultivation space 100 is too low, the heater 18 may operate so that the cultivation space 100 reaches the set temperature. The heater 18 may be disposed inside each of the left and right sidewalls of the cultivation space 100 and may be provided in the form of a wire or a planar heating element.

Thus, when the heater 18 is turned on, the cultivation space 100 may be directly heated, and the cultivation space 100 may increase to the set temperature. When the cultivation space 100 reaches the set temperature, the heater 18 may be turned off.

As described above, the refrigeration cycle, the blower 50, and the heater 18 may be properly driven according to the state of the cultivation space 100 so that the cultivation space 100 is maintained to the set temperature or temperature range.

A plurality of cultivation shelves 30 may be disposed in the cultivation space 100, and each of the cultivation shelves 30 may be partitioned by the gasket barrier 147, and thus, an independent operation may be performed to crease different cultivation environments.

Hereinafter, a control method when different types of seed packages 90 are disposed on the cultivation shelf 30 of the plant cultivation apparatus 1 will be described.

Figure 58:
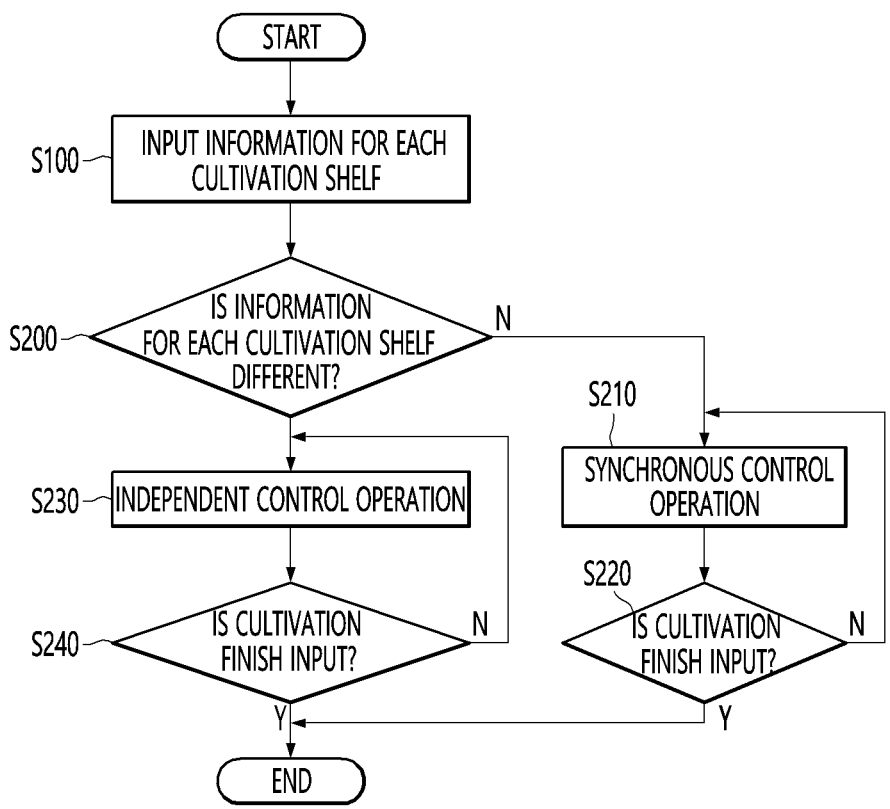
FIG. 58 is a view sequentially illustrating an operation of the cultivation shelf depending on information.

FIG. 58 is a view sequentially illustrating an operation of the cultivation shelf depending on information. As illustrated in the drawing, the user may grow different plants by seating different seed packages 90 in one plant cultivation apparatus 1. Of course, in spite of different plants, plants having similar cultivation environments may have the same cultivation environment, but it is more efficient to grow different types of plants having different cultivation environments in different cultivation environments.

For example, in the case of plants such as leafy greens, a temperature of about 22° C. during the day and about 17° C. at night is required for optimal cultivation, and it may be required for turn-on time of the lighting device 40 with about 14 hours and brightness of about 85% in illuminance and light. On the other hand, in the case of plants such as herbs, a temperature of about 25° C. during the day and about 18° C. at night is required for optimal cultivation, and it may be required for turn-on time of the lighting device 40 with about 16 hours and brightness of about 100% in illuminance and light.

Therefore, when the plants grown in the heterogeneous seed package 90 are separately arranged on the upper cultivation shelf 30a and the lower cultivation shelf 30b, the plants may be grown in independent cultivation environments. The heterogeneous seed package 90 may be a seed package that requires different cultivation environments, and for the convenience of understanding, the leaf seed package 90 and the herb seed package 90 will be described as an example, but are not limited thereto.

First, after the user selects a plurality of seed packages 90 to be cultivated, the seed packages may be seated on the cultivation shelf 30. The plurality of seed packages 90 are arranged to be divided into the upper cultivation shelf 30a and the lower cultivation shelf 30b, and the homogeneous seed packages 90 may be seated on one cultivation shelf 30. For example, the herb seed package 90 may be disposed on the upper cultivation shelf 30*a*, and the leaf seed package 90 may be disposed on the lower cultivation shelf 30*b*.

In addition, the user may input information for each cultivation shelf 30. That is, the user may allow the information of the seed package 90 seated on each of the cultivation shelves 30 to be input through direct manipulation of the manipulation portion 143, automatic recognition, or the user device 3. When the information of the seed package 90 is input, the controller 27 may set the operation conditions (temperature and illuminance, sunlight, water supply cycle, and air volume) for plant cultivation to values that are set to fit each cultivation shelf 30. Alternatively, the user may directly input the operation conditions applied to each of the cultivation shelves 30. [S100]

When the information on each of the cultivation shelves 30 is inputted, the controller 27 may compare the inputted information to determine whether the operation conditions of each of the cultivation shelves 30 are the same. That is, whether to perform an independent control operation of driving the upper and lower spaces partitioned based on the gasket barrier 147 in the cultivation space 100 under different operation conditions, or whether to perform a synchronized control operation in which the entire cultivation space 100 is configured as one same cultivation environment, and the upper cultivation shelf 30*a* and the lower cultivation shelf 30*b* are operate under the same operation conditions.

The independent control operation and the synchronized control operation may be determined by determining the information input by the controller 27, but the user may directly input any one of the independent control operation and the synchronized control operation to operate. [S200]

If the homogeneous seed packages 90 are seated on both the upper cultivation shelf 30*a* and the lower cultivation shelf 30*b*, the synchronized control operation may be performed. In this case, the homogeneous seed packages 90 may mean seed packages 90 of plants having a similar cultivation environment, not the same type of plants.

When the seed package 90 of either leaf or herb is disposed on the upper cultivation shelf 30*a* and the lower cultivation shelf 30*b*, the controller 27 may create the same cultivation environment by operating the entire cultivation space 100 under the same operation conditions based on the input information.

For this, the upper lighting device 40*a* and the lower lighting device 40*b*, the upper blower 50*a* and the lower blower 50*b*, the upper heater 18*a* and the lower heater 18*b*, which are disposed in the cultivation space 100, may be disposed in the cultivation space 100 to be operated and controlled in the same manner.

For example, if the leaf seed package 90 is seated and grown in both the upper cultivation shelf 30*a* and the lower cultivation shelf 30*b*, the refrigeration cycle, the upper blower 50*a*, the lower blower 50*b*, the upper heater 18*a*, and the lower heater 18*b* may operate in the same manner so that the cultivation space 100 may be maintained at a temperature of about 22° C. during the day and about 17° C. at night. In addition, light may be irradiated onto both the upper lighting device 40*a* and the lower lighting device 40*b* with brightness of about 85% for about 14 hours a day. In addition, the upper cultivation shelf 30*a* and the lower cultivation shelf 30*b* may be maintained in the water supply state for about 1.5 hours and also maintained in the drain state for about 1.5 hours, respectively, and this process may be repeatedly performed. [S210]

In addition, the synchronous control operation may be continued until the cultivation of the plants grown in the upper cultivation shelf 30*a* and the lower cultivation shelf 30*b* is finished. In this case, the end of the plant cultivation may be any one of when the harvest time has elapsed, when the user removes the seed package 90 from the cultivation shelf 30, and when the user inputs the end of cultivation.

When the synchronous control operation is completed, the plant cultivation apparatus 1 may stop the operation or wait until a new seed package 90 is placed or new operation information is input. [S220]

If the heterogeneous seed packages 90 are seated on both the upper cultivation shelf 30*a* and the lower cultivation shelf 30*b*, the independent control operation may be performed. In this case, the heterogeneous seed packages 90 mean seed packages 90 of plants having different cultivation environments, not different types of plants.

If the leaf seed package 90 and the herb seed package 90 are separately arranged on the upper cultivation shelf 30*a* and the lower cultivation shelf 30*b*, the controller 27 may divide the cultivation space 100 into upper and lower spaces based on the gasket barrier 147 based on the input information and operates under different operation conditions to create different cultivation environments.

For this, the upper lighting device 40*a* and the lower lighting device 40*b*, the upper blower and the lower blower 50*b*, the upper heater and the lower heater 18*b*, which are disposed in the cultivation space 100, may be disposed in the cultivation space 100 to be operated and controlled differently.

For example, if the herb seed package 90 is seated on the upper cultivation shelf 30*a* to be grown, the space in which the upper cultivation shelf 30*a* is disposed, i.e., the refrigeration cycle, the upper blower 50*a*, and the upper heater 18*a* may operate so that the space above the gasket barrier 147 is maintained at a temperature of about 25° C. during the day and about 18° C. at night. In addition, light may be irradiated onto the upper lighting device 40*a* with brightness of about 100% for about 16 hours a day. In addition, the upper cultivation shelf 30*a* may be maintained in the water supply state for about 1.5 hours and also maintained in the drain state for about 1.5 hours, and this process may be repeatedly performed.

In addition, if the left seed package 90 is seated on the lower cultivation shelf 30*b* to be grown, the space in which the lower cultivation shelf 30*b* is disposed, i.e., the refrigeration cycle, the lower blower 50*b*, and the lower heater 18*b* may operate so that the space below the gasket barrier 147 is maintained at a temperature of about 22° C. during the day and about 17° C. at night. In addition, light may be irradiated onto both the lower lighting device 40*b* with brightness of about 85% for about 14 hours a day. In addition, the upper cultivation shelf 30*a* may be maintained in the water supply state for about 1.5 hours and also maintained in the drain state for about 1.5 hours, and this process may be repeatedly performed.

In addition, the independent control operation may be continued until the cultivation of the plants grown in the upper cultivation shelf 30*a* and the lower cultivation shelf 30*b* is finished. In this case, the end of the plant cultivation may be any one of when the harvest time has elapsed, when the user removes the seed package 90 from the cultivation shelf 30, and when the user inputs the end of cultivation.

When the independent control operation is completed, the plant cultivation apparatus 1 may stop the operation or wait until a new seed package 90 is placed or new operation information is input.

The plant cultivation apparatus according to the embodiment may expect the following effects.

In the state in which the water tank is drawn in, the light irradiation device provided behind the water tank may irradiate the ultraviolet rays to the inside of the water tank. Therefore, the water stored in the water tank may be sterilized.

Thus, the water in the water tank may be maintained in the sterilized state, and the sterilized water may be supplied to the cultivation shelf when the pump is driven. Thus, the mold or green algae may be prevented from being generated in the water supplied to the inside of the cultivation shelf.

More particularly, the light irradiation device may reflect the light forward by the light guide and reflect the ultraviolet rays in the wider range to effectively sterilize the water inside the water tank.

In addition, the light irradiation device may be turned on when the drainage from the cultivation shelf is completed, and the water in the water tank may be efficiently sterilized by periodically turning on and off to ensure the durability of the light irradiation device.

More particularly, in the structure in which the water is circulated between the cultivation shelf and the water tank, and the nutrients are added to the inside of the water tank to circulate the water that is in the state of the culture medium, the contamination of the water may be more serious, but the water within the water tank may be sterilized by the light irradiation device, and also, the circulated water may be repeatedly sterilized to prevent the mold or green algae from being generated in the water circulated in the cultivation space and prevent the odors from occurring in the cultivation space, thereby improving the sanitation.

In addition, the cultivation space may be sealed by the door, and the temperature of the cultivation space may be controlled by the temperature adjustment device to create the environment that is easy to cultivate the plants. However, the environment of the cultivation space may be provided as the environment under which the mold and the green algae are easily generated. Thus, the water may be selectively supplied to only the area on which the seed package is disposed, and after the set time elapses after the water is supplied, the cultivation shelf may be emptied to minimize the inside of the cultivation space from being contaminated. That is, the inside of the cultivation shelf may be maintained in the state of the absence of the water for the set time to prevent the mold or the green algae from being generated and thus prevent the odor from occurring in the cultivation space, thereby improving the sanitation.

In addition, the water drained from the cultivation shelf and introduced into the water tank may pass through the water filter disposed in the water inlet. In addition, the foreign substances such as the green algae and the mold may be filtered in the process of passing through the water filter. Thus, the inflow of the foreign substances into the water tank may be prevented, and the green algae or mold may be prevented from being grown.

The portion of the water filter may be exposed to the inside of the water tank so that the water filer is easily detachable. Therefore, the water filter may be periodically simply replaced to maintain the filtering performance.

The water stored in the water tank may be circulated between the water tank and the cultivation shelf, and thus, the frequent water supply may not be required to realize the convenient of use. In addition, in the situation in which the water supply is required, the water tank may be drawn out, and the tank cover may be opened to replenish the water, thereby improving the convenience of use.

More particularly, the water tank may be removed simply by lifting the water tank from the tank rail in the drawn-out state. In addition, the water tank may be easily cleaned and maintained in the state in which the water tank is separated.

In addition, the tank fixing protrusion may be inserted into the tank fixing groove of the water tank on the tank rail to maintain the mounted state of the water tank. Thus, the water tank may not be arbitrarily separated and may be maintained in the stably mounted state even during the draw-in or out operation.

The tank supporter that supports the water tank may be provided between the pair of tank rails to stably support the warner tank. Therefore, the water tank, which contains water and has the heavy weight, may be mounted more stably without the sagging or tilting. In addition, the tank supporter may maintain the state in which the pair of water tanks are connected to each other, and thus, when the water tank is mounted, as it is necessary to separately align the tank rails, the convenience of use may be improved.

The inner cover may be provided inside the water tank. The inner cover may be fixedly mounted at the position corresponding to the full water level of the water tank. The plate cutoff portion for the water supply may be defined in the inner cover, and the top surface of the inner cover may be inclined toward the plate cutoff portion.

Thus, when the tank cover is opened, and the water is poured into the inner cover, the water may be supplied into the water tank. In addition, when the user fills the inner cover with the water, the user may intuitively know the full level of the water tank, and thus, the water supply and the water supply management may be more convenient.

In addition, the inner cover may have the structure that shields the water inside the water tank at the upper side in the full water level state. Therefore, the water tank may be prevented being shaken during the draw-in and out of the water tank, or the water may be prevented from leaking while the water tank is separated and transported, thereby improving the convenience of use.

The inlet duct may be provided on the top surface of the cultivation space to allow the external air to be introduced, and the outlet duct may be provided on the bottom surface of the cultivation space to discharge the air inside the cultivation space to the outside.

Thus, the carbon dioxide may be smoothly supplied to the inside of the cultivation space to promote the growth of the plants. In addition, the humidity of the cultivation space may be controlled by discharging the humid air inside the cultivation space. In addition, the generation of the odor may be prevented by ventilating the inside of the cultivation space.

In addition, the inlet duct may be provided with the inlet filter for filtering the foreign substances in the external air introduced through the inlet duct. Therefore, the bacteria, the mold, or the insects, which are contained in the external air and are introduced into the cultivation space may be blocked, and thus, the cultivation space may always be maintained in the clean and sanitary state, and the odors may be prevented from being generated in the cultivation space.

In addition, the inlet filter may be configured to be easily detachable through the lighting device disposed on the top surface of the cultivation space, and thus, the user may easily replace the inlet filter as necessary. Therefore, the quality of the suctioned air may be maintained, and the inside of the cultivation space may be maintained in the comfortable state.

The cultivation space may be divided vertically by the gasket barrier when the door is closed. That is, the space in which the upper cultivation shelf is disposed and the space in which the lower cultivation shelf is disposed may be divided, and the spaces may be created into the independent cultivation environments by the upper lighting device and the lower lighting device, the upper blower fan and the lower blower fan, the upper heater and the lower heater, and the water supply module and the drain module, which are respectively connected to the upper cultivation shelf and the lower upper cultivation shelf.

Therefore, in the situation in which the independent operation control is required because the different types of seed packages are seated on the upper and lower cultivation shelves, the lighting device, the blower, the heater, for example, may operate independently to provide the independent cultivation environment.

That is, the cultivation space may be divided into the plurality of areas, and the environment in which the different crops are capable of being grown may be created in each area to realize the efficient and productive plant cultivation.

More particularly, the complex plant cultivation may be performed by dividing one cultivation space to enable the individual temperature control through the plurality of blower fans and the plurality of heaters.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. [Insert original claims or claims not filed in the following format. An embodiment may be achieved in a whole or in parts by a . . . ]

Embodiments provide a water supply device capable of preventing water within a cultivation space from being contaminated.

Embodiments also provide a plant cultivation apparatus, in which the inside of a cultivation space is prevented from being contaminated to improve sanitation within the cultivation space.

Embodiments also provide a plant cultivation apparatus in which water supply is easily managed, and convenience of use is improved.

Embodiments also provide a plant cultivation apparatus, in which ventilation performance is improved.

Embodiments also provide a plant cultivation apparatus, in which a cultivation space is divided into a plurality of spaces, and plants having cultivation conditions different from each other are respectively cultivated in the spaces.

Embodiments also provide a plant cultivation apparatus, in which a plurality of regions within a cultivation space are controlled at temperatures different from each other.

In one embodiment, a plant cultivation apparatus includes: a cabinet having a cultivation space; a cultivation shelf which is disposed in the cultivation space and on which a plant to be cultivated is disposed; a water tank which is disposed inside the cultivation space and in which water to be supplied to the cultivation shelf is stored; a tank rail configured to connect the cultivation space to the water tank so that the water tank is drawn in and out; a water supply module configured to supply the water of the water tank to the cultivation shelf; and a light irradiation device provided in the cultivation shelf to sterilize the water within the water tank, wherein the light irradiation device is provided outside the water tank to irradiate ultraviolet rays into the water tank by being transmitted through the water tank.

At least a portion of the tank body may be configured to allow light to be transmitted therethrough.

A transmission window through which light is transmitted may be disposed on a rear surface of the water tank, and the light irradiation device may be provided behind the transmission window to irradiate the ultraviolet rays into the water tank by passing through the transmission window.

The light irradiation device may include: a case having one surface open; a pair of light sources respectively disposed at both sides of the case to irradiate the ultraviolet rays; and a light guide disposed to extend between the pair of light sources so as to reflect the ultraviolet rays irradiated from the light sources toward the transmission window.

The light guide may be provided in a cylindrical rod shape, and a pattern portion configured to reflect the ultraviolet rays forward may be disposed on a rear surface of the light guide.

The light irradiation device may include a window plate configured to shield the open surface of the case, and wherein the window plate may be made of a material that is capable of transmitting light and is disposed to face the transmission window.

The plant cultivation apparatus may further include a drain module configured to guide water drained from the cultivation shelf to the water tank, wherein the light irradiation device may be turned on in a state in which the water of the cultivation shelf is completely drained.

The light irradiation device may be turned on in a state in which the water tank is completely drawn in.

The water tank may include: a tank body coupled to the tank rail so as to be drawn in and out and configured to define a water storage space having an open top surface; a tank cover configured to open and close the open top surface of the tank body; and an inner cover mounted inside the tank body so as to be detachable through the open top surface of the tank body and configured to partition the water storage space vertically.

The inner cover may include: a plate portion configured to shield the water storage space; and an edge portion extending downward along a circumference of the plate portion, wherein the edge portion may be supported on an inner surface of the tank body.

The plate portion may include a plate cutoff portion that is opened so that the supplied water drops downward, and the plate portion may have an inclination that gradually decreases from an outer end of the plate portion toward the plate cutoff portion.

The tank cover may be rotatably mounted on the tank body, and a water outlet extending toward a bottom of the water storage space to suction water stored in the water storage space may be provided in the tank cover, wherein the water outlet may extend downward by passing through the plate cutoff portion.

The water outlet may rotate together when the tank cover rotates, and the plate cutoff portion may be cut up to a rotation radius of the water outlet so as not to interfere with the water outlet.

The transmission window and the light irradiation device may be disposed to be lower than the inner cover.

The plant cultivation apparatus may further include: a drain tube provided in the cultivation space to guide water drained from the cultivation shelf to the water tank; and a drain nozzle connected to the drain tube and protruding from a rear side of the water tank toward the water tank, wherein a water inlet through which water is introduced from the drain nozzle may be provided in a rear surface of the tank body, and when the water tank is drawn in, the drain nozzle may be inserted into the water inlet and opened.

The water inlet may be recessed from a rear surface of the water tank, a water inlet cover configured to shield the water inlet may be disposed on an open front surface of the water inlet, and an opening that communicates with the water storage space inside the water tank so that water is introduced may be defined in the water inlet cover.

A floater that floats on water may be provided inside the water inlet, and a magnet may be disposed on the floater to detect a water level of the water tank by a tank water level detection device provided behind the water tank.

A water filter configured to filter foreign substances may be detachably mounted on the water inlet cover.

A rail mounting portion open downward so that the tank rail is inserted from the below may be disposed on both left and right surfaces of the tank body, and a tank fixing protrusion protruding upward may be disposed on a top surface of the tank rail, wherein the tank fixing protrusion may be inserted into a tank fixing groove defined in the rail mounting portion.

The plant cultivation apparatus may further include a tank supporter configured to connect a pair of tank rails disposed at both left and right sides to each other, wherein the tank supporter may be configured to support a bottom surface of the water tank in a state of being mounted on the tank rails.

The details of one or more embodiments are set forth in the accompanying drawings and the description below. Other features will be apparent from the description and drawings, and from the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A plant cultivation device, comprising:
   a cabinet that forms a space in which plants are cultivated:
   a door connected to the cabinet and configured to open and close the space;
   at least one bed disposed in the space;
   at least one light assembly that irradiates light onto the at least one bed;
   a tank configured to store a fluid;
   a tank rail coupled to both sides of the tank and both side surfaces of the cabinet so that the tank is drawn into and out of the space; and a fluid supply module configured to supply the fluid to the at least one bed, wherein a sterilizer is disposed in the space and apart from a rear of the tank, wherein the sterilizer comprises a light irradiation device that irradiates ultraviolet (UV) light, wherein the light irradiation device includes:
  at least one light source;
  a light guide that directs the UV light from the at least one light source toward the tank;
  a first case that is mounted within the plant cultivation apparatus and faces the tank, wherein a front opening is formed in the first case; and
  a second case coupled to the first case, wherein the at least one light source and the light guide are disposed between the first case and the second case and the light guide directs the UV light from the at least one light source through the front opening, wherein the tank has a transparent portion at a rear surface thereof corresponding to a position of the front opening of the first case, and when the tank is drawn into the space, the UV light passes through the transparent portion into the tank to sterilize the fluid within the tank, and wherein the tank is drawn into and out of the space in a direction in which the transparent portion and the light irradiation device face each other.

2. The plant cultivation apparatus according to claim 1, wherein the transparent portion comprises an opening that is provided in a tank body of the tank at a position corresponding to a position of the light irradiation device, and wherein the UV light passes through the opening into the tank to sterilize the fluid within the tank.

3. The plant cultivation apparatus according to claim 2, wherein the opening is formed in a rear surface of the tank body.

4. The plant cultivation apparatus according to claim 2, further comprising a transparent window disposed at the opening.

5. The plant cultivation apparatus according to claim 4, wherein the transparent window comprises:
  a transmission window plate;
  a transmission window frame that supports the transmission window plate; and
  a transmission window gasket that seals a gap between the transmission window frame and the tank body.

6. The plant cultivation apparatus according to claim 5, wherein the transmission window plate is made of glass or acrylic.

7. The plant cultivation apparatus according to claim 5, wherein a size of the transmission window plate is smaller than a size of the opening.

8. The plant cultivation apparatus according to claim 1, further comprising a window plate mounted in the front opening.

9. The plant cultivation apparatus according to claim 1, wherein a width of the front opening corresponds to a length of the light guide.

10. The plant cultivation apparatus according to claim 1, wherein the at least one light source comprises a pair of light sources disposed at sidewalls of the light irradiation device.

11. The plant cultivation apparatus according to claim 10, wherein the pair of light sources direct the UV light into the light guide and the light guide directs the UV light into the tank.

12. The plant cultivation apparatus according to claim 11, wherein the light guide includes a reflective pattern formed at one side of the light guide.

13. The plant cultivation apparatus according to claim 1, wherein the at least one light source comprises:
  at least one UV light emitting diode (LED); and
  a substrate on which the at least one UV LED is mounted.

14. The plant cultivation apparatus according to claim 1, further comprising a pump, wherein the sterilizer is mounted on the pump.

15. The plant cultivation apparatus according to claim 14, wherein the sterilizer is mounted on a front cover of the pump at a position at which the sterilizer overlaps with an opening formed in a tank body of the tank.

* * * * *